US010956050B2

(12) United States Patent
Tudor et al.

(10) Patent No.: US 10,956,050 B2
(45) Date of Patent: Mar. 23, 2021

(54) METHODS AND SYSTEMS FOR EFFICIENT NON-ISOLATED TRANSACTIONS

(71) Applicant: SanDisk Enterprise IP LLC, Milpitas, CA (US)

(72) Inventors: Frederic H. Tudor, Evanston, IL (US); Harihara Kadayam, Fremont, CA (US); Brian W. O'Krafka, Austin, TX (US); Johann George, Sunnyvale, CA (US)

(73) Assignee: SanDisk Enterprise IP LLC, Milpitas, CA (US)

( * ) Notice: Subject to any disclaimer, the term of this patent is extended or adjusted under 35 U.S.C. 154(b) by 0 days.

(21) Appl. No.: 14/597,174

(22) Filed: Jan. 14, 2015

(65) Prior Publication Data

US 2015/0277794 A1 Oct. 1, 2015

Related U.S. Application Data

(60) Provisional application No. 61/973,215, filed on Mar. 31, 2014.

(51) Int. Cl.
*G06F 3/06* (2006.01)
*G06F 9/46* (2006.01)
(Continued)

(52) U.S. Cl.
CPC ............ *G06F 3/0619* (2013.01); *G06F 3/064* (2013.01); *G06F 3/0679* (2013.01); *G06F 9/467* (2013.01);
(Continued)

(58) Field of Classification Search
CPC ............ G06F 11/1471; G06F 11/1474; G06F 17/30227; G06F 17/30286; G06F 3/0619;
(Continued)

(56) References Cited

U.S. PATENT DOCUMENTS 7,710,777 B1   5/2010   Montierth et al.
7,996,642 B1   8/2011   Smith
(Continued)

FOREIGN PATENT DOCUMENTS

WO   WO 2015/047398   4/2015
WO   WO 2015/152830   10/2015

OTHER PUBLICATIONS

International Search Report and Written Opinion dated Jun. 30, 2015, received in International Patent Application No. PCT/US2015/023927, which corresponds to U.S. Appl. No. 14/454,687, 11 pages (Kadayam).
(Continued)

*Primary Examiner* — Masud K Khan
(74) *Attorney, Agent, or Firm* — Morgan, Lewis & Bockius, LLP

(57) ABSTRACT

In response to receiving a request to perform a transaction with two or more memory operations on one or more tiered data structures, the memory controller: writes a start transaction record to the log stream including a transaction identifier corresponding to the transaction; and performs the two or more memory operations. For a first memory operation associated with a key, the memory controller: writes a new data object in a datastore; assigns, in a key-map, a location of the new data object to the key; maintains an old data object in the datastore whose location was previously assigned to the key; and writes an operation commit record to a log stream upon completion of the first memory operation. In accordance with a determination that the two or more memory operations are complete, the memory controller writes a transaction commit record to the log stream including the transaction identifier.

24 Claims, 26 Drawing Sheets

(51) Int. Cl.
*G06F 16/00* (2019.01)
*G06F 12/08* (2016.01)
*G06F 12/0866* (2016.01)
*G06F 12/0873* (2016.01)

(52) U.S. Cl.
CPC .......... *G06F 12/0866* (2013.01); *G06F 16/00* (2019.01); *G06F 12/0873* (2013.01); *G06F 2212/1016* (2013.01); *G06F 2212/1032* (2013.01); *G06F 2212/214* (2013.01); *G06F 2212/312* (2013.01); *G06F 2212/461* (2013.01); *G06F 2212/466* (2013.01); *G06F 2212/7201* (2013.01); *G06F 2212/7203* (2013.01); *G06F 2212/7207* (2013.01)

(58) Field of Classification Search
CPC .......... G06F 3/064; G06F 9/467; G06F 16/00; G06F 12/0866; G06F 3/0679; G06F 2212/466; G06F 2212/1016; G06F 2212/7203; G06F 12/0873; G06F 2212/7201; G06F 2212/312; G06F 2212/214; G06F 2212/7207; G06F 2212/461; G06F 2212/1032
See application file for complete search history.

(56) References Cited

U.S. PATENT DOCUMENTS

| | | |
|---|---|---|
| 9,158,681 B1 | 10/2015 | Samuels et al. |
| 9,170,938 B1 * | 10/2015 | Walsh .................. G06F 12/0246 711/104 |
| 2003/0229627 A1 | 12/2003 | Carlson et al. |
| 2004/0167898 A1 | 8/2004 | Margolus et al. |
| 2006/0159109 A1 | 7/2006 | Lamkin et al. |
| 2007/0156842 A1 | 7/2007 | Vermeulen et al. |
| 2007/0174309 A1 | 7/2007 | Pettovello |
| 2007/0185902 A1 | 8/2007 | Messinger et al. |
| 2009/0012976 A1 | 1/2009 | Kang et al. |
| 2009/0119450 A1 | 5/2009 | Saeki et al. |
| 2011/0145512 A1 * | 6/2011 | Adl-Tabatabai ........ G06F 9/466 711/141 |
| 2011/0252067 A1 * | 10/2011 | Marathe ............. G06F 17/30958 707/797 |
| 2012/0005419 A1 * | 1/2012 | Wu .................... G06F 17/30946 711/105 |
| 2012/0117328 A1 | 5/2012 | McKean et al. |
| 2012/0166360 A1 | 6/2012 | Shah et al. |
| 2012/0179645 A1 * | 7/2012 | Lomet ................ G06F 17/30575 707/607 |
| 2012/0259863 A1 | 10/2012 | Bodwin et al. |
| 2013/0091331 A1 * | 4/2013 | Moraru .................. G06F 12/126 711/143 |
| 2014/0075100 A1 | 3/2014 | Kaneko et al. |
| 2014/0185376 A1 | 7/2014 | Sinclair et al. |
| 2015/0212752 A1 | 7/2015 | Nemazie et al. |
| 2015/0242307 A1 * | 8/2015 | Busaba ................... G06F 9/528 711/165 |
| 2015/0253999 A1 | 9/2015 | Nemazie et al. |
| 2015/0278093 A1 | 10/2015 | O'Krafka et al. |
| 2015/0281389 A1 | 10/2015 | Firsov et al. |
| 2015/0370492 A1 | 12/2015 | Satnur et al. |
| 2015/0370701 A1 | 12/2015 | Higgins et al. |
| 2015/0378884 A1 | 12/2015 | Nemazie et al. |
| 2016/0085464 A1 | 3/2016 | Tuers et al. |
| 2016/0321010 A1 | 11/2016 | Hashimoto |
| 2017/0242785 A1 | 8/2017 | O'Krafka et al. |

OTHER PUBLICATIONS

International Search Report and Written Opinion dated Nov. 7, 2016, received in International Patent Application No. PCT/US2016/051717, which corresponds to U.S. Appl. No. 14/929,171, 13 pages (Shelton).

International Search Report and Written Opinion dated Sep. 14, 2016, received in International Patent Application No. PCT/US2016/036720, which corresponds to U.S. Appl. No. 15/144,704, 12 pages (Cheru).

Wilson's : "Working Draft SCSI Extended Copy Command," Apr. 2, 1999, http://www.t10.org/ftp/t10/document.99/99-143r1.pdf, 34 pages.

International Search Report and Written Opinion dated Mar. 15, 2017, received in International Patent Application No. PCT/US2016/067728, which corresponds to U.S. Appl. No. 15/208,540, 14 pages (O'Krafka).

* cited by examiner

State 624: (Post insert operation 612)

Leaf Node J2 of TDS 650
(Keys: 1-8)

| DO 606-1 K: 1 V: 3 | DO 606-2 K: 2 V: 3 | DO 606-3 K: 3 V: 7 | DO 606-4 K: 7 V: 51 |

Leaf Node MM of TDS 660
(Keys: 12-23)

| DO 608-1 K: 12 V: 32 | DO 608-2 K: 15 V: 51 | DO 608-3 K: 20 V: 77 |

Log Stream 134

⋮

Start Txn 602 {200, 799}

Start Txn 604 {201, 800}

Insert Op 612 {202, 799, 7, J, J2}

---

State 626: (Post delete operation 616)

Leaf Node J2 of TDS 650
(Keys: 1-8)

| DO 606-1 K: 1 V: 3 | DO 606-2 K: 2 V: 3 | DO 606-3 K: 3 V: 7 | DO 606-4 K: 7 V: 51 |

Leaf Node MM2 of TDS 660
(Keys: 12-23)

| DO 608-1 K: 12 T | DO 608-2 K: 15 V: 51 | DO 608-3 K: 20 V: 77 |

Log Stream 134

⋮

Start Txn 602 {200, 799}

Start Txn 604 {201, 800}

Insert Op 612 {202, 799, 7, J, J2}

Delete Op 616 {203, 800, 12, M, MM2}

Figure 6B

State 628: (Post insert operation 614)

Leaf Node J2 of TDS 650
(Keys: 1-8)

| DO 606-1 K: 1 V: 3 | DO 606-2 K: 2 V: 3 | DO 606-3 K: 3 V: 7 | DO 606-4 K: 7 V: 51 |
|---|---|---|---|

Leaf Node MM3 of TDS 660
(Keys: 12-23)

| DO 608-1 K: 12 T | DO 608-2 K: 15 V: 51 | DO 608-3 K: 20 V: 77 | DO 608-4 K: 21 V: 27 |
|---|---|---|---|

Log Stream 134

| ⋮ |
|---|
| Start Txn 602 {200, 799} |
| Start Txn 604 {201, 800} |
| Insert Op 612 {202, 799, 7, J, J2} |
| Delete Op 616 {203, 800, 12, M, MM2} |
| Insert Op 614 {204, 799, 21, MM2, MM3} |

---

State 630: (Post delete operation 618)

Leaf Node J3 of TDS 650
(Keys: 1-8)

| DO 606-1 K: 1 T | DO 606-2 K: 2 V: 3 | DO 606-3 K: 3 V: 7 | DO 606-4 K: 7 V: 51 |
|---|---|---|---|

Leaf Node MM3 of TDS 660
(Keys: 12-23)

| DO 608-1 K: 12 T | DO 608-2 K: 15 V: 51 | DO 608-3 K: 20 V: 77 | DO 608-4 K: 21 V: 27 |
|---|---|---|---|

Log Stream 134

| ⋮ |
|---|
| Start Txn 602 {200, 799} |
| Start Txn 604 {201, 800} |
| Insert Op 612 {202, 799, 7, J, J2} |
| Delete Op 616 {203, 800, 12, M, MM2} |
| Insert Op 614 {204, 799, 21, MM2, MM3} |
| Delete Op 618 {205, 800, 1, J2, J3} |

Figure 6C

State 632: (Post txn 604 commit and prior to detecting a trigger event)

Log Stream 134

| ⋮ |
|---|
| Start Txn 602 {200, 799} |
| Start Txn 604 {201, 800} |
| Insert Op 612 {202, 799, 7, J, J2} |
| Delete Op 616 {203, 800, 12, M, MM2} |
| Insert Op 614 {204, 799, 21, MM2, MM3} |
| Delete Op 618 {205, 800, 1, J2, J3} |
| Commit Txn 604 {206, 800} |

- - - - - - - - - - - - - - - - - - - - - - - - - - -

State 634: (Recovery - post trigger event)

Log Stream Portion 134-A

| Start Txn 602 {200, 799} |
|---|
| Start Txn 604 {201, 800} |
| Insert Op 612 {202, 799, 7, J, J2} |
| Delete Op 616 {203, 800, 12, M, MM2} |
| Insert Op 614 {204, 799, 21, MM2, MM3} |
| Delete Op 618 {205, 800, 1, J2, J3} |
| Commit Txn 604 {206, 800} |

Log Stream Portion 134-B

| Start Txn 602 {200, 799} |
|---|
| Insert Op 612 {202, 799, 7, J, J2} |
| Insert Op 614 {204, 799, 21, MM2, MM3} |

Figure 6D

State 634: (Recovery cont.)

Recovery List 642 for TDS 660

| New Leaf Node | New Data Objects | | | | Old Leaf Node | Old Data Objects | | |
|---|---|---|---|---|---|---|---|---|
| MM3 | DO 608-1 K: 12 T | DO 608-2 K: 15 V: 51 | DO 608-3 K: 20 V: 77 | DO 608-4 K: 21 V: 27 | MM2 | DO 608-1 K: 12 T | DO 608-2 K: 15 V: 51 | DO 608-3 K: 20 V: 77 |

643

Recovery List 644 for TDS 650

| New Leaf Node | New Data Objects | | | | Old Leaf Node | Old Data Objects | | |
|---|---|---|---|---|---|---|---|---|
| J2 | DO 606-1 K: 1 V: 3 | DO 606-2 K: 2 V: 3 | DO 606-3 K: 3 V: 7 | DO 606-4 K: 7 V: 51 | J | DO 606-1 K: 1 V: 3 | DO 606-2 K: 2 V: 3 | DO 606-3 K: 3 V: 7 |

645

Undo Operation 672: Delete DO from TDS 660 [key 21]

↓

Undo Operation 674: Delete DO from TDS 650 [key 7]

- - - - - - - - - - - - - - - - - - - - - - - - - - - - - - - - -

State 636: (Post-Recovery)

Leaf Node J4 of TDS 650
(Keys: 1-8)

| DO 606-1 K: 1 T | DO 606-2 K: 2 V: 3 | DO 606-3 K: 3 V: 7 |
|---|---|---|

Leaf Node MM2 of TDS 660
(Keys: 12-23)

| DO 608-1 K: 12 T | DO 608-2 K: 15 V: 51 | DO 608-3 K: 20 V: 77 |
|---|---|---|

Figure 6E

METHODS AND SYSTEMS FOR EFFICIENT NON-ISOLATED TRANSACTIONS

RELATED APPLICATIONS

This application claims priority to U.S. Provisional Patent Application No. 61/973,215, filed Mar. 31, 2014, which is hereby incorporated by reference in its entirety.

TECHNICAL FIELD

The disclosed embodiments relate generally to memory systems, and in particular, to improving the performance and reliability of tiered data structures.

BACKGROUND

The speed of many computer operations is frequently constrained by the speed and efficiency with which data can be stored and retrieved from data structures associated with a device. Many conventional data structures take a long time to store and retrieve data. However, tiered data structures can be used to dramatically improve the speed and efficiency of data storage. Some tiered data structures enable data searches, data insertions, data deletions, and sequential data access to be performed in logarithmic time. However, further improvements to tiered data structures can further increase the speed, efficiency, and reliability with which data can be stored and retrieved, thereby improving the performance of devices relying on such tiered data structures.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to improving the performance and reliability of tiered data structures.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIGS. 6A-6E illustrate the performance of an example recovery process in the data storage system in accordance with some embodiments.

Figure 1:
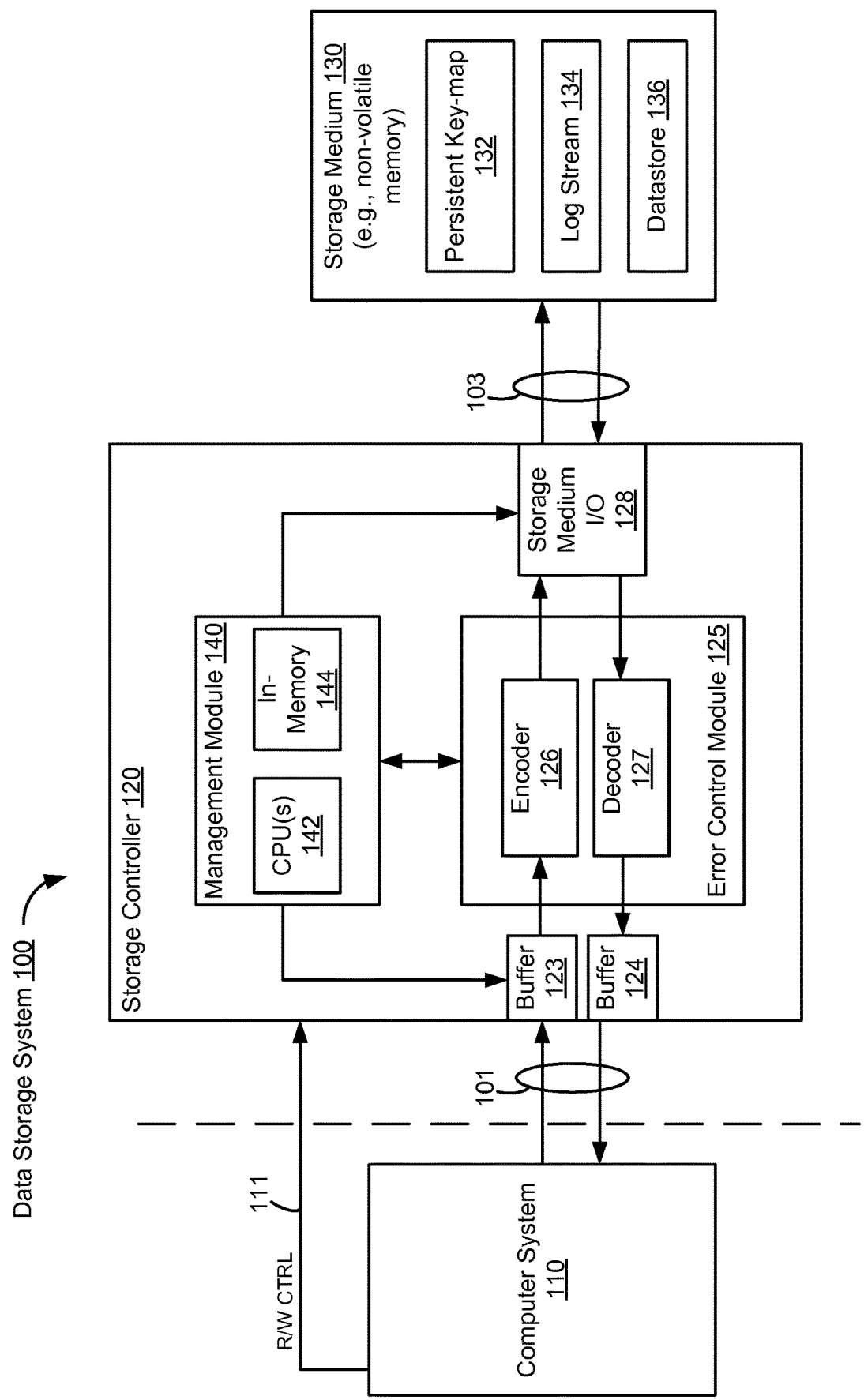
FIG. 1 is a block diagram illustrating an implementation of a data storage system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to improve the performance and reliability of tiered data structures.

Some embodiments include a method of managing a data storage system that includes: a memory controller; non-volatile memory with a log stream and a datastore comprising one or more tiered data structures; and a key-map storing datastore location information for a plurality of keys corresponding to data objects in the one or more tiered data structures stored in the datastore. In some embodiments, the method is performed by the memory controller (e.g., management module 140, FIGS. 1 and 3) with one or more processors (e.g., CPU(s) 142, FIGS. 1 and 3) and memory (e.g., memory 302, FIG. 3). In some embodiments, the memory controller is operatively coupled with or, alternatively, includes the non-volatile memory and the key-map. In some embodiments, the non-volatile memory (e.g., storage medium 130, FIGS. 1 and 2B) comprises one or more non-volatile memory devices. In some embodiments, the non-volatile memory includes one or more three-dimensional (3D) memory devices and circuitry associated with operation of memory elements in the one or more 3D memory devices. In some embodiments, the circuitry and one or more memory elements in a respective 3D memory device, of the one or more 3D memory devices, are on the same substrate (e.g., a silicon substrate). In some embodiments, the key-map is a non-persistent key-map (e.g., non-persistent key-map 202, FIGS. 2A and 3) that is stored in volatile memory (e.g., in-memory 144, FIGS. 1, 2A, and 3).

In some embodiments, the method includes, in response to receiving a request, from a requestor, to perform a transaction including a set of two or more memory operations to be performed on the one or more tiered data structures, where a first memory operation in the set of two or more memory operations is associated with a first key: writing a start transaction record to the log stream including a unique transaction identifier corresponding to the transaction; and performing the two or more memory operations. For each of the memory operations, the method includes, writing a respective operation commit record to the log stream upon completion of the memory operation, where the operation commit record guarantees a memory operation level of atomicity across the one or more tiered data structures. For the first memory operation in the set of two or more memory operations, the method includes: writing a new data object in the datastore; assigning, in the key-map, a location of the new data object in the datastore to the first key; and maintaining an old data object in the datastore, wherein a location of the old data object was previously assigned, in the key-map, to the first key. The operation commit record for the first memory operation includes the first key, the unique transaction identifier, a pointer to the location of the new data object in the datastore, and a pointer to the location of the old data object in the datastore. In accordance with a determination that the set of two or more memory operations in the transaction are complete, the method includes writing a transaction commit record to the log stream including the unique transaction identifier corresponding to the transaction, where the transaction commit record guarantees a transaction level of atomicity across the data storage system.

Some embodiments include a method of performing a recovery process in a data storage system that includes a memory controller and a non-volatile memory with a log stream and a datastore a comprising one or more tiered data structures. In some embodiments, the method is performed by the memory controller (e.g., management module 140, FIGS. 1 and 3) with one or more processors (e.g., CPU(s) 142, FIGS. 1 and 3) and memory (e.g., memory 302, FIG. 3). In some embodiments, the memory controller is operatively coupled with or, alternatively, includes the non-volatile memory. In some embodiments, the non-volatile memory (e.g., storage medium 130, FIGS. 1 and 2B) comprises one or more non-volatile memory devices. The method includes, in response to detecting a trigger event, inspecting a plurality of records in the log stream that are arranged in chronological order. A respective record of the plurality of records includes a unique sequence number and a transaction identifier and the plurality of records correspond to one or more transactions comprising at least one of: one or more complete transactions and one or more incomplete transactions. A respective complete transaction corresponds to a first start transaction record in the log stream that includes a first transaction identifier and a first transaction commit record in the log stream that includes the first transaction identifier. A respective incomplete transaction corresponds to a second start transaction record in the log stream that includes a second transaction identifier for which there is not a corresponding transaction commit record in the log stream that includes the second transaction identifier. The method includes inspecting the plurality of records in the log stream by identifying an oldest incomplete transaction that has at least a start transaction record in the log stream and identifying an oldest sequence number comprising a sequence number of the start transaction record of the identified oldest incomplete transaction. The method includes: identifying records in the log stream that are associated with sequence numbers that are newer than or equal to the identified oldest sequence number so as to obtain a first portion of the log stream; identifying a set of one or more complete transactions in the first portion of the log stream; and removing, from the first portion of the log stream, records associated with complete transactions in the set of one or more complete transactions so as to obtain a second portion of the log stream, the records in the second portion of the log stream are associated with incomplete transactions. The method includes performing one or more undo operations, corresponding to the records in the second portion of the log stream so as to rollback the datastore a self-consistent state.

Some embodiments include an electronic system or device (e.g., data storage system 100, FIG. 1 or management module 140, FIGS. 1 and 3), comprising: one or more processors; and memory storing one or more programs to be executed by the one or more processors, the one or more programs comprising instructions for performing or controlling performance of any of the methods described herein. Some embodiments include a non-transitory computer readable storage medium, storing one or more programs for execution by one or more processors of an electronic system or device (e.g., data storage system 100, FIG. 1 or management module 140, FIGS. 1 and 3), the one or more programs including instructions for performing any of the methods described herein. Some embodiments include an electronic system or device (e.g., data storage system 100, FIG. 1 or management module 140, FIGS. 1 and 3) comprising: means for performing the operations of any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a diagram of an implementation of a data storage system 100 in accordance with some embodiments. While some example features are illustrated, various other features have not been illustrated for the sake of brevity and so as not to obscure more pertinent aspects of the example embodiments disclosed herein. To that end, as a non-limiting example, data storage system 100 includes a storage controller 120, and a storage medium 130, and is used in conjunction with a computer system 110. In some embodiments, storage medium 130 includes a single memory device (e.g., a volatile memory device or a non-volatile memory ("NVM") device such as magnetic disk storage device, optical disk storage device, a flash memory device, a three-dimensional ("3D") memory device (as further described herein), or other NVM memory device) while in other implementations storage medium 130 includes a plurality of memory devices. In some embodiments, storage medium 130 includes NAND-type flash memory or NOR-type flash memory. Further, in some embodiments, storage controller 120 is a solid-state drive ("SSD") controller. However, one or more other types of storage media may be included in accordance with aspects of a wide variety of embodiments.

Computer system 110 is coupled to storage controller 120 through data connections 101. However, in some embodiments computer system 110 includes storage controller 120 as a component and/or a sub-system. Computer system 110 may be any suitable computer device such as a computer, a laptop computer, a tablet device, a wearable computing device, a netbook, an internet kiosk, a personal digital assistant, a mobile phone, a smart phone, a gaming device, a computer server, or any other computing device. Computer system 110 is sometimes called a host or host system. In some embodiments, computer system 110 includes one or more processors, one or more types of memory, a display and/or other user interface components such as a keyboard, a touch screen display, a mouse, a track-pad, a digital camera and/or any number of supplemental devices to add functionality.

Storage medium 130 is coupled to storage controller 120 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 120 and storage medium 130 are included in the same device as components thereof. Furthermore, in some implementations storage controller 120 and storage medium 130 are embedded in a host device, such as a mobile device, tablet, other computer or computer controlled device, and the methods described herein are performed by the embedded storage controller. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers.

In some embodiments, storage medium 130 comprises persistent memory (e.g., non-volatile memory such as flash memory), and storage medium 130 includes a subset or a superset of the following data structures or data regions: persistent key-map 132; log stream 134; and datastore 136. In some embodiments, datastore 136 comprises one or more NVM devices such as magnetic disk storage device(s), optical disk storage device(s), flash memory device(s), 3D memory device(s), or other non-volatile solid state storage device(s). Storage medium 130 and its included data structures or data regions (e.g., persistent key-map 132, log stream 134, and datastore 136) are described below in more detail with reference to FIG. 2B.

In some embodiments, storage medium 130 is divided into a number of addressable and individually selectable blocks (sometimes also herein called "slabs"). In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

For example, one block comprises a predetermined number of pages, for example, 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 130.

In some embodiments, storage controller 120 includes a management module 140, an input buffer 123, an output buffer 124, an error control module 125 and a storage medium interface (I/O) 128. Storage controller 120 may include various additional features that have not been illustrated for the sake of brevity and so as not to obscure more pertinent features of the example embodiments disclosed herein, and that a different arrangement of features may be possible. Input buffer 123 and output buffer 124 provide an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 140 includes one or more processing units (CPU(s), also sometimes called one or more processors) 122 configured to execute instructions in one or more programs (e.g., stored in memory 302 (FIG. 3) of management module 140) and in-memory 144. In some embodiments, one or more CPUs 142 are shared by one or more components within, and in some cases, beyond the function of storage controller 120. In some embodiments, in-memory 144 comprises a portion of the memory associated with management module 140, and in-memory 144 comprises one or more volatile memory devices. For example, the one or more volatile memory devices comprising in-memory 144 include high-speed random access memory such as DRAM, SRAM, DDR RAM, or other random access solid state memory devices. Management module 140 is coupled to input buffer 123, output buffer 124 (connection not shown), error control module 125 and storage medium I/O 128 in order to coordinate the operation of these components.

Error control module 125 is coupled to storage medium I/O 128, input buffer 123 and output buffer 124. Error control module 125 is provided to limit the number of uncorrectable errors inadvertently introduced into data. In some embodiments, error control module 125 is executed in software by one or more CPUs 122 of management module 140, and, in other embodiments, error control module 125 is implemented in whole or in part using special purpose circuitry to perform encoding and decoding functions. To that end, error control module 125 includes an encoder 126 and a decoder 127. Encoder 126 encodes data by applying an error control code to produce a codeword, which is subsequently stored in storage medium 130.

When the encoded data (e.g., one or more codewords) is read from storage medium 130, decoder 127 applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, input buffer 123 receives data to be stored in storage medium 130 from computer system 110 (e.g., write data). The data held in input buffer 123 is made available to encoder 126, which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands on control line 111 to storage controller 120 requesting data from storage medium 130. Storage controller 120 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to decoder 127. If the decoding is successful, the decoded data is provided to output buffer 124, where the decoded data is made available to computer system 110. In some embodiments, if the decoding is not successful, storage controller 120 may resort to a number of remedial actions or provide an indication of an irresolvable error condition.

Figure 2A:
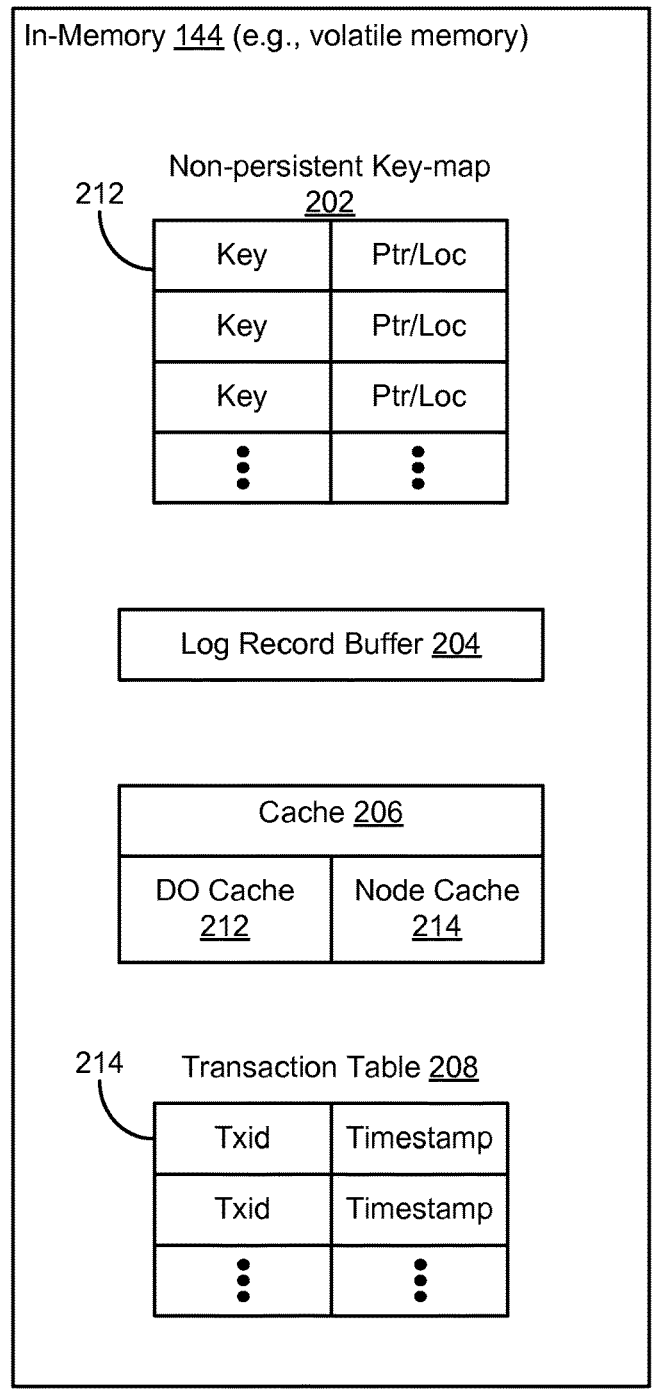
FIG. 2A is a block diagram illustrating data structures associated with a management module in accordance with some embodiments.

FIG. 2A is a block diagram illustrating data structures or data regions associated with management module 140 in accordance with some embodiments. In some embodiments, the data structures or data regions are stored in in-memory 144 of management module 140, which comprises one or more volatile memory devices. For example, the one or more volatile memory devices comprising in-memory 144 include high-speed random access memory such as DRAM, SRAM, DDR RAM, or other random access solid state memory devices. In some embodiments, in-memory 144 includes a subset or a superset of the following data structures or data regions: non-persistent key-map 202; log record buffer 204; cache 206; and transaction table 208.

In FIG. 2A, non-persistent key-map 202 includes a plurality of entries mapping keys to locations in datastore 136. For example, entry 212 maps respective key information associated with a data object stored in datastore 136 to location information. In some embodiments, the location information includes a pointer to a location in datastore 136 or a location in datastore 136. In some embodiments, the key information includes a unique key or information from which a unique key can be identified such as a shortened key and a location/length of a key prefix. In some embodiments, the location information includes an identifier number of a leaf node in a respective tiered data structure (sometimes called a first tiered data structure) of the one or more tiered data structures stored in datastore 136, where the data object associated with the key information is included in the leaf node. In some embodiments, the location information is an index number associated with a slab in datastore 136 that stores the leaf node to which the data object associated with the key information belongs.

For example, management module 140 receives, from computer system 110, a request to perform a transaction including two or more memory operations on datastore 136. In this example, a first memory operation includes replacing the value of a data object stored in datastore 136 that corresponds to a key with a new value (e.g., key 20, for data object 608-3, having a value of 77, shown in FIG. 6A). Continuing with this example, management module 140 locates the data object in datastore 136 associated with the first memory operation by mapping the key in non-persistent key-map 202 to location information pointing to or giving the location of the data object in datastore 136. For example, the key in non-persistent key-map 202 is mapped to an index number for a slab in datastore 136 that stores a leaf node that includes the data object corresponding to the key.

In FIG. 2A, log record buffer 204 includes one or more operation commit records associated with pending memory operations being performed on datastore 136. In some embodiments, an operation commit record is populated and stored in log record buffer 204 prior to the operation commit record being written to log stream 134 in storage medium 130. With reference to the above example, management module 140 populates an operation commit record for the first memory operation that includes a subset or a superset of the following: a transaction identifier associated with the request to perform the transaction; the key; location information pointing to the index number of the old slab in datastore 136 that stored the data object prior to the first memory operation; and location information pointing to the index number of the new slab in datastore 136 storing the data object after the first memory operation.

In FIG. 2A, cache 206 stores nodes and/or data objects retrieved from a respective tiered data structure of the one or more tiered data structures stored in datastore 136. In some embodiments, cache 206 optionally includes data object cache portion 212, storing data objects retrieved from datastore 136, and node cache portion 214, storing nodes retrieved from datastore 136. With respect to the example above, management module 140 stores in node cache portion 214 of cache 206 nodes of a respective tiered data structure that were traversed in order to locate the data object corresponding to the key, and management module 140 also stores in data object cache portion 212 of cache 206 the data object corresponding to the key.

In FIG. 2A, transaction table 208 stores entries associated with each request to perform a transaction received from a requestor (e.g., computer system 110, FIG. 1). With reference to the above example, in response to receiving the request from computer system 110 to perform a transaction including two or more memory operations on datastore 136, management module 140 stores entry 214 in transaction table 208. In some embodiments, a respective entry in transaction table 208 includes a unique transaction identifier and a timestamp corresponding to the time the transaction request was received or the time the entry was created. In some embodiments, when the transaction is complete and after a transaction commit record is written to log stream 134, management module 140 deletes the entry corresponding to the complete transaction from transaction table 208.

Figure 2B:
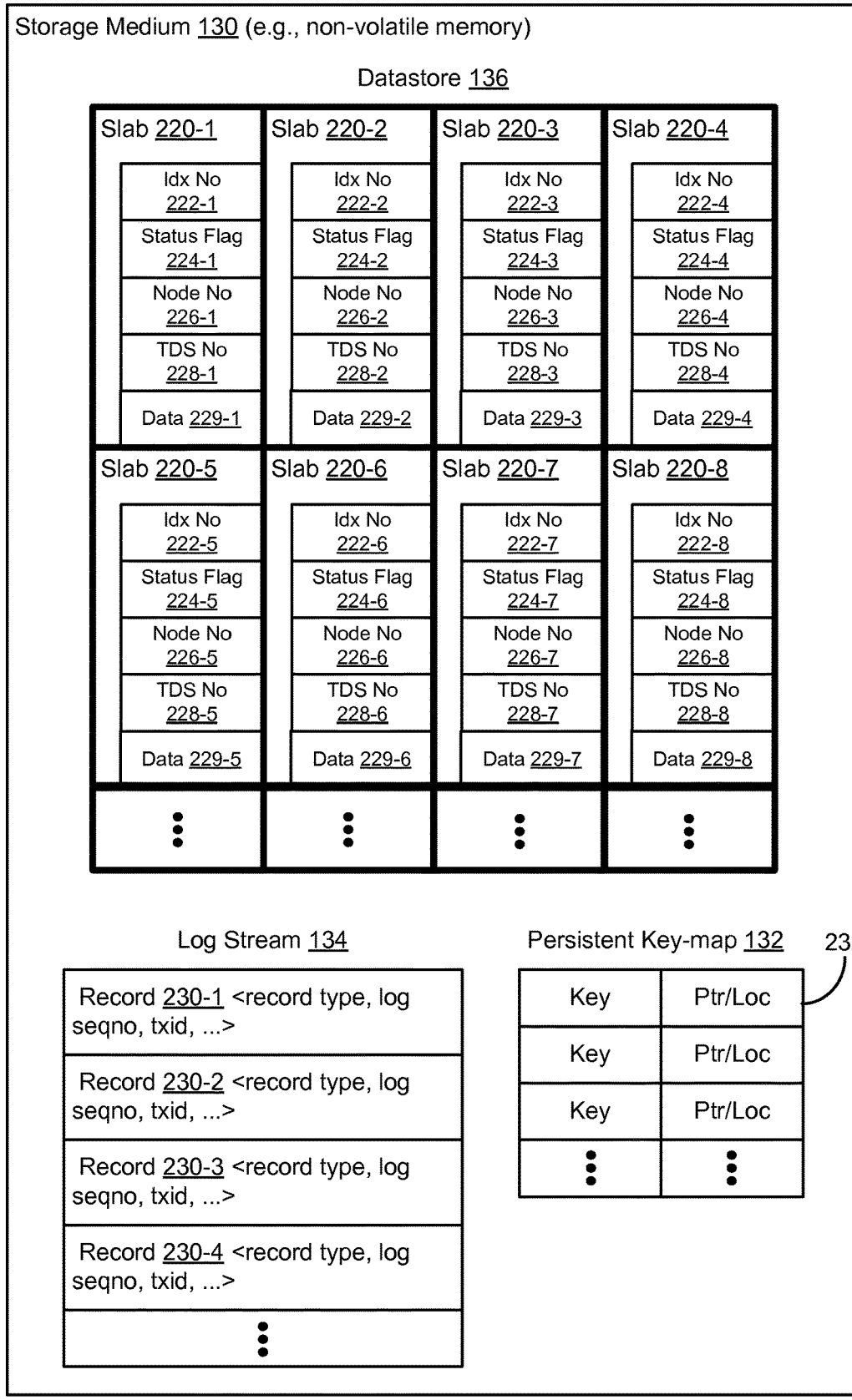
FIG. 2B is a block diagram illustrating data structures associated with a storage medium in accordance with some embodiments.

FIG. 2B is a block diagram illustrating data structures or data regions stored in storage medium 130 in accordance with some embodiments. In some embodiments, storage medium 130 includes one or more non-volatile memory devices such as magnetic disk storage device(s), optical disk storage device(s), flash memory device(s), 3D memory device(s), or other non-volatile solid state storage device(s). In some embodiments, storage medium 130 includes a subset or a superset of the following data structures or data regions: datastore 136; persistent key-map 132; and log stream 134.

In FIG. 2B, datastore 136 includes a plurality of slabs 220. In some embodiments, slabs 220 are all a predetermined size. For example, slabs 220 are each 8 KB in size. Alternatively, in some embodiments, slabs 220 are one of a number of predetermined sizes. In one example, slabs 220 are allocated in four predetermined sizes: 8 KB, 16 KB, 32 KB, and 64 KB. In some embodiments, datastore 136 is organized into one or more tiered data structures. In some embodiments, a respective tiered data structure ("TDS") includes a plurality of nodes with one root node, zero or more internal nodes, and one or more leaf nodes. Each of the nodes (e.g., root, internal, and leaf nodes) comprising the respective TDS is stored in a separate slab 220, and each of the leaf nodes of the respective TDS includes one or more data objects.

In FIG. 2B, each of slabs 220 at least includes a unique index number 222 and a status flag 224 indicating whether the slab is free (i.e., neither occupied by nor storing a node) or occupied by a node of one of the one or more tiered data structures stored in datastore 136. In some embodiments, a respective free slab 220 only includes a unique index number 222 and a status flag 224 indicating that respective free slab 220 is free. In some embodiments, a respective occupied slab 220 further includes a node number 226 of a respective node in a respective TDS of the one or more tiered data structures that is stored at respective occupied slab 220, a tiered data structure number 228 corresponding to the respective TDS of the one or more tiered data structures that includes the respective node, and data 229.

In some embodiments, data 229 includes one or more data objects included in the respective node. In some embodiments, a respective data object comprises key information and a corresponding value. In some embodiments, the key information includes a unique key or information from which a unique key can be identified such as a shortened key and a location/length of a key prefix. In some embodiments, the corresponding value is data. In some embodiments, the corresponding value is a pointer identifying a location where the data is stored. In some embodiments, the one or more data objects included in the respective node are contiguous data objects where the unique key information for a respective contiguous data object is adjacent or substantially adjacent to the corresponding value for the respective contiguous data object or other data for the respective contiguous data object that is adjacent to the corresponding value. In some embodiments, the one or more data objects included in the respective node are split data objects where the unique key information for a respective split data object is separated from the corresponding value for the respective split data object by other data for other data objects and the unique key information for the respective split data object is stored with a pointer that identifies a location of the corresponding value for the respective split data object.

In FIG. 2B, persistent key-map 132 includes a plurality of entries mapping keys to locations in datastore 136. For example, entry 232 maps respective key information associated with a data object stored in datastore 136 to location information. In some embodiments, the location information includes a pointer to a location in datastore 136 or a location in datastore 136. In some embodiments, the key information includes a unique key or information from which a unique key can be identified such as a shortened key and a location/length of a key prefix. In some embodiments, the location information includes an identifier number of a leaf node in a respective tiered data structure of the one or more tiered data structures stored in datastore 136, where the data object associated with the key information is included in the leaf node. In some embodiments, the location information is an index number associated with a slab in datastore 136 that stores the leaf node to which the data object associated with the key information belongs.

In FIG. 2B, log stream 134 includes a plurality of records 230 (e.g., 230-1, 230-2, 230-3, 230-4, . . . ). A respective record 230 is associated with a record type: start transaction record, transaction commit record, or operation commit record. An operation commit record is associated with one of three memory operations types performed on datastore 126: replacement, deletion, or insertion. A respective record 230 at least includes the record type, a unique sequence number (i.e., seqno), and a transaction identifier (i.e., txid). In some embodiments, unique sequence numbers are assigned to records 230 in monotonically ascending order.

In some embodiments, records 230 each corresponds to a transaction that is associated with a transaction identifier. In some embodiments, a respective complete transaction corresponds to a first start transaction record in log stream 134 that includes a first transaction identifier and a first transaction commit record in log stream 134 that includes the first transaction identifier. In some embodiments, the respective complete transaction also corresponds to one or more operation commit records that include the first transaction identifier. In some embodiments, a respective incomplete transaction corresponds to a second start transaction record in log stream 134 that includes a second transaction identifier for which there is not a corresponding transaction commit record in log stream 134 that includes the second transaction identifier. In some embodiments, the respective incomplete transaction also corresponds to zero or more operation commit records that include the second transaction identifier.

In some embodiments, a respective start transaction record in log stream 134 includes a unique log sequence number and a transaction identifier (e.g., corresponding to the transaction to which the respective start transaction record belongs). In some embodiments, a respective transaction commit record in log stream 134 includes a unique log sequence number and a transaction identifier (e.g., corresponding to the transaction to which the respective transaction commit record belongs).

In some embodiments, a first example operation commit record in log stream 134, that corresponds to a replacement operation of a first data object, includes a unique log sequence number, a transaction identifier (e.g., corresponding to the transaction to which the first operation commit record belongs), key information corresponding to the first data object, a pointer to the old location of the first data object in datastore 136 (e.g., the slab storing the leaf node with the old first data object prior to the replacement operation), and a pointer to the new location of the first data object in datastore 136 (e.g., the slab storing the leaf node with the new first data object after the replacement operation). In some embodiments, a second example operation commit record in log stream 134, that corresponds to a deletion operation of a second data object, includes a unique log sequence number, a transaction identifier (e.g., corresponding to the transaction to which the second operation commit record belongs), key information corresponding to the second data object, a pointer to the old location of the second data object (e.g., the slab storing the leaf node with the old second data object prior to the deletion operation), and a pointer to a new location in datastore 136 (e.g., the slab storing the leaf node with the new second data object with a tombstone after the deletion operation). In some embodiments, a third example operation commit record in log stream 134, that corresponds to an insertion operation of a third data object, includes a unique log sequence number, a transaction identifier (e.g., corresponding to the transaction to which the third operation commit record belongs), key information corresponding to the third data object, a pointer to old location of the third data object in datastore 136 (e.g., the slab storing the leaf node with the new third data object after the insertion operation).

Figure 3:
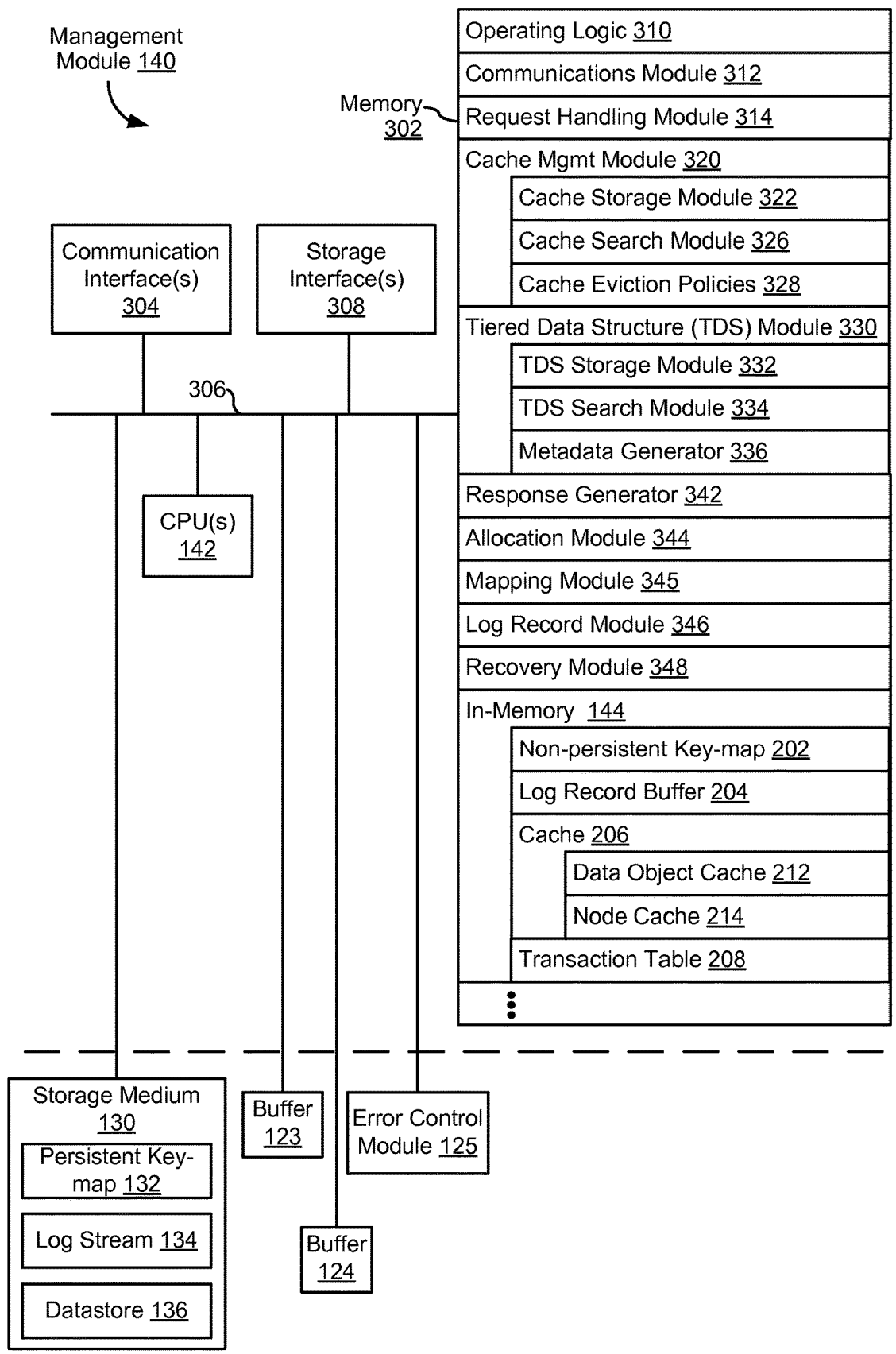
FIG. 3 is a block diagram of a memory management module in accordance with some embodiments.

FIG. 3 is a block diagram illustrating an implementation of management module 140 in accordance with some embodiments. Management module 140 typically includes one or more processors 142 (also sometimes called CPU(s), processing unit(s), microprocessor(s), microcontroller(s), or core(s)) for executing modules, programs and/or instructions stored in memory 302 and thereby performing processing operations, memory 302, one or more communication interfaces 304, one or more storage interfaces 308, and one or more communication buses 306 for interconnecting these components. One or more communication buses 306 optionally include circuitry (sometimes called a chipset) that interconnects and controls communications between system components. In some embodiments, management module 140 is operatively coupled with storage medium 130 by one or more communication buses 306 and one or more storage interfaces 308 (e.g., storage medium I/O 128 such as a PCI bus, PCIe bus, or the like). In some embodiments, management module 140 is operatively coupled with internal requestor(s) and/or external requestors (e.g., computer system 110) by one or more communication buses 306 and one or more communication interfaces 304. Memory 302 includes one or more semiconductor memory devices such as high-speed random access memory (e.g., DRAM, SRAM, DDR RAM or other random access solid state memory devices), and may include non-volatile memory (e.g., one or more NVM devices such as magnetic disk storage device(s), optical disk storage device(s), flash memory device(s), 3D memory device(s), or other non-volatile solid state storage device(s)). Memory 302 optionally includes one or more storage devices remotely located from one or more processors 142. Memory 302, or alternately the non-volatile memory device(s) within memory 302, comprises a non-transitory computer readable storage medium. In some embodiments, memory 302, or the computer readable storage medium of memory 302 stores the following programs, modules, and data structures, or a subset thereof:

- operating logic 310 includes procedures for handling various basic system services and for performing hardware dependent tasks;
- communications module 312 that is used for communicating with other computer systems or computer components (e.g., one or more communication interface 304 and one or more storage interfaces 308);
- request handling module 314 for detecting and processing requests received from internal requestors and/or external requestors (e.g., computer system 110, FIG. 1);
- cache management module 320 for storing and retrieving information (e.g., data objects and nodes) from cache 206, optionally including:
  - cache storage module 322 for storing information (e.g., data objects and nodes) in cache 206;
  - cache search module 324 for performing searches based on requested information (e.g., a search for a requested data object or retrieving a node for use in searching for a requested data object) in cache 206; and
  - cache eviction policies 326 for determining which information (e.g., data objects and/or nodes) to evict from cache 206;
- tiered data structure ("TDS") module 330 for storing and retrieving information (e.g., data objects and nodes) within one or more tiered data structures stored in datastore 136 (e.g., TDS 400, FIG. 4A), optionally including:
  - TDS storage module 332 for performing memory operations (e.g., replacement, deletion, and insertion operations) by writing information (e.g., inserting a new data object or replacing/updating the value of a data object) to leaf nodes stored in cache 206 or deleting information (e.g., deleting a data object and/or replacing the value of a data object with a tombstone) from leaf nodes stored in cache 206 so as to create new/modified leaf nodes and writing the new/modified leaf nodes to datastore 136;
  - TDS search module 334 for searching through the one or more tiered data structures for requested data (e.g., locating and retrieving a data object or node corresponding to a memory operation in a transaction requested by a requestor);
  - metadata generator 336 for generating metadata for data objects that are stored in leaf nodes of the one or more tiered data structures, where the metadata enables the data objects to be located with TDS search module 334 in response to transaction requests from requestors;
- response generator 342 for generating responses to requests from internal and/or external requestors based on data retrieved in response to the requests;
- allocation module 344 for allocating free slabs in datastore 136 for which to write a new/modified leaf node of a TDS;
- mapping module 345 for updating non-persistent key-map 202 and persistent key-map 132;
- log record module 346 for managing zero or more pending operation commit records in log record buffer 204 and for writing an operation commit records from log record buffer 204 to log stream 134;
- recovery module 348 for performing a recovery process in response to detecting a trigger event; and
- in-memory 144 storing information in volatile memory, including but not limited to the following data structures:
  - non-persistent key-map 202 for mapping key information to location information (e.g., a slab index number) associated with the location of a data object in datastore 136 that corresponds to the key information (and, in turn, the location of a leaf node to which the data object belongs);
  - log record buffer 204 storing one or more operation commit records associated with pending memory operations being performed on datastore 136;
  - cache 206 storing nodes and/or data objects retrieved from the one or more tiered data structures stored in datastore 136, optionally including:
    - data object cache portion 212 storing zero or more data objects retrieved from the one or more tiered data structures stored in datastore 136; and
    - node cache portion 214 storing zero or more nodes retrieved from the one or more tiered data structures stored in datastore 136; and
  - transaction table 208 storing entries associated with each request to perform a transaction received from a requestor (e.g., computer system 110, FIG. 1).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 302 may store a subset of the modules and data structures identified above. Furthermore, memory 302 may store additional modules and data structures not described above. In some embodiments, the programs, modules, and data structures stored in memory 302, or the computer readable storage medium of memory 302, provide instructions for implementing respective operations in the methods described below with reference to FIGS. 7A-7G and/or 8A-8B.

Although FIG. 3 shows management module 140, FIG. 3 is intended more as a functional description of the various features which may be present in a non-volatile computer system than as a structural schematic of the embodiments described herein. In practice, and as recognized by those of ordinary skill in the art, items shown separately could be combined and some items could be separated.

Figure 4A:
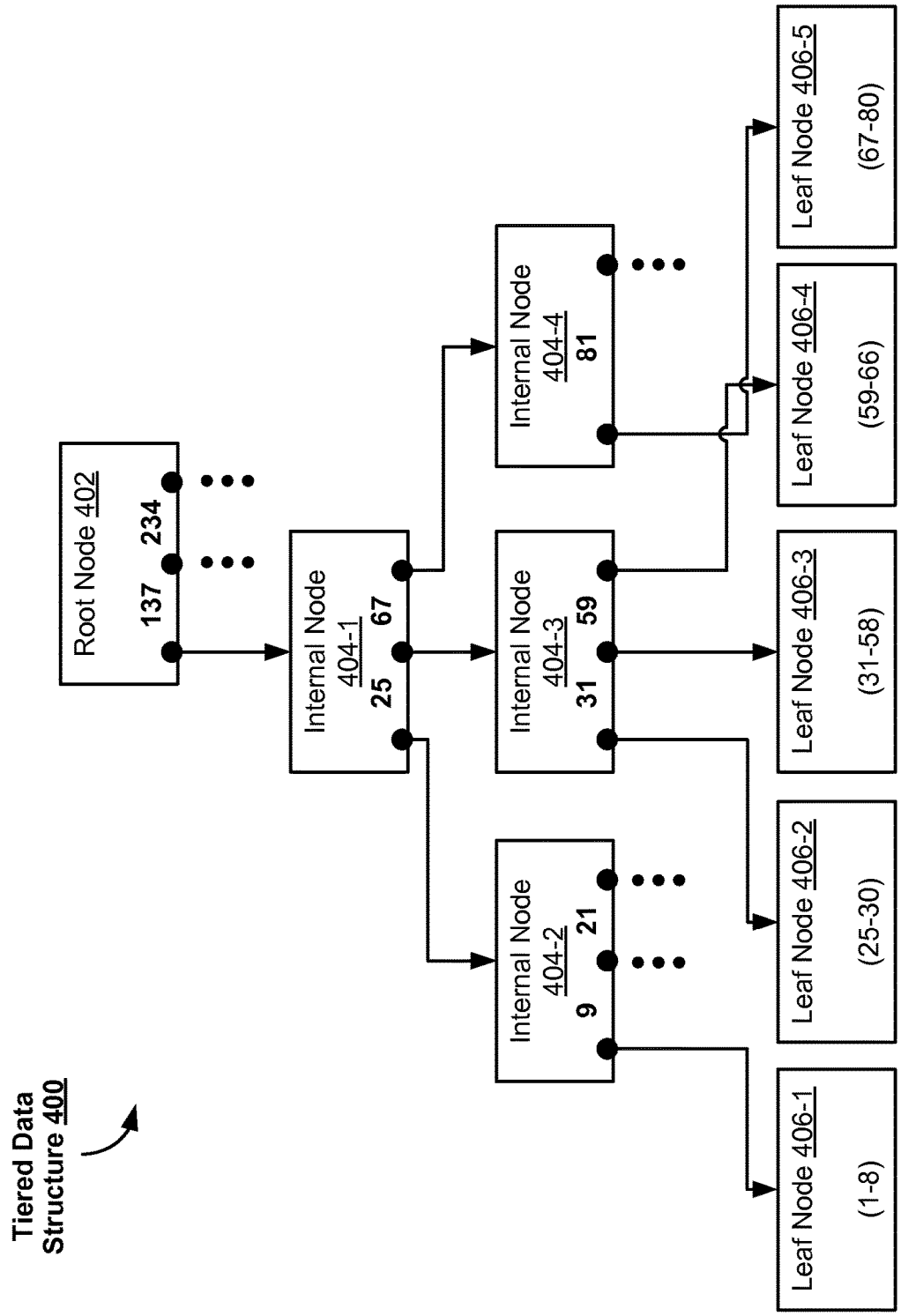
FIG. 4A illustrates an example of a tiered data structure in accordance with some embodiments.

FIG. 4A illustrates an example of a tiered data structure in accordance with some embodiments. Tiered data structure 400 includes a plurality of nodes. The plurality of nodes are organized in a tiered structure in which each respective node is connected to one or more other nodes in levels (tiers) above and/or below the respective node. A parent node for a respective node in tiered data structure 400 is a node that is a level (tier) above the respective node in tiered data structure 400 and refers to the respective node. A child node for a respective node in tiered data structure 400 is a node that is a level (tier) below the respective node in tiered data structure 400 and refers to the respective node. Two nodes are at the same level if they have a same number of nodes to traverse to reach root node 402. Root node 402 is an external node that has no parent node, typically there is only one root node for tiered data structure 400. Internal nodes 404 are nodes that have both a parent node and one or more child nodes and are thus internal to the tiered data structure. Leaf nodes 406 are nodes that do not have child nodes and are thus "external" nodes. Root node 402 and internal nodes 404 include references that indicate which child nodes are associated with a particular range of data. For example, root node 402 in FIG. 4A indicates that internal node 404-1 is associated with data with keys between 1 and 136. Internal node 404-1 indicates that: internal node 404-2 is associated with data objects having keys between 1 and 24; internal node 404-3 is associated with data objects having keys between 25 and 66; and internal node 404-4 is associated with data objects having keys between 67 and 136. Similarly, internal node 404-3 indicates that: leaf node 406-2 includes data with keys between 25 and 30; leaf node 406-3 includes data with keys between 31 and 58; and leaf node 406-4 includes data with keys between 59 and 66, and so on.

Navigating the tiered data structure typically, but optionally, relies on the assumption that keys are always sorted in a predefined key order (e.g., monotonically ascending), so that a node that is associated with data having keys between a first value and a second value is associated with all data in the tiered data structure that has keys between the first value and the second value. In some embodiments, each leaf node has a maximum size and when the leaf node exceeds the maximum size, the leaf node is split into two leaf nodes. In some embodiments, each leaf node has a minimum size and when a leaf node is below the minimum size, the leaf node is combined with one or more other leaf nodes. In some embodiments, each non-leaf node (e.g., root node or internal node) has a maximum number of child nodes, and when splitting of a leaf node results in a non-leaf node having more than the maximum number of child nodes, the non-leaf node is split to accommodate the extra child nodes. In some embodiments, each non-leaf node (e.g., root node or internal node) has a minimum number of child nodes, and when a combining two or more leaf nodes results in a non-leaf node having less than the minimum number of child nodes, the non-leaf node is combined with one or more other non-leaf nodes to accommodate the reduced number of child nodes. The tiered data structure may additionally conform to some or all of the rules associated with B–Trees, B+Trees, B*Trees or other tiered data structures.

Figure 4B:
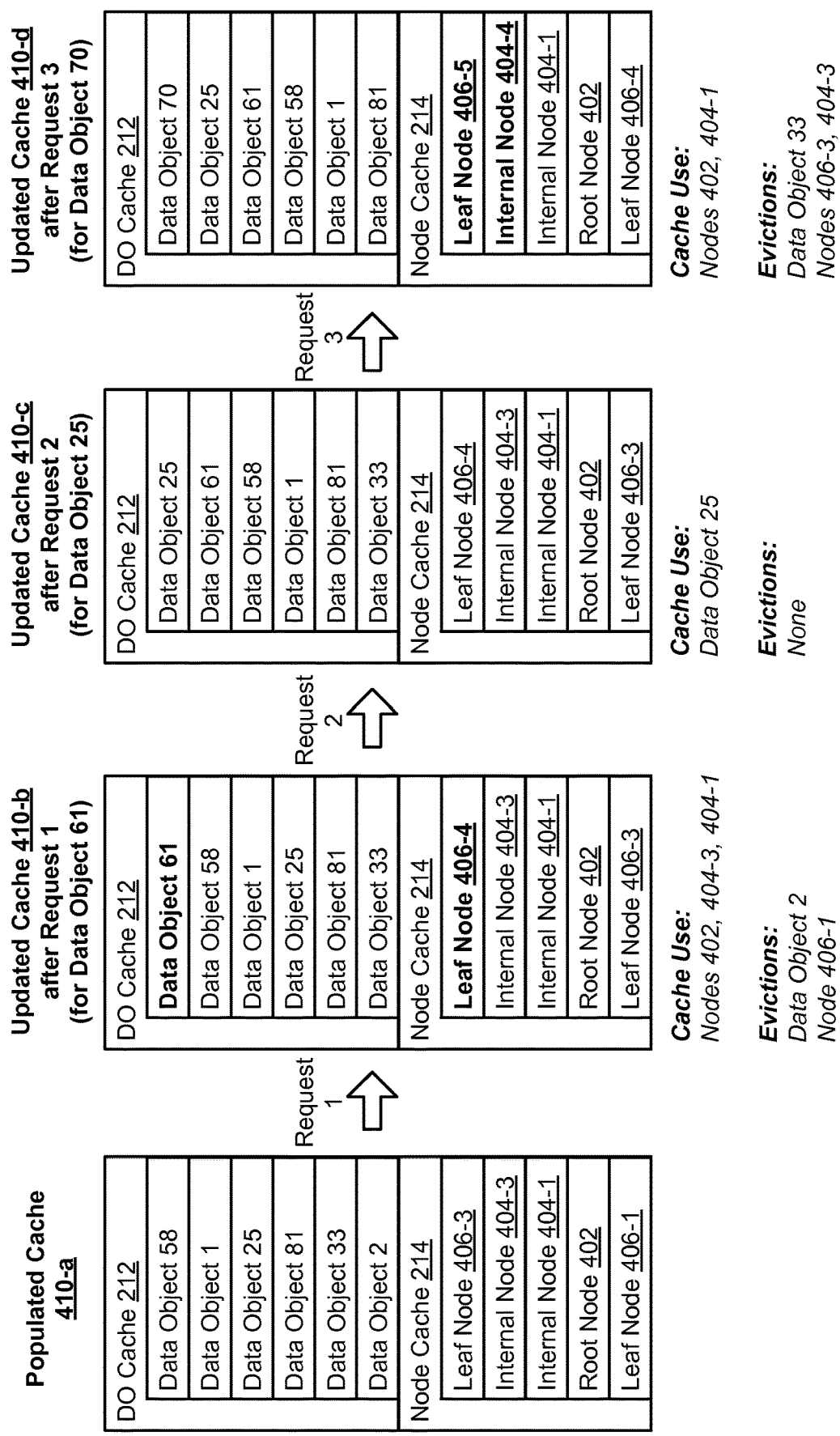
FIGS. 4B-4E illustrate the performance of example operations on the example tiered data structure in FIG. 4A in accordance with some embodiments.

FIG. 4B illustrates an example of efficient cache utilization in a tiered data structure in accordance with some embodiments. In FIG. 4B, populated cache 410-a is an example of cache 206 from FIG. 2A that is populated with one or more data objects and one or more nodes that were retrieved to respond to prior requests for data objects by one or more internal or external requestors. For example, one of the prior requests was a request for data object 58, so management module 140 traversed through tiered data structure 400 in FIG. 4A by traversing, in sequence, root node 402, internal node 404-1, internal node 404-3 to identify and retrieve leaf node 406-3, which includes data object 58. After retrieving data object 58, data object 58 is cached in data object cache portion 212 and the traversed nodes are cached in node cache portion 214. In FIG. 4B, the data objects in the populated cache 410 are shown in order of "staleness" where more stale data objects are near the bottom of data object cache portion 212 and less stale (e.g., fresher) data objects are near the top of data object cache portion 212, as data objects are refreshed, they are reordered in the cache to represent their staleness, even though the data objects are, in many circumstances, not actually moved within the cache. Similarly, in FIG. 4B, the nodes in the populated cache 410 are shown in order of "staleness" where more stale nodes are near the bottom of node cache portion 214 and less stale (e.g., fresher) data objects are near the top of node cache portion 214, as nodes are refreshed, they are reordered in the cache to represent their staleness, even though nodes are, in many circumstances, not actually moved within the cache.

In FIG. 4B, in response to a request (e.g., "request 1") for data object 61, management module 140 determines that data object 61 is not in data object cache portion 212 in populated cache 410-a. Subsequently, management module 140 traverses through tiered data structure 400 in FIG. 4A by traversing, in sequence, root node 402, internal node 404-1, internal node 404-3 to identify and retrieve leaf node 406-4, which includes data object 61. When traversing tiered data structure 400, management module 140 is able to use a number of cached nodes to improve response time (e.g., by using root node 402, internal node 404-1 and internal node 404-3 to determine that leaf node 406-4 has be retrieved from tiered data structure 400). Management module 140 caches the traversed nodes in node cache portion 214 and caches data object 61 in data object cache portion 212 as shown in updated cache 410-b in FIG. 4B. In order to make room for the traversed nodes and retrieved data object, data object 2 and leaf node 406-1 are evicted from cache 206 in accordance with a cache eviction policy, as shown in updated cache 410-b in FIG. 4B.

In FIG. 4B, in response to a request (e.g., "request 2") for data object 25, management module 140 determines that data object 25 is in data object cache portion 212 in populated cache 410-b. As data object 25 is already in data object cache portion 212, management module 140 does not traverse tiered data structure 400 to retrieve data object 25, because data object 25 is retrieved from cache 206. In conjunction with being retrieved, data object 25 is refreshed in data object cache portion 212 so that it is less stale than object 61 rather than being more stale than data object 61, as shown in updated cache 410-c in FIG. 4B. In some embodiments, data object 25 is identified in data object cache portion 212 using a hash table to locate a portion of data object cache portion 212 that includes data object 25. As no new data objects or nodes were added to cache 206, no data objects or nodes are evicted from cache 206.

In FIG. 4B, in response to a request (e.g., "request 3") for data object 70, management module 140 determines that data object 70 is not in data object cache portion 212 in populated cache 410-c. Subsequently, management module 140 traverses through tiered data structure 400 in FIG. 4A by traversing, in sequence, root node 402, internal node 404-1, internal node 404-4 to identify and retrieve leaf node 406-5, which includes data object 70. When traversing tiered data structure 400, management module 140 is able to use a number of cached nodes to improve response time (e.g., by using root node 402 and internal node 404-1 to determine that internal node 404-4 and leaf node 406-5 have to be retrieved from tiered data structure 400). Management module 140 caches the traversed nodes in node cache portion 214 and caches data object 70 in data object cache portion 212 as shown in updated cache 410-d in FIG. 4B. In order to make room for the traversed nodes and retrieved data object, data object 33, internal node 404-3, and leaf node 406-3 are evicted from cache 206 in accordance with a cache eviction policy, as shown in updated cache 410-d in FIG. 4B.

While the preceding examples have been shown with a small number of data objects and nodes, it should be understood that in a typical cache, a much larger number of data objects and nodes are stored in the cache and similar processes are performed. For example, in an 2 GB DRAM cache with a 1 GB data object cache portion, a 1 GB node cache portion, an average node size of 8 KB and an average data object size of 1 KB, the data object cache portion would hold approximately 1 million data objects and the node cache portion would hold approximately 250,000 nodes. In some embodiments, only internal nodes 404 are cached in node cache portion 214. In some embodiments, root node 402 and leaf nodes 406 are cached in node cache portion 214, but most leaf nodes are quickly evicted from node cache portion 214, while internal nodes 404 are frequently used and are thus frequently refreshed in cache 206, so that node cache portion 214 includes primarily internal nodes 404 during normal operation (e.g., 50% or more of the capacity of node cache portion 214 is occupied by internal nodes). Using a data object cache in addition to a node cache instead of solely using a node cache improves the performance of the cache by increasing the likelihood that a requested data object will be available from the cache. For example, using a 1 GB data object cache in addition to a 1 GB node cache approximately quadruples the object capacity of the cache as compared with a 2 GB node cache.

Figure 4C:
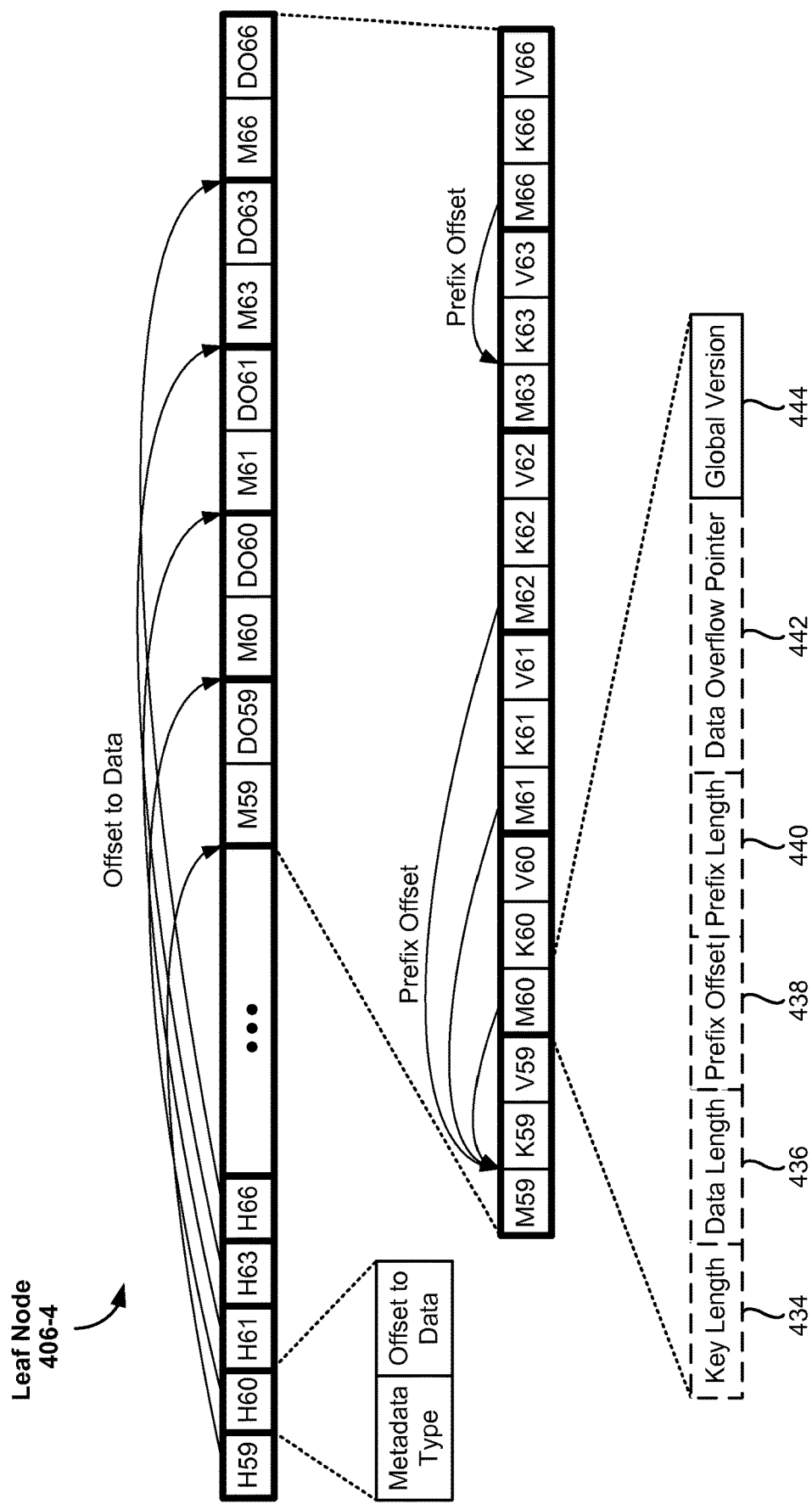
Figure 4D:
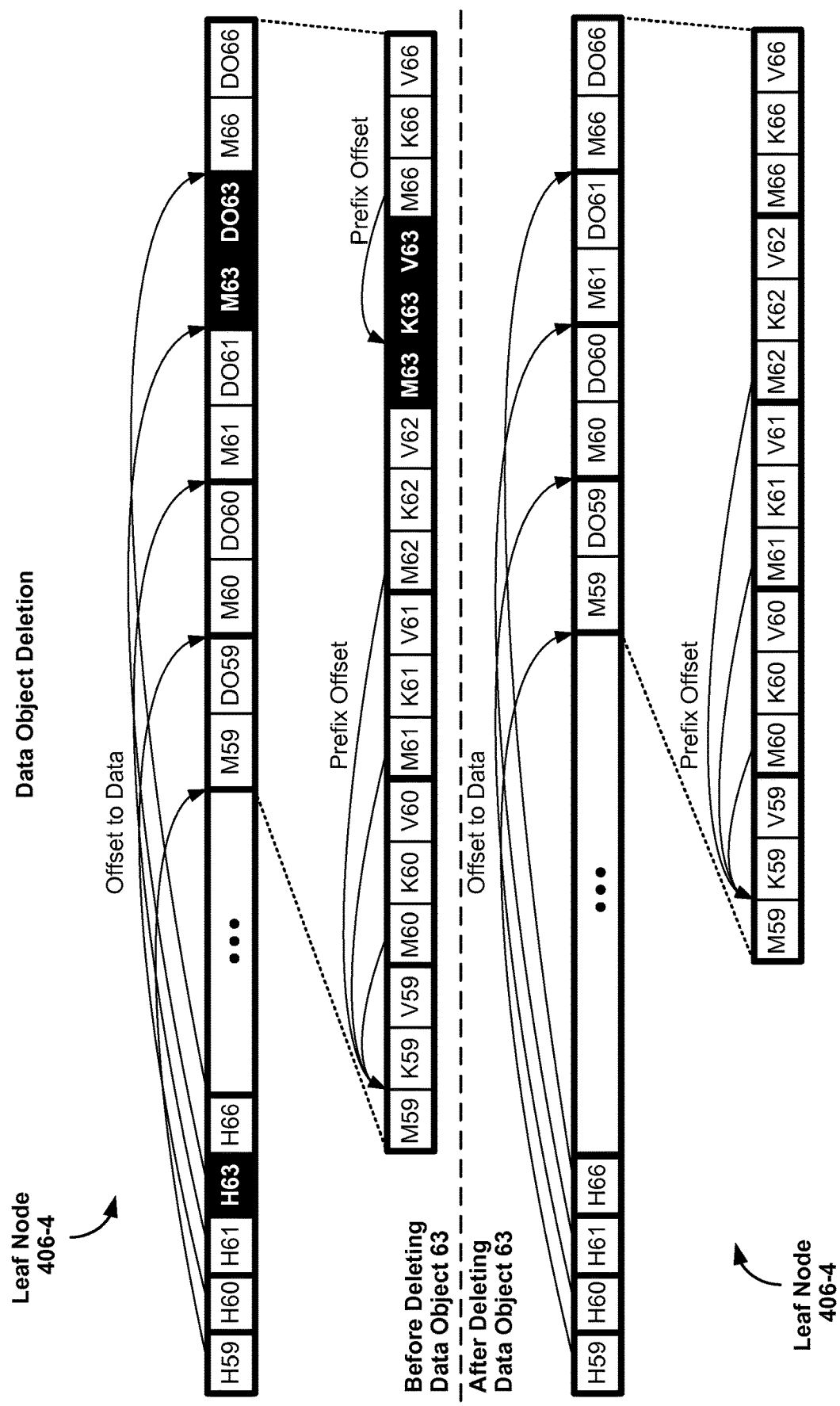
Figure 4E:
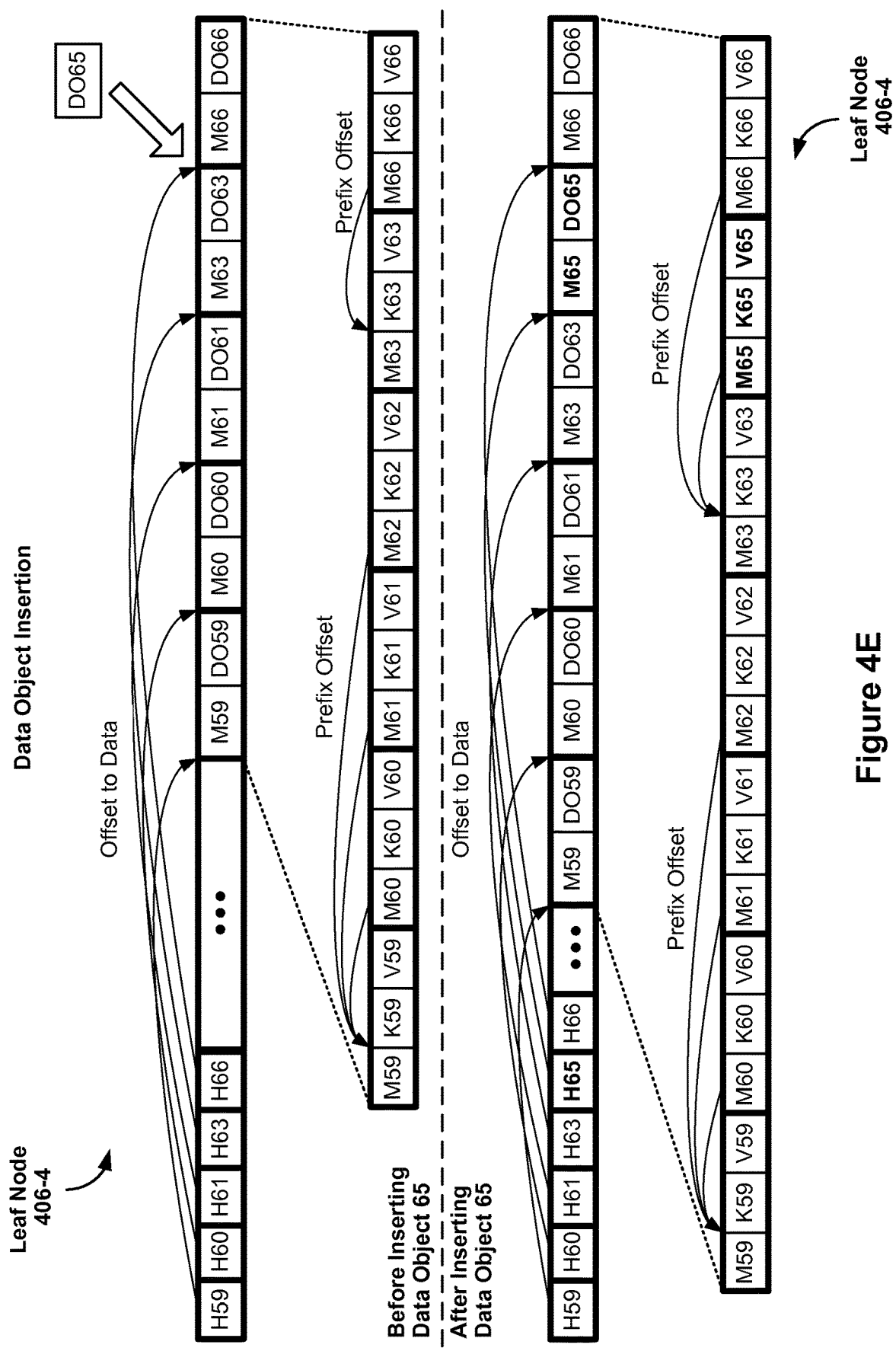

FIGS. 4C-4E illustrate examples of compaction of information in a tiered data structure in accordance with some embodiments. FIG. 4C shows an example leaf node 406-4 from tiered data structure 400 in FIG. 4A. Leaf node 406-4 includes data for data objects 59, 60, 61, 63 and 66. For each of these data objects (e.g., DO59, DO60, DO61, DO63, DO66), leaf node 406-4 includes a corresponding fixed length header (H59, H60, H61, H63, and H66, respectively) and corresponding metadata (e.g., M59, M60, M61, M63, and M66, respectively). The fixed length headers include a metadata type in embodiments where there are a plurality of different metadata types for metadata of the data objects, and an offset (e.g., a number of bytes) from a particular portion of the leaf node (e.g., a beginning or an end of the leaf node) to the location of the data object in the leaf node. The fixed length headers each have the same length, and can, thus, be used to perform a binary search through data objects in the leaf node. In some embodiments, the fixed length headers are packed to the left in the leaf node and the data objects and metadata are packed to the right in the leaf node, so that there is a growing area in the middle of the leaf node that increases or decreases in size as additional data objects are added to, or removed from, the leaf node. Packing the headers and data objects in different directions enables both the headers and the data objects to have fixed points to refer to when the data objects and nodes are identified by offsets (e.g., the headers can be identified based on an offset from a left edge of the leaf node, and the data objects and metadata can be identified based on an offset from a right edge of the leaf node).

The data objects (e.g., DO59, DO60, DO61, DO63, DO66) in leaf node 406-4 each include unique key information (e.g., K59, K60, K61, K63, K66, respectively) and a corresponding value (e.g., V59, V60, V61, V63, V66, respectively). In some embodiments, the unique key information for some of the data objects is a full unique key for the data objects, while the unique key information for other data objects is a portion of a unique key for the data objects, and the metadata for these data objects indicates a location of a key prefix that is shared with one or more other data objects that can be used to recreate the unique key for the data object in combination with the unique key information stored with the data object. For example, data object 59 includes a full unique key in unique key information K59, while data object 60 includes a partial key in unique key information K60 and metadata M60 associated with data object 60 is used to identify a location of a key prefix (e.g., a portion of K59 that serves as a key prefix for data object 60 and, in combination with unique key information K60 can be used to determine a unique key for data object 60). Similarly, data object 61 includes a partial key in unique key information K61 and metadata M61 associated with data object 61 is used to identify a location of a key prefix (e.g., a portion of K59 that serves as a key prefix for data object 61 and, in combination with unique key information K61 can be used to determine a unique key for data object 61).

Metadata (e.g., M59, M60, M61, M63, and M66) for a corresponding data object optionally includes one or more of the following: key length information 434 indicating a length of unique key information associated with the corresponding data object; data length information 436 indicating a length of the corresponding data object or the value of the corresponding data object; prefix offset information 438 that indicates a location of a start of a key prefix for the corresponding data object; prefix length information 440 that indicates a length of the key prefix for the corresponding data object; data overflow pointer 442 that indicates a location of data for the corresponding data object that is too large to fit in the leaf node; and global version information 444 that indicates a version of the corresponding data object. In some embodiments, global version information 444 includes information identifying the order of each change to data objects in tiered data structure 400 (FIG. 4A) or data objects in datastore 136 (FIGS. 1 and 2B), which can be used to determine whether a change to a first data object occurred before or after a change to a second, different, data object.

In some embodiments different data objects have different types of metadata with different lengths, sometimes called variable-length metadata. Using variable length metadata enables shorter metadata to be used in many situations, and using shorter metadata increases the number of data objects that can be stored in a leaf node. As one example, there are four types of metadata, type-0 metadata, type-1 metadata, type-2 metadata and type-3 metadata. Type-0 metadata is used when the data object has the same key prefix, key length, and data length as the preceding data object, in which case the metadata includes only global version information 444 (e.g., represented as a 64-bit unsigned integer), and other information such as key prefix location, data length and key length are determined by looking at the metadata corresponding to the preceding data object. Type-1 metadata is used when the data object has a key length and data length that can each fit in a single byte and data that fits in the leaf node, in which case the metadata includes key length information 434 (e.g., represented as an 8-bit unsigned integer), data length information 436 (e.g., represented as an 8-bit unsigned integer), prefix offset information 438 (e.g., represented as a 16-bit unsigned integer), prefix length information 440 (e.g., represented as an 8-bit unsigned integer), and global version information 444 (e.g., represented as a 64-bit unsigned integer). Type-2 metadata is used when the data object has a key length and data length that can each fit in two bytes, in which case the metadata includes key length information 434 (e.g., represented as a 16-bit unsigned integer), data length information 436 (e.g., represented as a 16-bit unsigned integer), prefix offset information 438 (e.g., represented as a 16-bit unsigned integer), prefix length information 440 (e.g., represented as a 16-bit unsigned integer), data overflow pointer 442 (e.g., represented as a 64-bit unsigned integer), and global version information 444 (e.g., represented as a 64-bit unsigned integer). Type-3 metadata is used for data objects that do not fit in the other categories, in which case the metadata includes key length information 434 (e.g., represented as a 32-bit unsigned integer), data length information 436 (e.g., represented as a 32-bit unsigned integer), prefix offset information 438 (e.g., represented as a 16-bit unsigned integer), prefix length information 440 (e.g., represented as a 32-bit unsigned integer), data overflow pointer 442 (e.g., represented as a 64-bit unsigned integer), and global version information 444 (e.g., represented as a 64-bit unsigned integer). Type-3 metadata is the most flexible metadata type, but is also the largest of these four metadata types. Enabling the use of other types of metadata (e.g., type-0, type-1, or type-2) saves space in the leaf node when type-3 metadata is not needed to store all of the relevant metadata for a data object. While the example above describes four types of metadata, the principles described above (e.g., using a shorter formats for metadata where the shorter format enables all of the necessary metadata information to be conveyed by the shorter metadata) would apply equally to other types of metadata and thus, in principle, any number of types of metadata could be used in an analogous manner.

FIG. 4D illustrates an example of deleting a data object from leaf node 406-4. In the upper part of FIG. 4D, before data object 63 has been deleted, leaf node 406-4 is shown with highlighting in black to indicate the information in leaf node 406-4 that will be deleted when the deletion operation is performed. After data object 63 has been deleted, header H63 is deleted from leaf node 406-4, as shown in the lower part of FIG. 4D, and the remaining headers (e.g., H59, H60, H61, and H66) are repacked against the left edge of leaf node 406-4. Additionally, after data object 63 has been deleted, data object DO63 and corresponding metadata M63 are deleted as shown in the lower part of FIG. 4D, and the remaining data objects (e.g., DO59, DO60, and DO66) and metadata (e.g., M59, M60, M61, and M66) are repacked against the right edge of leaf node 406-4. Additionally, before data object 63 was deleted, data object 66 relied on a portion of the key of data object 63 as a key prefix for data object 66. Thus, after data object 63 and its corresponding unique key information K63 is deleted, data object 66 can no longer rely on the portion of the key of data object 63 as a key prefix. Thus, in FIG. 4D, unique key information K66 for data object 66 is updated to include a full unique key for data object 66, and metadata M66 is updated to include a null value for the prefix offset information to indicate that there is no key prefix for data object 66 and that the unique key information K66 for data object 66 includes a full unique key. Alternatively, in some circumstances, management module 140 determines that there is another data object (e.g., data object 59) in leaf node 406-4 that is associated with unique key information that could be used as a new key prefix for data object 66, and unique key information K66 is updated to include a portion of the unique key for data object 66 that, when combined with the new key prefix can be used to generate the full unique key for data object 66, and metadata M66 is updated to point to unique key information (e.g., K59) for the other data object so that a portion of unique key information (e.g., K59) for the other data object can be used as a key prefix for data object 66. Additionally, in many circumstances, repacking the data objects and headers as described above after deleting data object 63 will change locations of data objects, metadata and headers relative to the locations from which offsets identifying locations of these elements are measured, and thus after a data object, header, and metadata have been deleted, management module 140 updates the offset information in the header and metadata corresponding to one or more of the other data objects (e.g., data objects that remain in leaf node 406-4 after to deleting data object 63).

FIG. 4E illustrates an example of adding a data object to leaf node 406-4. In the upper part of FIG. 4E, before data object 65 has been added, leaf node 406-4 is shown with data object DO65 that is to be added to leaf node 406-4. After data object 65 has been added, new header H65 is added in between header H63 and header H66, as shown in the lower part of FIG. 4E, and the headers (e.g., H59, H60, H61, H63, H65, and H66) are repacked against the left edge of leaf node 406-4. Additionally, after data object 65 has been added, data object DO65 and corresponding metadata M65 are added to leaf node 406-4 as shown in the lower part of FIG. 4E, and the data objects (e.g., DO59, DO60, DO61, DO63, DO65, and DO66) and metadata (e.g., M59, M60, M61, M63, M65, and M66) are repacked against the right edge of leaf node 406-4. Additionally, before data object 65 was added, data object 66 relied on a portion of the key of data object 63 as a key prefix for data object 66 and data object 63 was adjacent to metadata M66 for data object 66. Thus, after data object 65 is added in between data object 63 and data object 66, metadata M66 of data object 66 is updated to indicate a different offset for the key prefix for data object 66, because the relative position between metadata M66 and unique key information K63 has changed. Moreover, in FIG. 4E, newly added data object 65 is also able to use a portion of unique key information K63 as a key prefix, and thus metadata M65 of data object 65 is updated to identify a portion of K63 as a key prefix that can be combined with unique key information K65 to generate a full unique key for data object 65. Additionally, in many circumstances, repacking the data objects and headers as described above after adding data object 65 will change locations of data objects, metadata and headers relative to the locations from which offsets identifying locations of these elements are measured, and thus after a new data object, new header and new metadata have been inserted, management module 140 updates the offset information in the header and metadata corresponding to one or more of the other data objects (e.g., data objects that were in leaf node 406-4 prior to adding data object 65).

In some situations one or more data objects are updated without adding or deleting a data object from leaf node 406-4. However, even though a data object has not been added or deleted, updating a data object will, in some circumstances change a size of the data object (e.g., by changing a type of metadata used by the data object to a smaller or larger size of metadata or by changing a length of the data to a smaller or larger length). The change in the data object or associated metadata will, in many circumstances, change locations of data objects, metadata and headers relative to the locations from which offsets identifying locations of these elements are measured, and thus after a data object or metadata has been updated, management module 140 updates the offset information in the header and metadata corresponding to one or more of the other data objects.

Figure 5A:
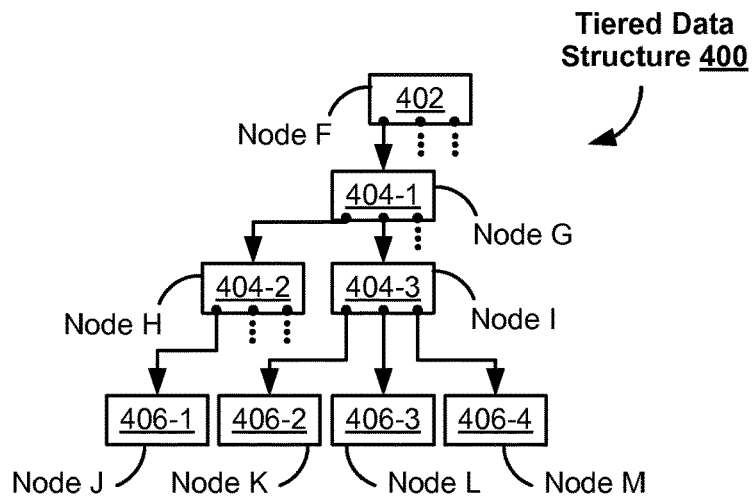
FIGS. 5A-5C illustrate the performance of an example transaction in the data storage system in accordance with some embodiments.
Figure 5A:
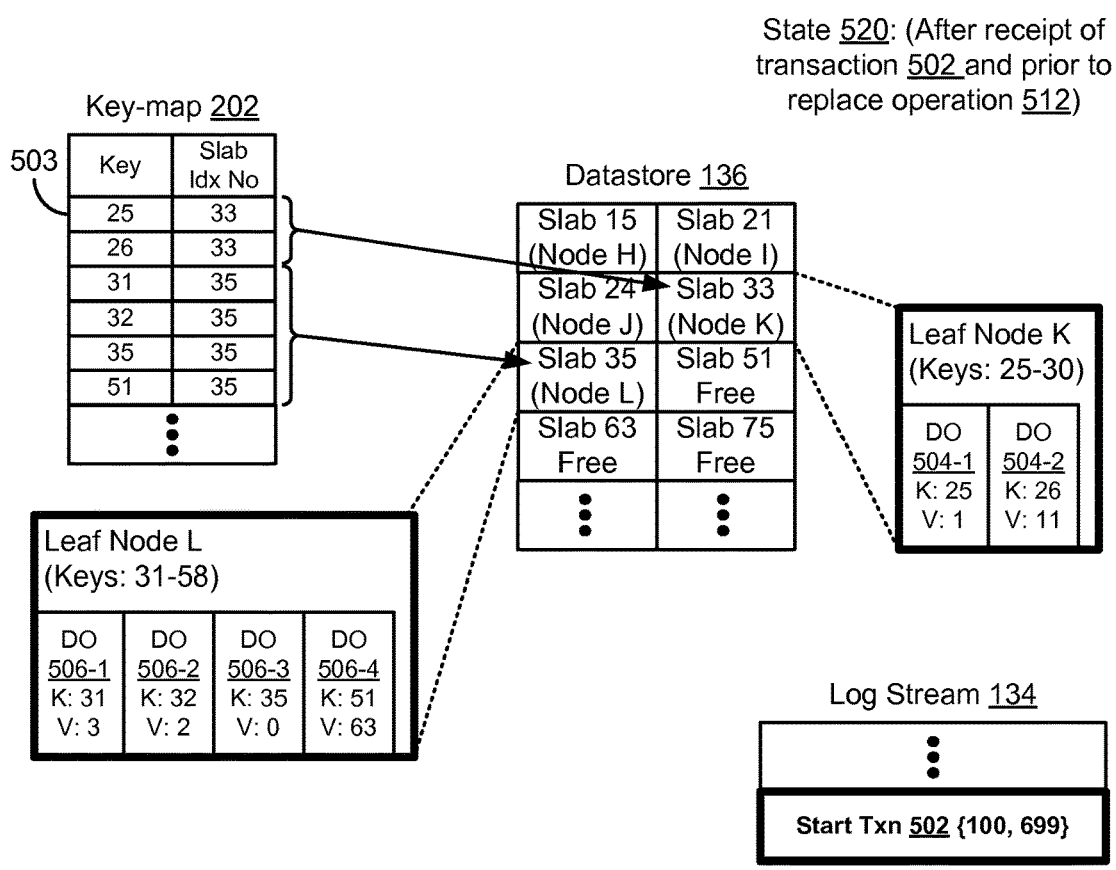
Figure 5B:
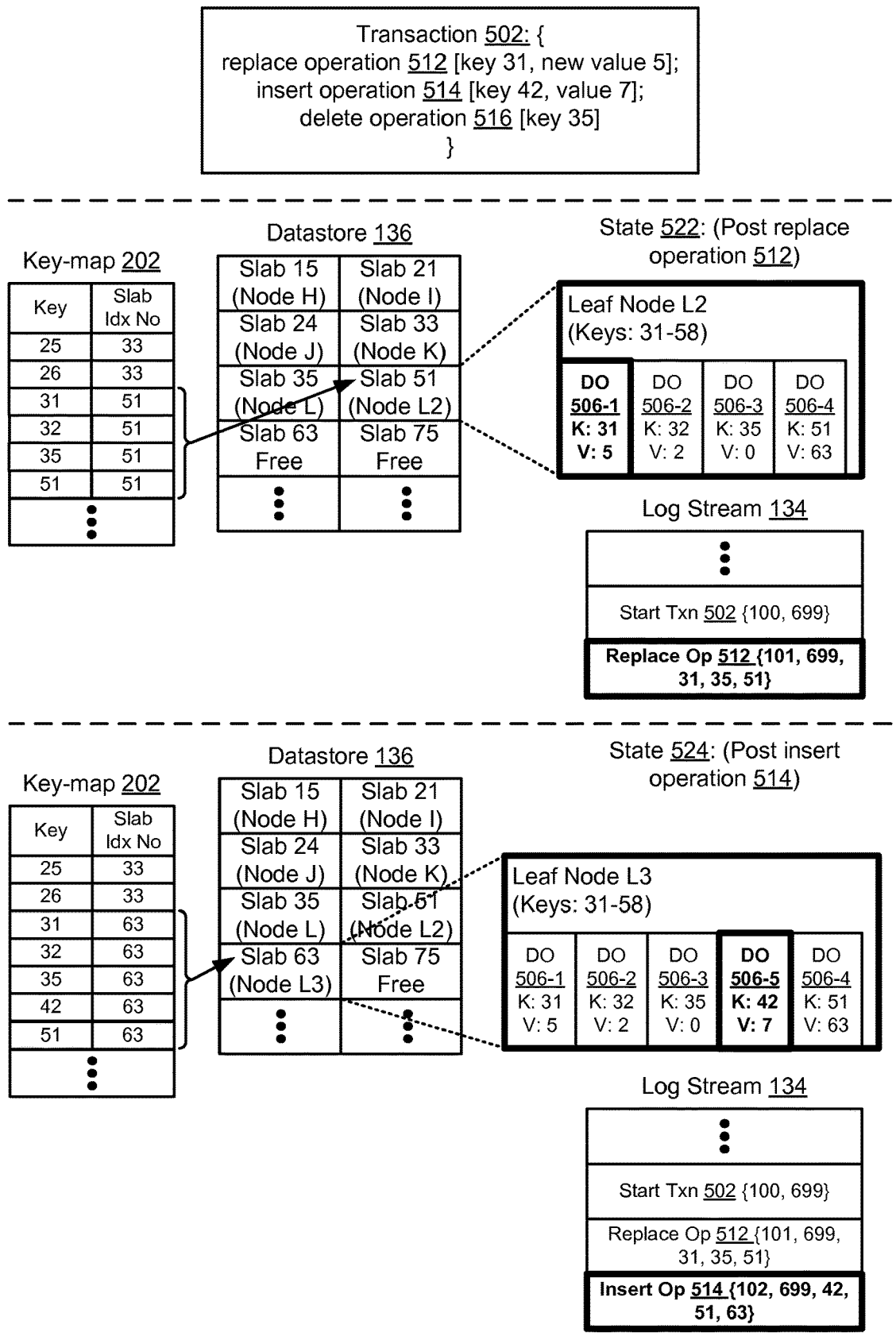
Figure 5C:
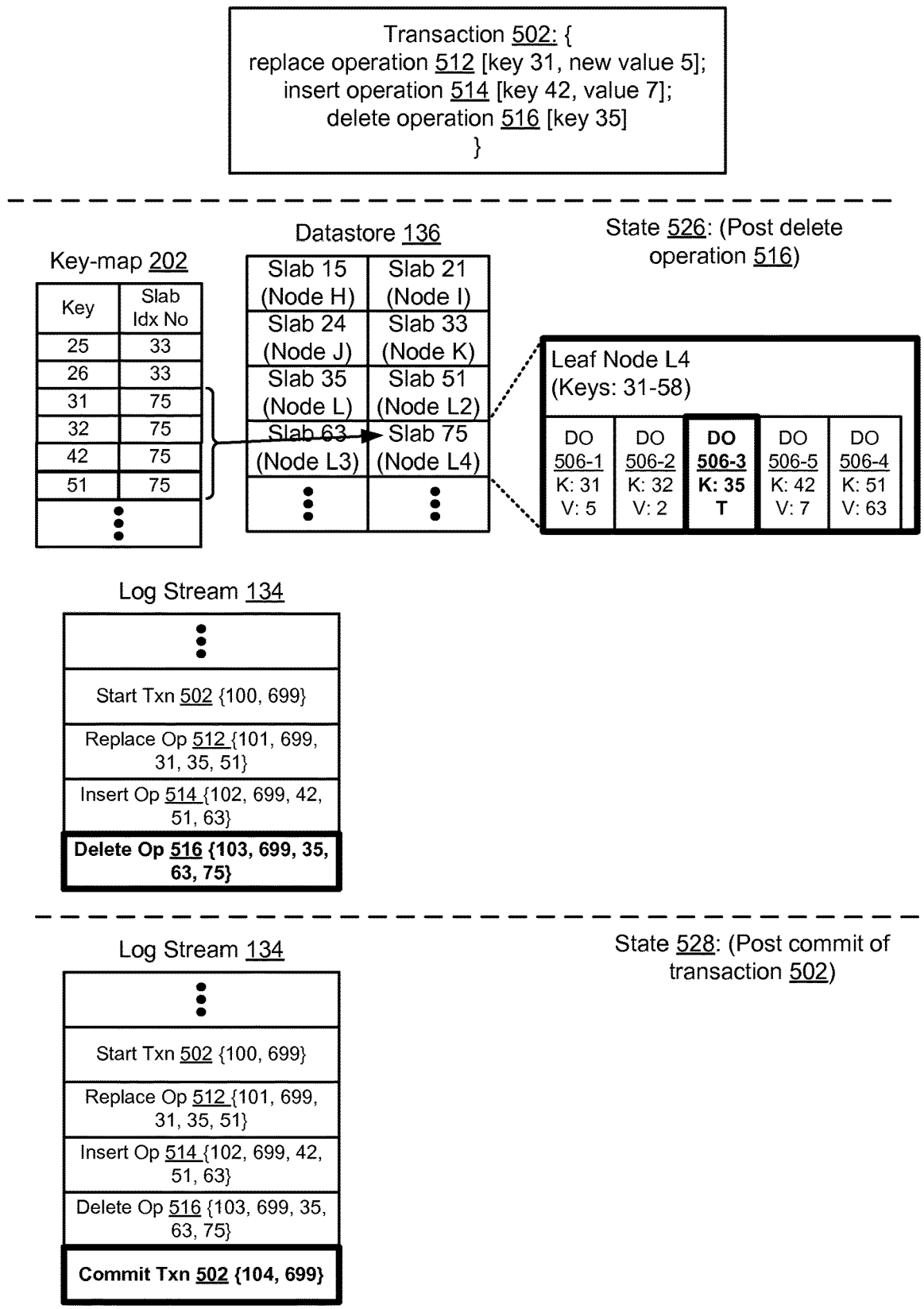

FIGS. 5A-5C illustrate data structures affected by the performance of a prophetic transaction in data storage system 100 in accordance with some embodiments. In FIG. 5A, the nodes of prophetic TDS 400 are labeled with node names. For example, leaf nodes 406-1, 406-2, 406-3, and 406-4 labeled nodes J, K, L, and M, respectively. In some embodiments, leaf nodes 406 include a predefined minimum number of data objects (e.g., two data objects) and a predefined maximum number of data objects (e.g., five data objects). When a respective leaf node 406 stores less than the predefined minimum number of data objects, management module 140 causes the respective leaf node 406 to merge with another leaf node. When a memory operation would cause a respective leaf node 406 to store more than the predefined maximum number of data objects, management module 140 causes the respective leaf node 406 to split into two other leaf nodes.

FIG. 5A shows prophetic transaction 502 received from a requestor (e.g., computer system 110, FIG. 1). Transaction 502 includes replace operation 512 whereby an old value associated with a first data object that corresponds to key 31 is to be replaced with new value 5. Transaction 502 also includes insert operation 514 whereby a second data object with a value of 7 that corresponds to key 42 is to be inserted into TDS 400. Transaction 502 further includes delete operation 516 whereby a third data object that corresponds to key 35 is to be removed from TDS 400. For example, in response to receiving transaction 502, management module 140 writes a start transaction record to log stream 134. Operations 512, 514 and 516 are examples of memory operations.

In FIG. 5A, state 520 shows the status of non-persistent key-map 202, datastore 136, and log stream 134 after management module 140 receives transaction 502 (i.e., prior to performing any of the memory operation included in transaction 502). Keys 25 and 26 of non-persistent key-map 202 map to slab index number 33, and the slab in datastore 136 that corresponds to slab index number 33 stores Node K of TDS 400 (e.g., leaf node 406-2). In FIG. 5A, Node K, which is associated with keys 25-30 of TDS 400, stores data object 504-1 corresponding to key 25 with a value of 1 and data object 504-2 corresponding to key 26 with a value of 11. Keys 31, 32, 35, and 51 of non-persistent key-map 202 map to slab index number 35, and the slab in datastore 136 that corresponds to slab index number 35 stores Node L of TDS 400 (e.g., leaf node 406-3). In FIG. 5A, Node L, which is associated with keys 31-58 of TDS 400, includes data object 506-1 corresponding to key 31 with a value of 3, data object 506-2 corresponding to key 32 with a value of 2, data object 506-3 corresponding to key 35 with a value of 0, and data object 506-4 corresponding to key 51 with a value of 63. In FIG. 5A, log stream 134 includes the start transaction record corresponding to transaction 502 with unique sequence number 100 and transaction identifier number 699.

In some embodiments, after writing the start transaction record, management module 140 (or one or more components therein) performs replace operation 512, by:
A) locating data object 506-1 corresponding to key 31 by mapping key 31 in non-persistent key-map 202 to slab index number 35;
B) retrieving node L stored at a slab in datastore 136 that corresponds to slab index number 35 (however, if a cached copy of node L is available in cache 206, management module 140 forgoes steps B and C);
C) storing node L or a copy thereof in cache 206;
D) modifying cached node L or the copy thereof to replace the old value (3) of data object 506-1 with the new value (5) so as to generate node L2;
E) allocating a free slab in datastore 136 that corresponds to slab index number 51 for node L2;
F) writing node L2 to the allocated slab that corresponds to slab index number 51;
G) updating keys in non-persistent key-map 202 that previously mapped to slab index number 35 storing node L to map to slab index number 51 storing node L2; and
H) while maintaining node L at the slab corresponding to slab index number 35, writing an operation commit record corresponding to replace operation 512 to log stream 134.

In FIG. 5B, state 522 shows the status of non-persistent key-map 202, datastore 136, and log stream 134 after management module 140 performs replace operation 512. Keys 31, 32, 35, and 51 of non-persistent key-map 202 map to slab index number 51, and the slab in datastore 136 that corresponds to slab index number 51 stores Node L2 of TDS 400 (e.g., leaf node 406-3). In FIG. 5B, node L2 includes updated data object 506-1 corresponding to key 31 with a new value of 5, data object 506-2 corresponding to key 32 with a value of 2, data object 506-3 corresponding to key 35 with a value of 0, and data object 506-4 corresponding to key 51 with a value of 63. In FIG. 5B, log stream 134 includes an operation commit record corresponding to replace operation 512 with unique sequence number 101, transaction identifier number 699, key 31 (e.g., corresponding to updated data object 506-1), slab index number 35 of the slab in datastore 136 storing old node L, and slab index number 51 of the slab in datastore 136 storing new node L2.

In some embodiments, after performing replace operation 512, management module 140 (or one or more components therein) performs insert operation 514, by:
A) locating a data object corresponding to a respective key that is closest to key 42 by mapping the respective key in non-persistent key-map 202 to slab index number 51;
B) retrieving node L2 stored at a slab in datastore 136 that corresponds to slab index number 51 (however, if a cached copy of node L2 is available in cache 206, management module 140 forgoes steps B and C);
C) storing node L2 or a copy thereof in cache 206;
D) modifying cached node L2 or the copy thereof to insert data object 506-5 with a value of 7 so as to generate node L3;
E) allocating a free slab in datastore 136 that corresponds to slab index number 63 for node L3;

F) writing node L3 to the allocated slab that corresponds to slab index number 63;

G) updating keys in non-persistent key-map 202 that previously mapped to slab index number 51 storing node L2 to map to slab index number 63 storing node L3; and H) while maintaining node L2 at the slab corresponding to slab index number 51, writing an operation commit record corresponding to insert operation 514 to log stream 134.

In FIG. 5B, state 524 shows the status of non-persistent key-map 202, datastore 136, and log stream 134 after management module 140 performs insert operation 514. Keys 31, 32, 35, 42, and 51 of non-persistent key-map 202 map to slab index number 63, and the slab in datastore 136 that corresponds to slab index number 63 stores Node L3 of TDS 400 (e.g., leaf node 406-3). In FIG. 5B, node L3 includes data object 506-1 corresponding to key 31 with a value of 5, data object 506-2 corresponding to key 32 with a value of 2, data object 506-3 corresponding to key 35 with a value of 0, new data object 506-5 corresponding to key 42 with a value of 7, and data object 506-4 corresponding to key 51 with a value of 63. In FIG. 5B, log stream 134 includes an operation commit record corresponding to insert operation 514 with unique sequence number 102, transaction identifier number 699, key 42 (e.g., corresponding to new data object 506-5), slab index number 51 of the slab in datastore 136 storing old node L2, and slab index number 63 of the slab in datastore 136 storing new node L3.

In some embodiments, after performing insert operation 514, management module 140 (or one or more components therein) performs delete operation 516, by:

A) locating data object 506-3 corresponding to key 35 by mapping key 35 in non-persistent key-map 202 to slab index number 63;

B) retrieving node L3 stored at a slab in datastore 136 that corresponds to slab index number 63 (however, if a cached copy of node L3 is available in cache 206, management module 140 forgoes steps B and C);

C) storing node L3 or a copy thereof in cache 206;

D) modifying cached node L3 or the copy thereof to delete data object 506-3 by replacing its value with a tombstone so as to generate node L4;

E) allocating a free slab in datastore 136 that corresponds to slab index number 75 for node L4;

F) writing node L4 to the allocated slab that corresponds to slab index number 75;

G) updating keys in non-persistent key-map 202 that previously mapped to slab index number 63 storing node L3 to map to slab index number 75 storing node L4; and H) while maintaining node L3 at the slab corresponding to slab index number 63, writing an operation commit record corresponding to delete operation 516 to log stream 134.

In FIG. 5C, state 526 shows the status of non-persistent key-map 202, datastore 136, and log stream 134 after management module 140 performs delete operation 516. Keys 31, 32, 35, 42, and 51 of non-persistent key-map 202 map to slab index number 75, and the slab in datastore 136 that corresponds to slab index number 75 stores Node L4 of TDS 400 (e.g., leaf node 406-3). In FIG. 5C, node L4 includes data object 506-1 corresponding to key 31 with a value of 5, data object 506-2 corresponding to key 32 with a value of 2, deleted data object 506-3 corresponding to key 35 with a tombstone, data object 506-5 corresponding to key 42 with a value of 7, and data object 506-4 corresponding to key 51 with a value of 63. In FIG. 5C, log stream 134 includes an operation commit record corresponding to delete operation 516 with unique sequence number 103, transaction identifier number 699, key 35 (e.g., corresponding to deleted data object 506-3), slab index number 63 of the slab in datastore 136 storing old node L3, and slab index number 75 of the slab in datastore 136 storing new node L4.

For example, after performing delete operation 516 and determining that transaction 502 is complete (i.e., all memory operations in transaction 502 have been performed), management module 140 writes a transaction commit record corresponding to transaction 502 to log stream 134. In FIG. 5C, state 528 shows the status of log stream 134 after management module 140 writes the transaction commit record corresponding to transaction 502 to log stream 134. In FIG. 5C, log stream 134 includes the transaction commit record corresponding to transaction 502 with unique sequence number 104 and transaction identifier number 699.

In some embodiments, during memory operations 512, 514, and 516, management module 140 also write-locks the old node in TDS 400 after locating the data object corresponding to the old node and unlocks the old node in TDS 400 after writing the new node.

Figure 6A:
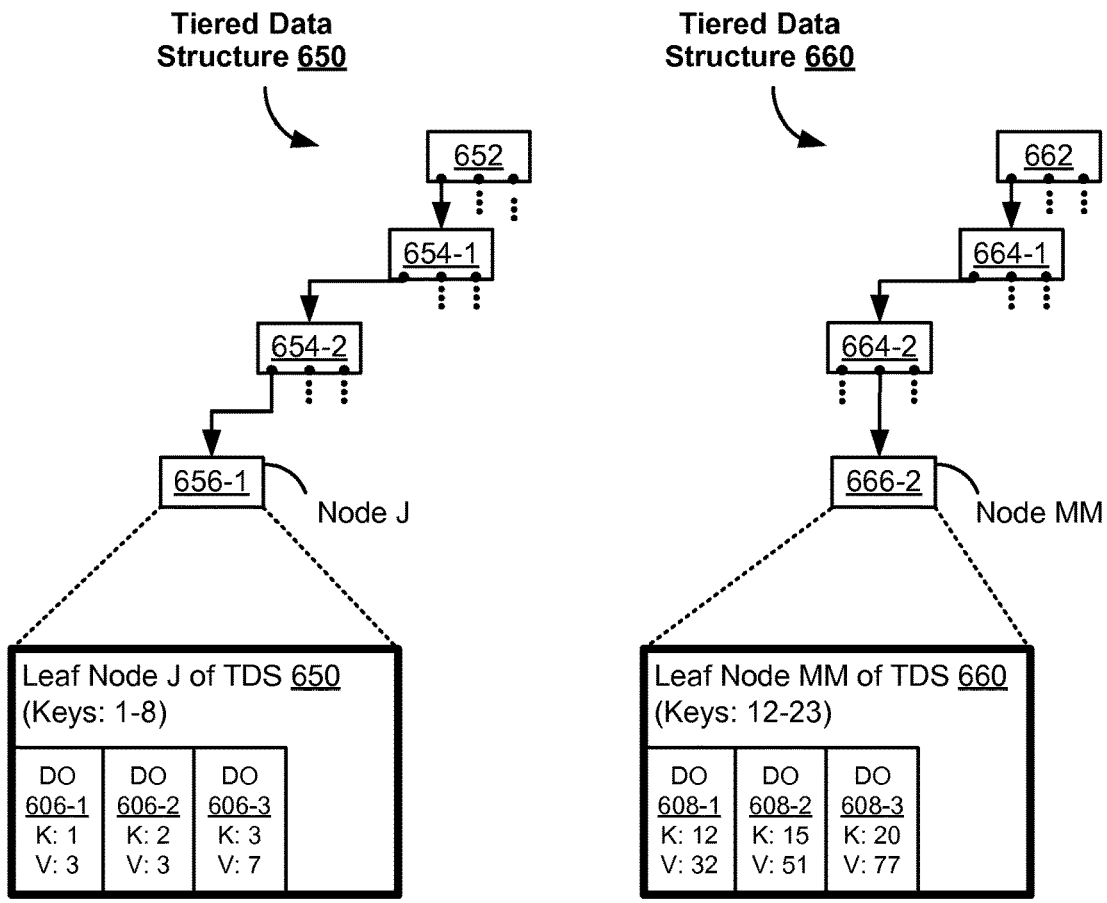
Figure 6A:
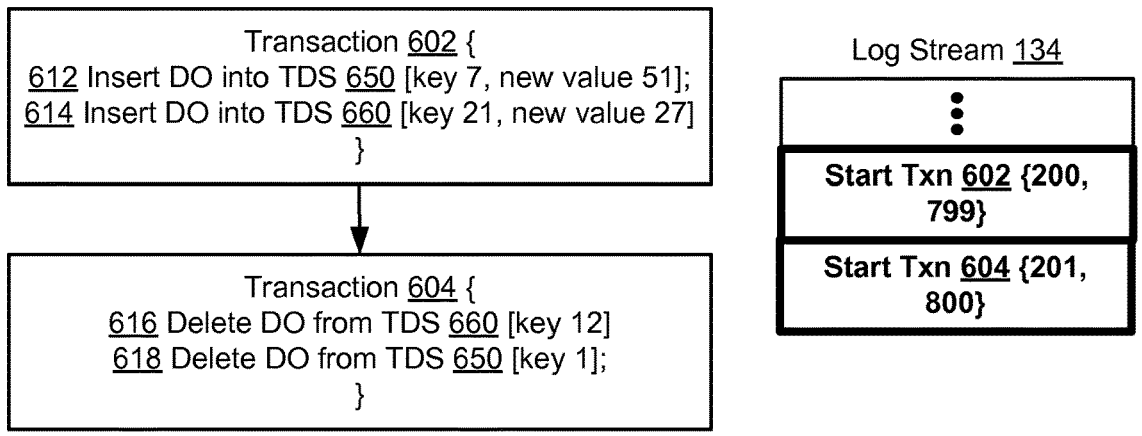
Figure 7A:
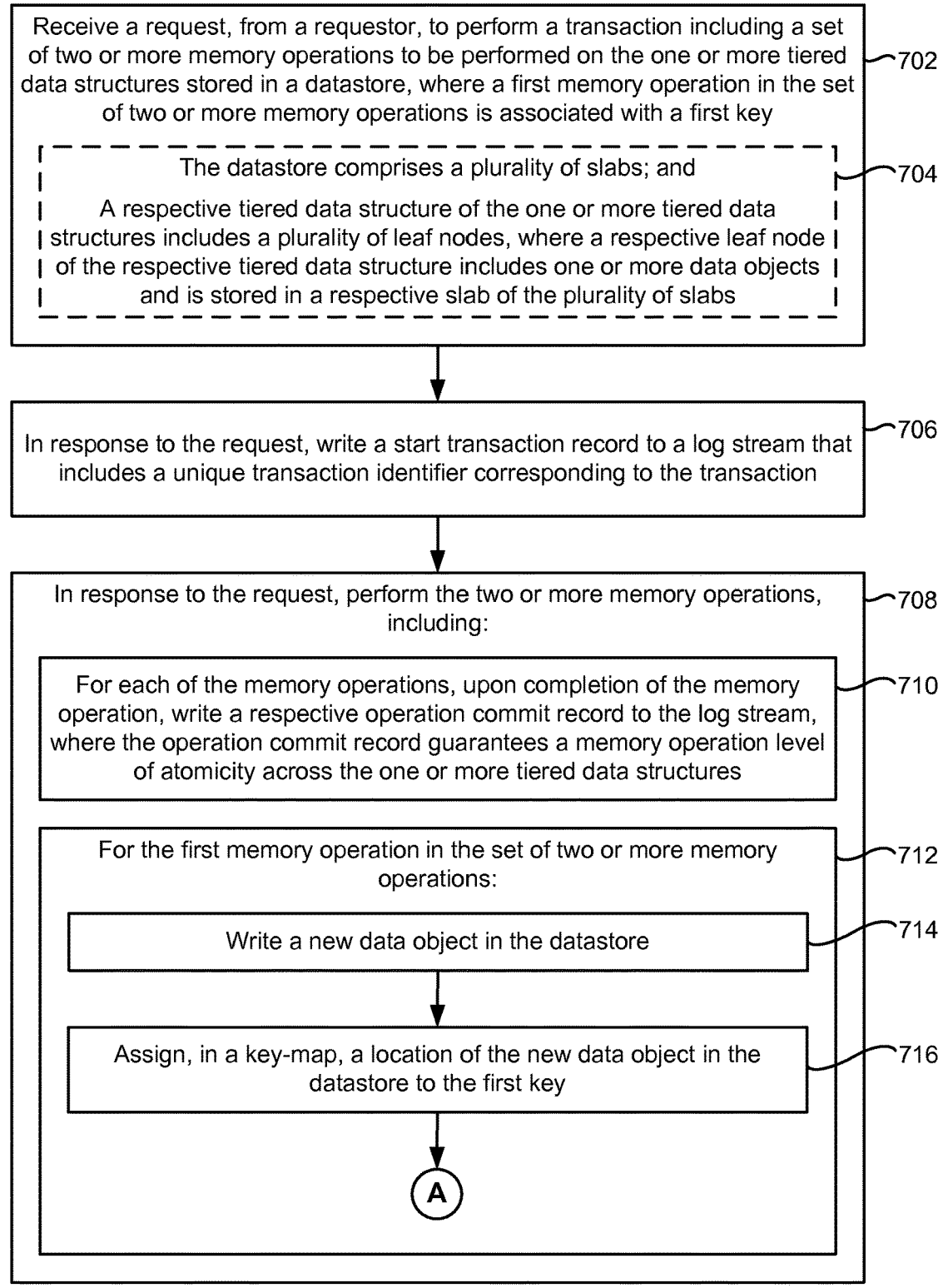
FIGS. 7A-7G illustrate a flowchart representation of a method of managing a data storage system in accordance with some embodiments.
Figure 7B:
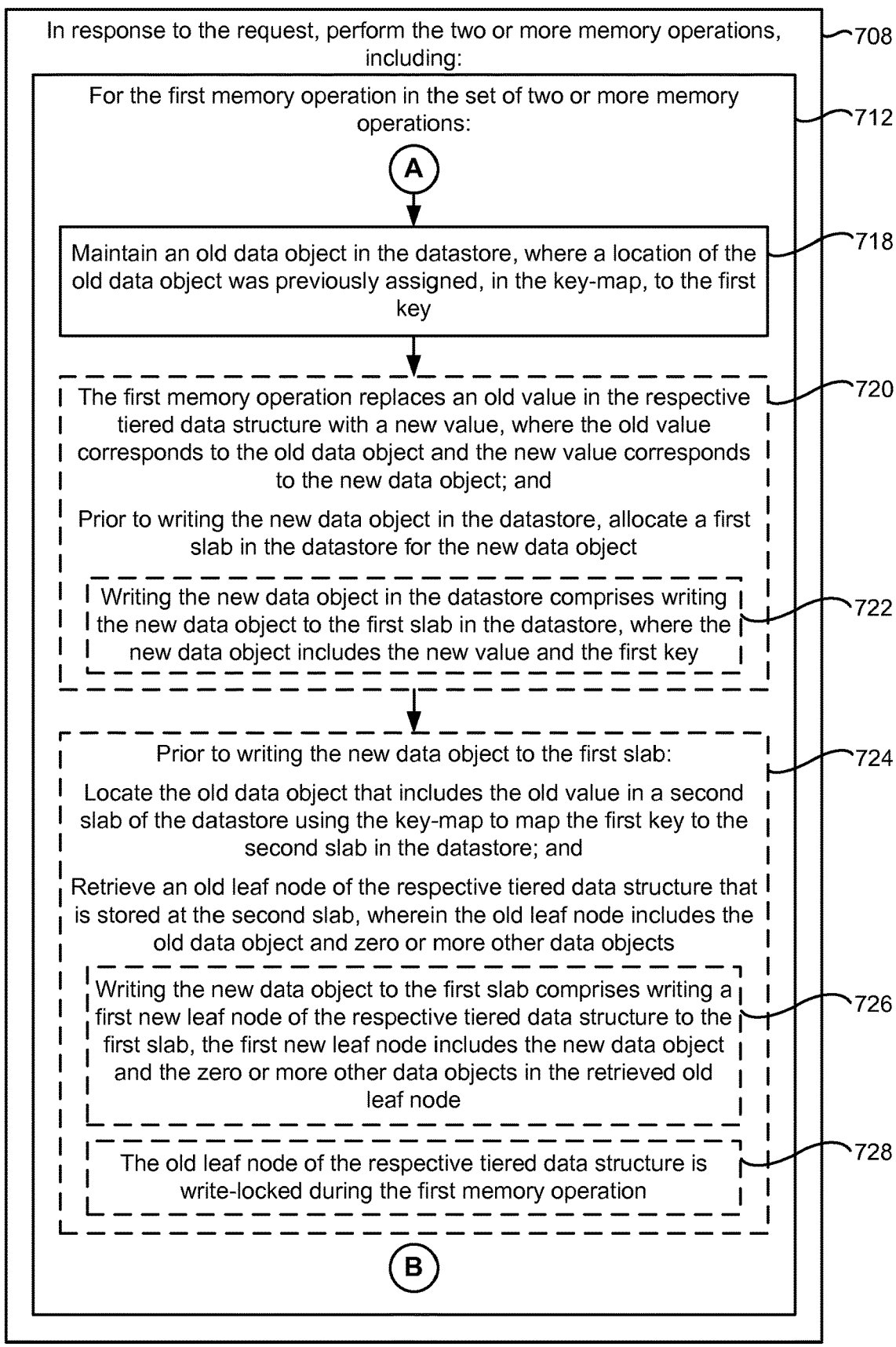
Figure 7C:
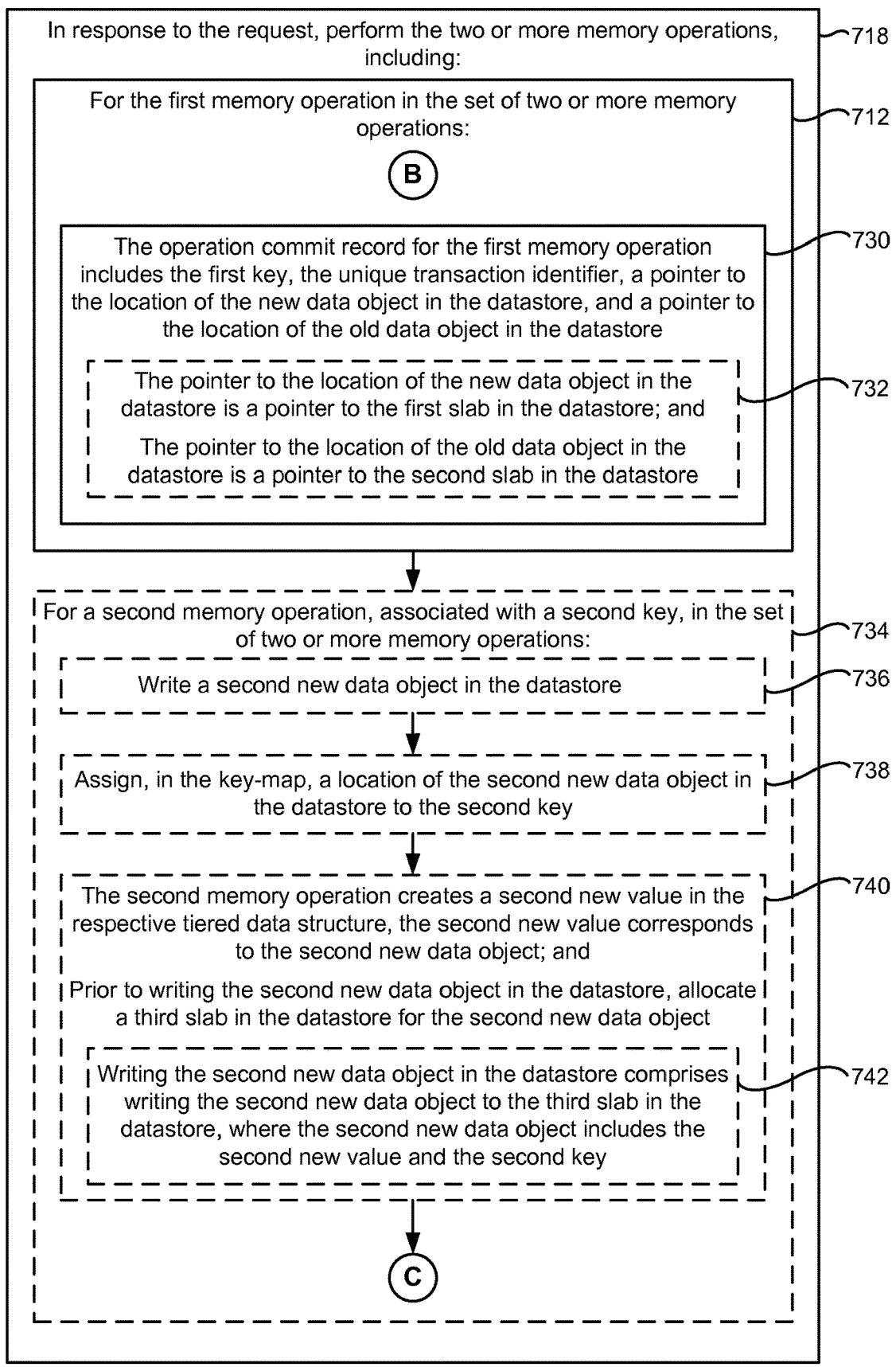
Figure 7D:
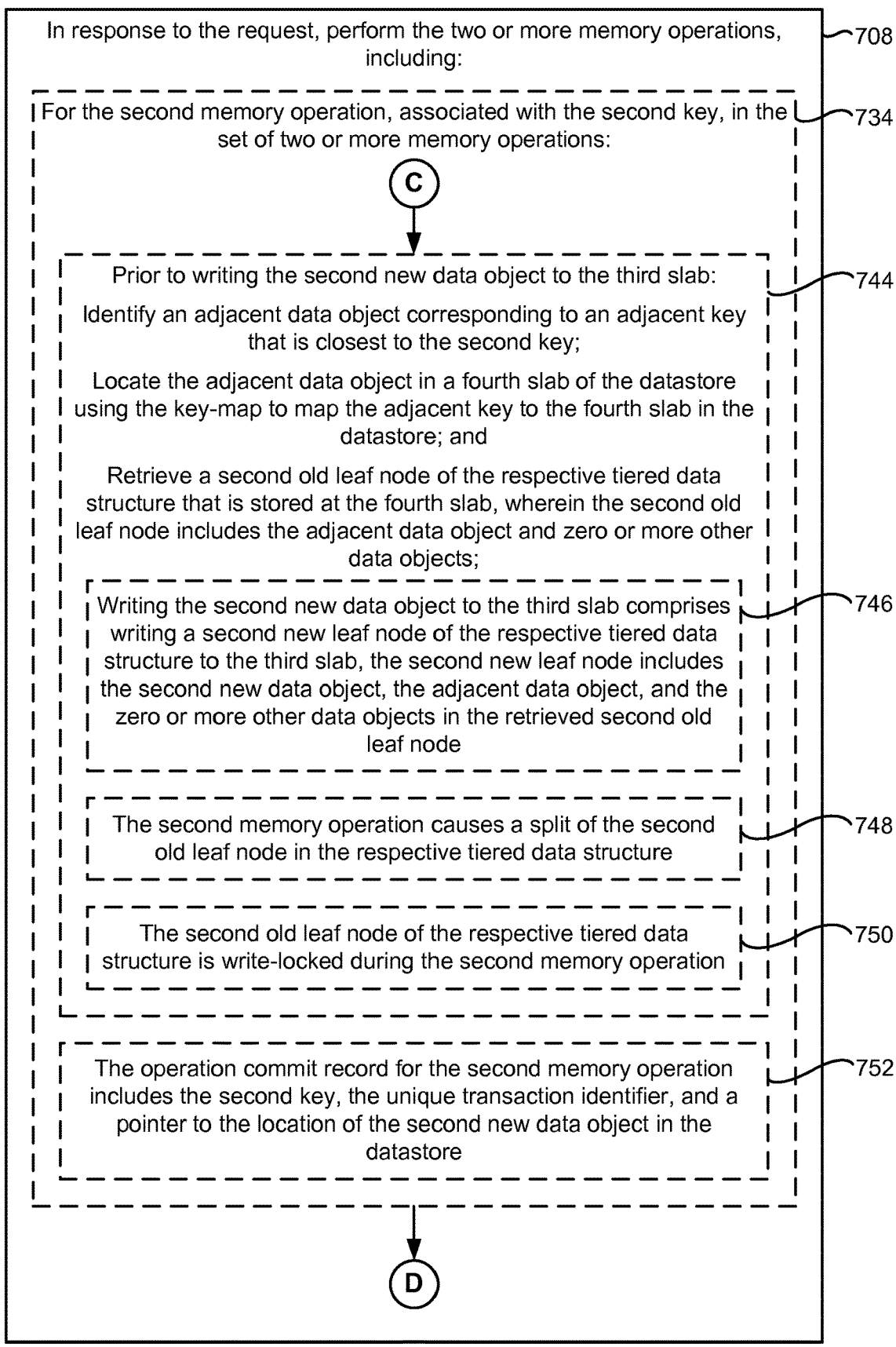
Figure 7E:
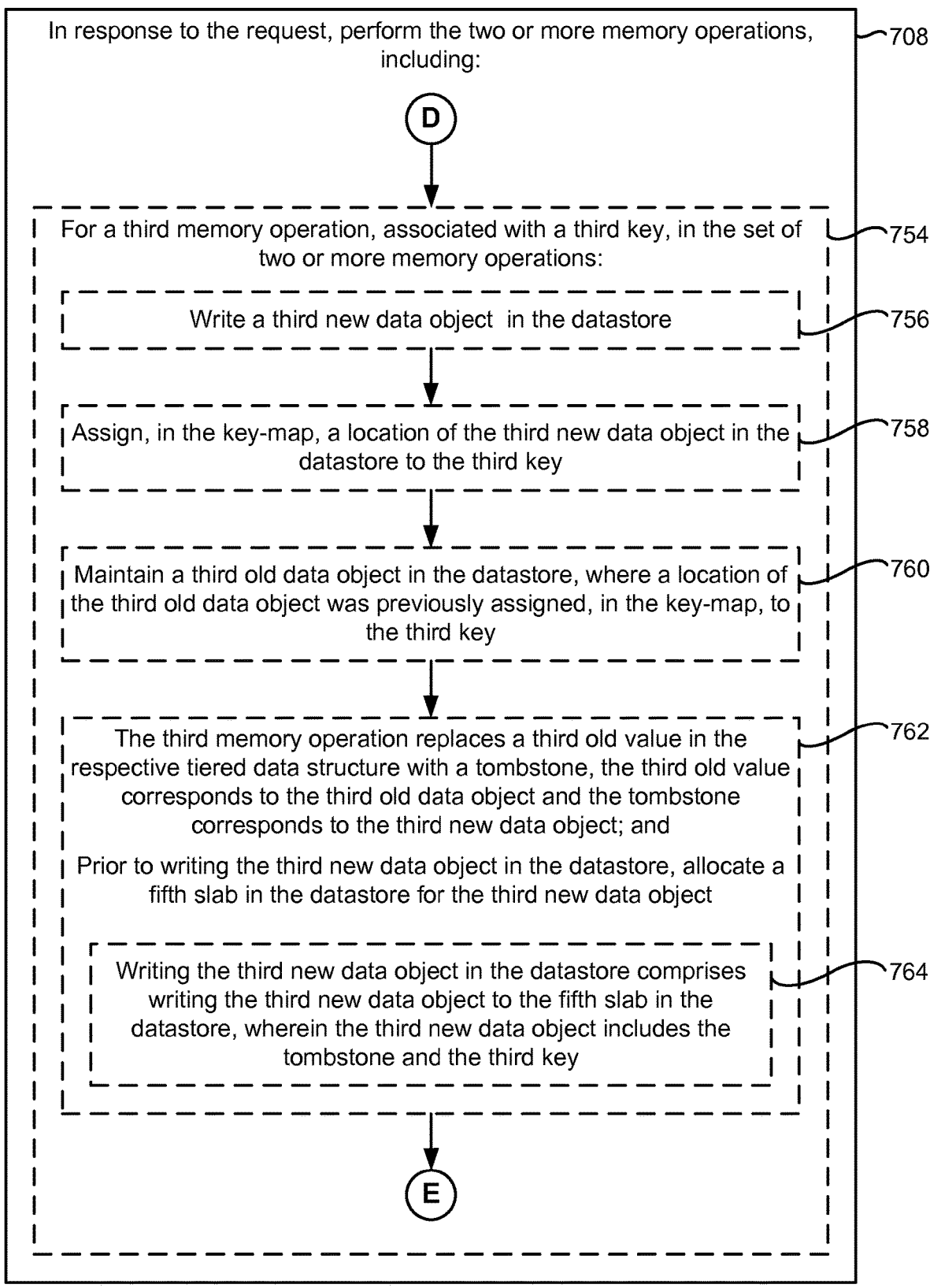
Figure 7F:
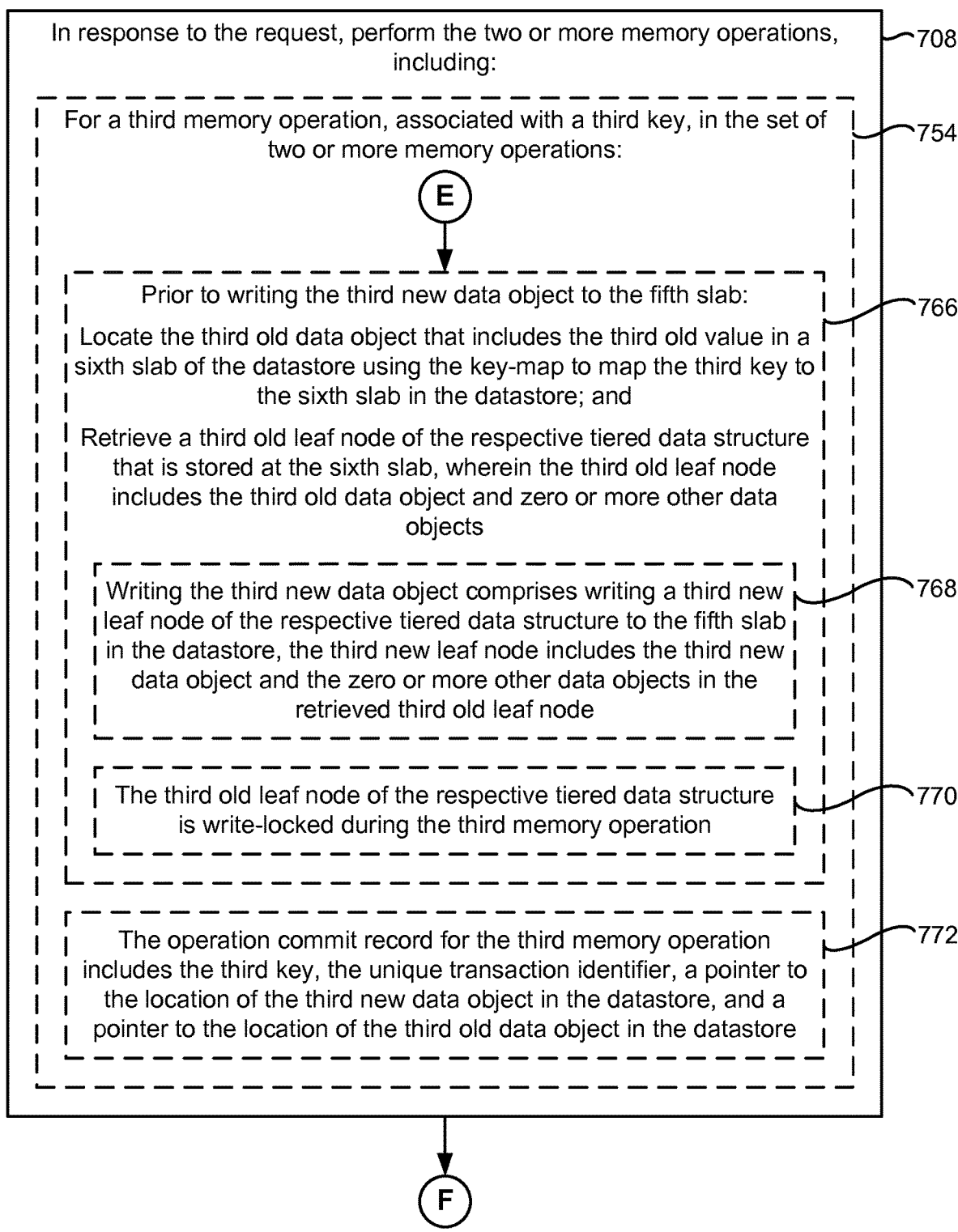
Figure 7G:
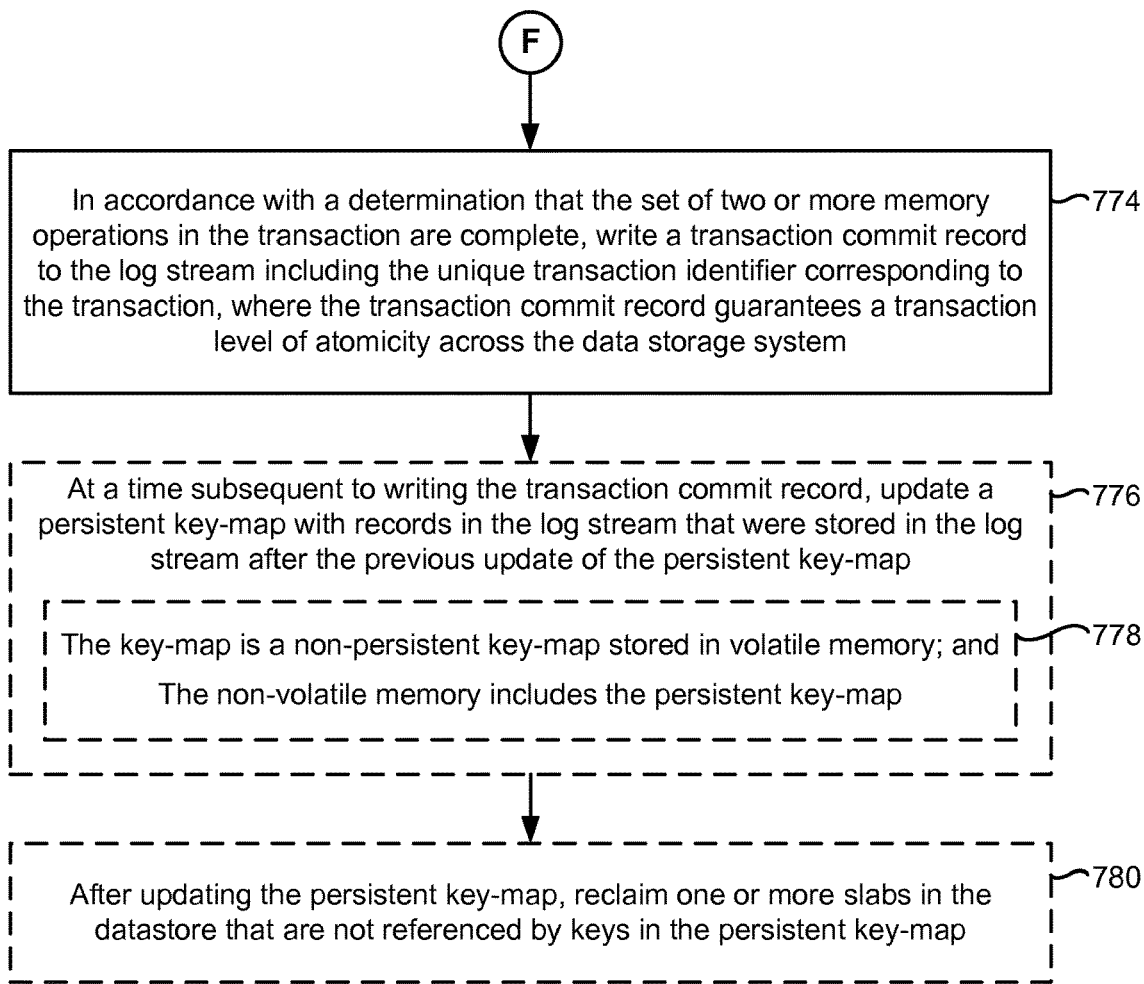

FIGS. 6A-6E illustrate the performance of a recovery process in data storage system 100 following the partial performance of two requested transactions in accordance with some embodiments. FIG. 6A shows prophetic portions of TDS 650 and TDS 660, both of which are stored in datastore 136. In FIG. 6A, TDS 650 at least includes root node 652, internal nodes 654-1 and 654-2, and leaf node 656-1 (labeled as node J). In FIG. 6A, TDS 660 at least includes root node 662, internal nodes 664-1 and 664-2, and leaf node 666-2 (labeled as node MM).

In FIG. 6A, state 620 shows the status of node J and node MM prior to receiving transactions 602 and 604 from a requestor (e.g., computer system 110, FIG. 1). Node J, which is associated with keys 1-9 of TDS 650, includes data object 606-1 corresponding to key 1 with a value of 3, data object 606-2 corresponding to key 2 with a value of 3, and data object 606-3 corresponding to key 3 with a value of 7. Node MM, which is associated with keys 12-23 of TDS 660, includes data object 608-1 corresponding to key 12 with a value of 32, data object 608-2 corresponding to key 15 with a value of 51, and data object 608-3 corresponding to key 20 with a value of 77.

FIG. 6A shows prophetic transactions 602 and 604 received from a requestor (e.g., computer system 110). Transaction 602 includes insert operation 612 whereby a data object corresponding to key 7 with a value of 51 is to be inserted into TDS 650 and insert operation 614 whereby a data object corresponding to key 21 with a value of 27 is to be inserted into TDS 660. Transaction 604 includes delete operation 616 whereby a data object corresponding to key 12 is to be removed from TDS 660 and delete operation 618 whereby a data object corresponding to key 1 is to be removed from TDS 650. For example, in response to receiving transactions 602 and 604, management module 140 writes a start transaction record to log stream 134 for each of transactions 602 and 604.

In FIG. 6A, state 622 shows the status of log stream 134 after management module 140 receives transactions 602 and 604 (i.e., prior to performing any of the memory operation included in transactions 602 and 604). In FIG. 5A, log stream 134 includes the start transaction record corresponding to transaction 602 with unique sequence number 200 and transaction identifier number 799. In FIG. 5A, log stream 134 also includes the start transaction record corresponding to transaction 604 with unique sequence number 201 and transaction identifier number 800.

In some embodiments, after writing the start transaction records, management module 140 (or one or more components therein) performs insert operation 612 of transaction 602, by:
A) locating a data object corresponding to a respective key that is closest to key 3 in TDS 650 by mapping the respective key in non-persistent key-map 202 to location information (e.g., pointing to a slab in datastore 136 that stores a leaf node (node J) that includes a data object corresponding to the respective key);
B) retrieving node J stored at a slab in datastore 136 that corresponds to the location information (however, if a cached copy of node J is available in cache 206, management module 140 forgoes steps B and C);
C) storing node J or a copy thereof in cache 206;
D) modifying cached node J or the copy thereof to insert data object 606-4 with a value of 51 so as to generate node J2;
E) allocating a free slab in datastore 136 for node J2;
F) writing node J2 to the allocated slab;
G) updating keys in non-persistent key-map 202 that previously mapped to location information pointing to node J to map to location information pointing to node J2; and
H) while maintaining node J, writing an operation commit record corresponding to insert operation 612 to log stream 134.

In FIG. 6B, state 624 shows the status of log stream 134 and nodes J2 and MM after management module 140 performs insert operation 612. In FIG. 6B, node J2 includes data object 606-1 corresponding to key 1 with a value of 3, data object 606-2 corresponding to key 2 with a value of 3, data object 606-3 corresponding to key 3 with a value of 7, and new data object 606-4 corresponding to key 7 with a value of 51. In FIG. 6B, log stream 134 includes an operation commit record corresponding to insert operation 612 with unique sequence number 202, transaction identifier number 799 (e.g., for transaction 602), key 7 (e.g., corresponding to new data object 606-4), location information pointing to a slab in datastore 136 storing old node J, and location information pointing to a slab in datastore 136 storing new node J2.

In some embodiments, after performing insert operation 612, management module 140 (or one or more components therein) performs delete operation 616 of transaction 604, by:
A) locating data object 608-1 corresponding to key 12 in TDS 660 by mapping key 12 in non-persistent key-map 202 to location information (e.g., pointing to a slab in datastore 136 that stores a leaf node (node MM) that includes data object 608-1);
B) retrieving node MM stored at a slab in datastore 136 that corresponds to the location information (however, if a cached copy of node MM is available in cache 206, management module 140 forgoes steps B and C);
C) storing node MM or a copy thereof in cache 206;
D) modifying cached node MM or the copy thereof to delete data object 608-1 by replacing its value with a tombstone so as to generate node MM2;
E) allocating a free slab in datastore 136 for node MM2;
F) writing node MM2 to the allocated slab;
G) updating keys in non-persistent key-map 202 that previously mapped to location information pointing to node M to map to location information pointing to node MM2; and
H) while maintaining node MM, writing an operation commit record corresponding to delete operation 616 to log stream 134.

In FIG. 6B, state 626 shows the status of log stream 134 and nodes J2 and MM2 after management module 140 performs delete operation 616. In FIG. 6B, node MM2 includes deleted data object 608-1 corresponding to key 12 with a tombstone, data object 608-2 corresponding to key 15 with a value of 51, and data object 608-3 corresponding to key 20 with a value of 77. In FIG. 6B, log stream 134 includes an operation commit record corresponding to delete operation 616 with unique sequence number 203, transaction identifier number 800 (e.g., for transaction 604), key 12 (e.g., corresponding to deleted data object 608-1), location information pointing to a slab in datastore 136 storing old node MM, and location information pointing to a slab in datastore 136 storing new node MM2.

In some embodiments, after performing delete operation 616, management module 140 (or one or more components therein) performs insert operation 614 of transaction 602, by:
A) locating a data object corresponding to a respective key that is closest to key 21 in TDS 660 by mapping the respective key in non-persistent key-map 202 to location information (e.g., pointing to a slab in datastore 136 that stores a leaf node (node MM2) that includes a data object corresponding to the respective key);
B) retrieving node MM2 stored at a slab in datastore 136 that corresponds to the location information (however, if a cached copy of node MM2 is available in cache 206, management module 140 forgoes steps B and C);
C) storing node MM2 or a copy thereof in cache 206;
D) modifying cached node MM2 or the copy thereof to insert data object 608-4 with a value of 27 so as to generate node MM3;
E) allocating a free slab in datastore 136 for node MM3;
F) writing node MM3 to the allocated slab;
G) updating keys in non-persistent key-map 202 that previously mapped to location information pointing to node MM2 to map to location information pointing to node MM3; and
H) while maintaining node MM2, writing an operation commit record corresponding to insert operation 614 to log stream 134.

In FIG. 6C, state 628 shows the status of log stream 134 and nodes J2 and MM3 after management module 140 performs insert operation 614. In FIG. 6C, node MM3 includes deleted data object 608-1 corresponding to key 12 with a tombstone, data object 608-2 corresponding to key 15 with a value of 51, data object 608-3 corresponding to key 20 with a value of 77, and new data object 608-4 corresponding to key 21 with a value of 27. In FIG. 6C, log stream 134 includes an operation commit record corresponding to insert operation 614 with unique sequence number 204, transaction identifier number 799 (e.g., for transaction 602), key 21 (e.g., corresponding to new data object 608-4), location information pointing to a slab in datastore 136 storing old node MM2, and location information pointing to a slab in datastore 136 storing new node MM3.

In some embodiments, after performing insert operation 614, management module 140 (or one or more components therein) performs delete operation 618 of transaction 604, by:
A) locating data object 606-1 corresponding to key 1 in TDS 650 by mapping key 1 in non-persistent key-map 202 to location information (e.g., pointing to a slab in datastore 136 that stores a leaf node (node J2) that includes data object 606-1);

B) retrieving node J2 stored at a slab in datastore 136 that corresponds to the location information (however, if a cached copy of node J2 is available in cache 206, management module 140 forgoes steps B and C);

C) storing node J2 or a copy thereof in cache 206;

D) modifying cached node J2 or the copy thereof to delete data object 606-1 by replacing its value with a tombstone so as to generate node J3;

E) allocating a free slab in datastore 136 for node J3;

F) writing node J3 to the allocated slab;

G) updating keys in non-persistent key-map 202 that previously mapped to location information pointing to node J2 to map to location information pointing to node J3; and H) while maintaining node J2, writing an operation commit record corresponding to delete operation 618 to log stream 134.

In FIG. 6C, state 630 shows the status of log stream 134 and nodes J3 and MM3 after management module 140 performs delete operation 618. In FIG. 6C, node J3 includes deleted data object 606-1 corresponding to key 1 with a tombstone, data object 606-2 corresponding to key 2 with a value of 3, data object 606-3 corresponding to key 3 with a value of 7, and data object 606-4 corresponding to key 7 with a value of 51. In FIG. 6C, log stream 134 includes an operation commit record corresponding to delete operation 618 with unique sequence number 205, transaction identifier number 800 (e.g., for transaction 604), key 1 (e.g., corresponding to deleted data object 606-1), location information pointing to a slab in datastore 136 storing old node J2, and location information pointing to a slab in datastore 136 storing new node J3.

In some embodiments, after performing delete operation 618 and determining that transactions 604 is complete (i.e., all memory operations in transaction 604 have been performed), management module 140 writes a transaction commit record corresponding to transaction 604 to log stream 134. In FIG. 6D, state 632 shows the status of log stream 134 after management module 140 writes the transaction commit record corresponding to transaction 604 to log stream 134. In FIG. 6D, log stream 134 includes the transaction commit record corresponding to transaction 604 with unique sequence number 206 and transaction identifier number 800.

In some embodiments, after writing transaction commit record corresponding to transaction 604 and determining that transaction 602 is complete (i.e., all memory operations in transaction 602 have been performed), management module 140 prepares to write a transaction commit record corresponding to transaction 602 to log stream 134. However, for example, prior to writing the transaction commit record corresponding to transaction 602 to log stream 134, data storage system 100 experiences a trigger event (e.g., a crash, power failure, power-off event, or the like) causing the transaction commit record corresponding to transaction 602 to not be written to log stream 134.

Continuing with this example, upon power-up/restart of data storage system 100, management module 140 or a component thereof (e.g., recovery module 348, FIG. 3) performs a recovery process by inspecting the records in log stream 134 which include the records shown in state 632. During the recovery process, management module 140 identifies an earliest incomplete transaction that includes a record (i.e., a start transaction record) with a lowest (or earliest) sequence number. For example, management module 140 identifies transaction 602 corresponding to transaction identifier number 799 as the incomplete transaction that includes a record (e.g., the start transaction record corresponding to transaction 602) with a lowest (or earliest) sequence number (e.g., sequence number 200). Then, management module 140 identifies a first portion of log stream 134-A with sequence numbers that are higher (or later) than or equal to the sequence number (e.g., 200) of the record with the lowest (or earliest) sequence number (e.g., the start transaction record corresponding to transaction 602) in the earliest incomplete transaction (e.g., transaction 602).

In FIG. 6D, state 634 shows first portion of log stream 134-A including records with sequence number less than or equal to 200. After identifying first portion of log stream 134-A, as a part of the recovery process, management module 140 removes records that are associated with complete transactions from first portion of log stream 134-A to obtain a second portion of the log stream 134-B. For example, management module 140 removes records with the transaction identifier number (e.g., transaction identifier number 800) for transaction 604 (i.e., a complete transaction) from first portion of log stream 134-A. In FIG. 6D, state 634 also shows second portion of log stream 134-B including records with sequence number less or equal to 200 that are included in incomplete transactions (e.g., transaction 602).

After identifying second portion of log stream 134-B, as a part of the recovery process, management module 140 creates a recovery list for each of the tiered data structures affected by the records in second portion of log stream 134-B. In FIG. 6E, state 634 (continued) shows recovery list 642 for TDS 660 and recovery list 644 for TDS 650. Recovery list 642 includes entry 643 corresponding to insert operation 614 in second portion of log stream 134-B. Entry 643 in recovery list 642 includes new leaf node MM3 created by insert operation 614 and its included data objects (e.g., data objects 608-1, 608-2, 608-3, and 608-4), and, also, old leaf node MM2, prior to insert operation 614, and its included data objects (e.g., data objects 608-1, 608-2, and 608-3). Recovery list 644 includes entry 645 corresponding to insert operation 612 in second portion of log stream 134-B. Entry 645 in recovery list 644 includes new leaf node J2 created by insert operation 612 and its included data objects (e.g., data objects 606-1, 606-2, 606-3, and 606-4), and, also, old leaf node J, prior to insert operation 612, and its included data objects (e.g., data objects 606-1, 606-2, and 606-3).

After identifying second portion of log stream 134-B, as a part of the recovery process, management module 140 also populates non-persistent key-map 202 with the entries in persistent key-map 132. Then, management module 140 updates populated non-persistent key-map 202 with all records in log stream 134 that are not included in second portion of log stream 134-B (i.e., records associated with complete transactions).

In some embodiments, management module 140 determines undo operations based on recovery lists 642 and 644. First, based on recovery list 642, management module 140 determines a first undo operation 672 that includes deleting a data object from TDS 660 (e.g., data object 608-4) that corresponds to key 21 so as to undo insert operation 614. Second, based on recovery list 644, management module 140 determines a second undo operation 674 that includes deleting a data object from TDS 650 (e.g., data object 606-4) that corresponds to key 7 so as to undo insert operation 612.

In some embodiments, in performing undo operation 672, management module 140 identifies a record in log stream 134 that is associated with a stable state of a node (e.g., 666-2) in TDS 660 that is associated with the key included in first undo operation 672 (e.g., key 21). For example, the operation commit record corresponding to delete operation 616 is (i) associated with complete transaction 604 and (ii) associated with location information pointing to the location of node MM2, which is associated with keys 12-23 of TDS 660. In some embodiments, after identifying node MM2 as a stable state of node 666-2 in TDS 660, management module 140 then performs undo operation 672, by:

A) retrieving node MM2 from a slab in datastore 136 that corresponds to the location included in the operation commit record corresponding to delete operation 616;

B) storing node MM2 or a copy thereof in cache 206;

C) determining whether cached node MM2 or the copy thereof includes the data object that is the subject of undo operation 672 (e.g., data object 608-4 with key 21);

D) in accordance with a determination that cached node MM2 or the copy thereof does not include data object 608-4, identifying cached node MM2 or the copy thereof as the result of undo operation 672; and E) updating keys in non-persistent key-map 202 that previously mapped to location information pointing to old version(s) of node 666-2 to map to location information pointing to node MM2.

In some embodiments, in performing undo operation 674, management module 140 identifies a record in log stream 134 that is associated with a stable state of a node (e.g., 656-1) in TDS 650 that is associated with the key included in second undo operation 674 (e.g., key 7). For example, an operation commit record corresponding to delete operation 618 is (i) associated with complete transaction 604 and (ii) associated with location information pointing to the location of node J3, which is associated with keys 1-8 of TDS 650. In some embodiments, after identifying node J3 as a stable state of node 656-1 in TDS 650, management module 140 then performs undo operation 674, by:

A) retrieving node J3 from a slab in datastore 136 that corresponds to the location included in the operation commit record corresponding to delete operation 618;

B) storing node J3 or a copy thereof in cache 206;

C) determining whether cached node J3 or the copy thereof includes the data object that is the subject of undo operation 674 (e.g., data object 606-4 with key 7);

D) in accordance with a determination that cached node J3 or the copy thereof does include data object 606-4, modifying cached node J3 or the copy thereof so as to generated new node J4 (the result of undo operation 674);

E) allocating a free slab in datastore 136 for node J4;

F) writing node J4 to the allocated slab in datastore 136; and

G) updating keys in non-persistent key-map 202 that previously mapped to location information pointing to old version(s) of node 656-1 to map to location information pointing to node J4.

In FIG. 6E, state 636 shows the status of nodes J4 and MM2 after management module 140 performs the recovery process. Node J4 is the result of undo operation 674, and node MM2 is the result of undo operation 672. In FIG. 6D, node J4 includes deleted data object 606-1 corresponding to key 1 with a tombstone, data object 606-2 corresponding to key 2 with a value of 3, and data object 606-3 corresponding to key 3 with a value of 7. In FIG. 6E, node MM2 includes deleted data object 608-1 corresponding to key 12 with a tombstone, data object 608-2 corresponding to key 15 with a value of 51, and data object 608-3 corresponding to key 20 with a value of 77. For example, after the recovery process, node 666-2 in TDS 660 (see FIG. 6A) is reverted to node MM2 because this previous state of node 666-2 includes the appropriate data objects according to recovery list 642 without needing to synthesize an additional leaf node. However, for example, after the recovery process, node 656-1 in TDS 650 (see FIG. 6A) is represented by newly synthesized node J4 because none of the previous states of node 656-1 include the appropriate data objects according to recovery list 644.

Attention is now directed to FIGS. 7A-7G, which illustrate a method 700 of managing a data storage system in accordance with some embodiments. Method 700 is, optionally, governed by instructions that are stored in a non-transitory computer readable storage medium and that are executed by one or more processors of a memory controller (e.g., management module 140, FIGS. 1 and 3). Each of the operations shown in FIGS. 7A-7G typically corresponds to instructions stored in a computer memory or non-transitory computer readable storage medium (e.g., memory 302 of management module 140 in FIG. 3). The computer readable storage medium optionally (and typically) includes a magnetic or optical disk storage device, solid state storage devices such as flash memory, 3D memory (as further described herein), or other non-volatile memory device or devices. The computer readable instructions stored on the computer readable storage medium typically include one or more of: source code, assembly language code, object code, or other instruction format that is interpreted or executed by one or more processors. In various embodiments, some operations in method 700 are combined and/or the order of some operations is changed from the order shown in FIGS. 7A-7G.

In some embodiments, method 700 is performed in a data storage system (e.g., data storage system 100, FIG. 1) that includes: (A) a memory controller (e.g., management module 140, FIGS. 1 and 3) with one or more processors (e.g., CPU(s) 142, FIGS. 1 and 3) and associated memory (e.g., memory 302, FIG. 3); (B) a non-volatile memory with a log stream (e.g., log stream 134, FIG. 2B) and a datastore (e.g., datastore 136, FIG. 2B) storing one or more tiered data structures; and (C) a volatile memory with a cache (e.g., cache 206, FIG. 2A) and a key-map (e.g., non-persistent key-map 202, FIG. 2A) storing datastore location information for a plurality of keys corresponding to data objects in the one or more tiered data structures stored in the datastore. In some embodiments, the non-volatile memory comprises one or more NVM devices such as magnetic disk storage device(s), optical disk storage device(s), flash memory device(s), 3D memory device(s), or other NVM memory device(s). In some embodiments, the volatile memory comprises one or more volatile memory devices such as DRAM, SRAM, DDR RAM, or other random access solid state memory device(s). In some embodiments, the memory controller is operatively coupled with or, alternatively, includes the non-volatile memory and/or the volatile memory.

The memory controller receives (702) a request, from a requestor (e.g., computer system 110, FIG. 1), to perform a transaction including a set of two or more memory operations (e.g., create/insert, replace/update, and/or delete operations) to be performed on one or more tiered data structures stored in a datastore, where a first memory operation in the set of two or more memory operations is associated with a first key. FIG. 5A, for example, shows prophetic transaction 502 received from a requestor (e.g., computer system 110, FIG. 1). Transaction 502 includes: replace operation 512 whereby an old value associated with a first data object that corresponds to key 31 is to be replaced with new value 35; insert operation 514 whereby a second data object with a value of 7 that corresponds to key 42 is to be inserted into TDS 400; and delete operation 516 whereby a third data object that corresponds to key 35 is to be removed from TDS 400.

In some embodiments, the datastore comprises (704) a plurality of slabs, and a respective tiered data structure of the one or more tiered data structures includes a plurality of leaf nodes, where a respective leaf node (sometimes called a first leaf node) of the respective tiered data structure includes one or more data objects and is stored in a respective slab (sometimes called a first slab) of the plurality of slabs. FIG. 5A, for example, shows TDS 400 with leaf nodes 406-1, 406-2, 406-3, and 406-4 labeled nodes J, K, L, and M, respectively. FIG. 5A, for example, also shows leaf node J stored at a slab in datastore 136 corresponding to slab index number 24, leaf node K stored at a slab in datastore 136 corresponding to slab index number 33, and leaf node L stored at a slab in datastore 136 corresponding to slab index number 35.

In response to the request, the memory controller writes (706) a start transaction record to the log stream including a unique transaction identifier corresponding to the transaction. For example, in response to receiving transaction 502, management module 140 writes a start transaction record to log stream 134. FIG. 5A, for example, shows log stream 134 with the start transaction record corresponding to transaction 502 with unique sequence number 100 and transaction identifier number 699.

In response to the request, the memory controller performs (708) the two or more memory operations. In some embodiments, concurrent memory operations can modify the same leaf node of a TDS but not the same data object. For example, the application (e.g., computer system 110, FIG. 1) guarantees that concurrently executing transactions do not modify the same data objects. Thus, the application enforces isolation among concurrent transaction, i.e., read and write sets of concurrent transactions are mutually exclusive.

For each of the two or more memory operations, upon completion of the memory operation, the memory controller writes (710) a respective operation commit record to the log stream, where the operation commit record guarantees a memory operation level of atomicity across the one or more tiered data structures. In accordance with some embodiments, an operation commit record in log stream 134 ensures atomicity at a memory operation level in data storage system 100 and also ensures a stable state of all nodes in a TDS stored in datastore 136. In one example, after completing replace operation 512, management module 140 writes an operation commit record to log stream 134 for replace operation 512. State 522 in FIG. 5B, for example, shows log stream 134 with an operation commit record corresponding to replace operation 512 that includes: unique sequence number 101; transaction identifier number 699; key 31 (e.g., corresponding to updated data object 506-1); slab index number 35 of the slab in datastore 136 storing old node L; and slab index number 51 of the slab in datastore 136 storing new node L2. In another example, after completing insert operation 514, management module 140 writes an operation commit record to log stream 134 for insert operation 514. State 524 in FIG. 5B, for example, shows log stream 134 with an operation commit record corresponding to insert operation 514 that includes: unique sequence number 102; transaction identifier number 699; key 42 (e.g., corresponding to new data object 506-5); slab index number 51 of the slab in datastore 136 storing old node L2; and slab index number 63 of the slab in datastore 136 storing new node L3. In another example, after completing delete operation 516, management module 140 writes an operation commit record to log stream 134 for delete operation 516. State 526 in FIG. 5C, for example, shows an operation commit record corresponding to delete operation 516 that includes: unique sequence number 103; transaction identifier number 699; key 35 (e.g., corresponding to deleted data object 506-3); slab index number 63 of the slab in datastore 136 storing old node L3; and slab index number 75 of the slab in datastore 136 storing new node L4.

For the first memory operation in the set of two or more memory operations (712), the memory controller: writes (714) a new data object in the datastore; assigns (716), in a key-map, a location of the new data object in the datastore to the first key; and maintains (718) an old data object in the datastore, where a location of the old data object was previously assigned, in the key-map, to the first key. For example, the first memory operation is a replacement/update operation that indicates a new value for a first data object and first key information for the first data object. For example, management module 140 performs the first memory operation (e.g., a replace operation) by: writing a new first data object (e.g., a modified first data object with the first key information and the new value) to a first location in datastore 136; assigning the first key information in non-persistent key-map 202 to the first location in datastore 136; and maintaining the old first data object (e.g., the unmodified first data object with the first key information and an old value prior to modification) at a second location in datastore 136 that was previously mapped to the first key information.

In some embodiments, the first memory operation replaces (720) an old value in the respective tiered data structure with a new value, where the old value corresponds to the old data object and the new value corresponds to the new data object. Prior to writing the new data object in the datastore, the memory controller allocates a first slab in the datastore for the new data object. In some embodiments, a "free" slab does not currently store any data objects and is not associated with any of the nodes of the one or more tiered data structures stored in datastore 136. For example, with reference to FIGS. 5A-5B, management module 140 performs replace operation 512 by: replacing the old value (e.g., 3) associated with an old first data object (e.g., data object 506-1) that corresponds to key 31 with new value 5 so as to create a new first data object; and allocating a first slab in datastore 136 for the new first data object.

In some embodiments, writing the new data object in the datastore comprises (722) writing the new data object to the first slab in the datastore, where the new data object includes the new value and the first key. For example, management module 140 writes the new first data object (e.g., with key 31 and new value 5) to the first slab in datastore 136 (e.g., allocated in step 720) and maintains the old first data object (e.g., with key 31 and value 3) at a second slab in datastore 136 that is distinct from the first slab.

In some embodiments, prior to writing the new data object to the first slab, the memory controller (724): locates the old data object that includes the old value in a second slab of the datastore using the key-map to map the first key to the second slab in the datastore; and retrieves an old leaf node of the respective tiered data structure that is stored at the second slab, where the old leaf node includes the old data object and zero or more other data objects. For example, with reference to FIGS. 5A-5B, management module 140 performs replace operation 512 by: locating data object 506-1 corresponding to key 31 by mapping key 31 in non-persistent key-map 202 to slab index number 35; retrieving node L stored at a slab in datastore 136 that corresponds to slab index number 35; and storing node L or a copy thereof in cache 206. Continuing with this example, after storing node L or the copy thereof in cache 206, management module 140 modifies cached node L or the copy thereof to replace the old value (3) of data object 506-1 with the new value (5) so as to generate node L2.

In some embodiments, writing the new data object to the first slab comprises (726) writing a first new leaf node of the respective tiered data structure to the first slab, the first new leaf node includes the new data object and the zero or more other data objects in the retrieved old leaf node. Continuing with the example in step 724, with reference to FIGS. 5A-5B, after generating node L2, management module 140 further performs replace operation 512 by: allocating a free slab in datastore 136 that corresponds to slab index number 51 for node L2; writing node L2 to the allocated slab that corresponds to slab index number 51; and updating keys in non-persistent key-map 202 that previously mapped to slab index number 35 storing node L to map to slab index number 51 storing node L2.

In some embodiments, the memory controller write-locks (728) the old leaf node of the respective tiered data structure during the first memory operation. In some embodiments, read/write-locks occur at logical node level. As such, any node that requires modification by a memory operation is locked for the duration of the memory operation. Continuing with the example in steps 724 and 726, management module 140 write-locks node L after locating data object 506-1 and unlocks node L after writing node L2 to datastore 136. Thus, the write-lock on node L is not maintained until the end of transaction 502, and instead is needed to be maintained only during the first memory operation (e.g., replace operation 512). The release of write-locks after each memory operation, without maintaining such write-locks until the transaction completion, substantially improves performance of transaction processing by reducing the number of locked nodes and reducing the frequency with which transaction are blocked or delayed by write-locked nodes.

The operation commit record for the first memory operation includes (730) the first key, the unique transaction identifier, a pointer to the location of the new data object in the datastore, and a pointer to the location of the old data object in the datastore. Continuing with the example in steps 712-718, after completing the first memory operation, management module 140 writes an operation commit record corresponding to the first memory operation to log stream 134 that includes: the first key information; the transaction identifier of the transaction that includes the first memory operation; a pointer to the first location in datastore 136 (e.g., including the new first data object); and a pointer to the second location in datastore 136 (e.g., including the old first data object).

In some embodiments, the pointer to the location of the new data object in the datastore is (732) a pointer to the first slab in the datastore, and the pointer to the location of the old data object in the datastore is a pointer to the second slab in the datastore. Continuing with the example in steps 724 and 726, with reference to FIGS. 5A-5B, after completing replace operation 512, management module 140 writes an operation commit record to log stream 134 for replace operation 512. State 522 in FIG. 5B, for example, shows log stream 134 with an operation commit record corresponding to replace operation 512 that includes: unique sequence number 101; transaction identifier number 699; key 31 (e.g., corresponding to updated data object 506-1); slab index number 35 of the slab in datastore 136 storing old node L (e.g., the second slab); and slab index number 51 of the slab in datastore 136 storing new node L2 (e.g., the first slab).

In some embodiments, a second memory operation in the set of two or more memory operations is associated with a second key, and the new data object is a first new data object. The second memory operation is distinct from the first memory operation. FIG. 5A, for example, shows prophetic transaction 502 with insert operation 514 (e.g., the second memory operation) whereby a second data object with a value of 7 that corresponds to key 42 is to be inserted into TDS 400.

In some embodiments, for the second memory operation in the set of two or more memory operations (734), the memory controller: writes (736) a second new data object, distinct from the first new data object, in the datastore; and assigns (738), in the key-map, a location of the second new data object in the datastore to the second key. For example, the second memory operation is an insert/create operation that indicates a value for a second new data object and second key information for the second new data object. For example, management module 140 performs the second memory operation (e.g., an insert operation) by: writing a second new data object (e.g., with the second key information and the value) to a third location in datastore 136; and assigning the second key information in non-persistent key-map 202 to the third location in datastore 136.

In some embodiments, the second memory operation creates (740) a second new value in the respective tiered data structure, the second new value corresponds to the second new data object. Prior to writing the second new data object in the datastore, the memory controller allocates a third slab in the datastore for the second new data object. In some embodiments, a "free" slab does not currently store any data objects and is not associated with any of the nodes of the one or more tiered data structures stored in datastore 136. For example, with reference to FIG. 5B, management module 140 performs insert operation 514 by: inserting data object 506-5 that corresponds to key 42 into TDS 400; and allocating a third slab in datastore 136 for data object 506-5.

In some embodiments, writing the second new data object in the datastore comprises (742) writing the second new data object to the third slab in the datastore, where the second new data object includes the second new value and the second key. For example, management module 140 writes data object 506-5 (e.g., with key 42 and value 7) to the third slab in datastore 136 (e.g., allocated in step 740).

In some embodiments, prior to writing the second new data object to the third slab, the memory controller (744): identifies an adjacent data object corresponding to an adjacent key that is closest to the second key; locates the adjacent data object in a fourth slab of the datastore using the key-map to map the adjacent key to the fourth slab in the datastore; and retrieves a second old leaf node of the respective tiered data structure that is stored at the fourth slab, where the second old leaf node includes the adjacent data object and zero or more other data objects. In some embodiments, for the insert operation, management module 140 identifies key information corresponding to an adjacent data object with that is closest to the second key information and, then, locates a leaf node that includes the adjacent data object. For example, with reference to FIG. 5B, management module 140 performs insert operation 514 by: locating a data object corresponding to a respective key that is closest to key 42 by mapping the respective key in non-persistent key-map 202 to slab index number 51; retrieving node L2 stored at a slab in datastore 136 that corresponds to slab index number 51; and storing node L2 or a copy thereof in cache 206. Continuing with this example, after storing node L2 or the copy thereof in cache 206, management module 140 modifies cached node L2 or the copy thereof to insert data object 506-5 with a value of 7 so as to generate node L3.

In some embodiments, writing the second new data object to the third slab comprises (746) writing a second new leaf node of the respective tiered data structure to the third slab, the second new leaf node includes the second new data object, the adjacent data object, and the zero or more other data objects in the retrieved second old leaf node. Continuing with the example in step 744, with reference to FIG. 5B, after generating node L3, management module 140 further performs insert operation 514 by: allocating a free slab in datastore 136 that corresponds to slab index number 63 for node L3; writing node L3 to the allocated slab that corresponds to slab index number 63; and updating keys in non-persistent key-map 202 that previously mapped to slab index number 51 storing node L2 to map to slab index number 63 storing node L3.

In some embodiments, the second memory operation causes (748) a split of the second old leaf node in the respective tiered data structure. In some embodiments, leaf nodes 406 include a predefined minimum number of data objects (e.g., two data objects) and a predefined maximum number of data objects (e.g., five data objects). For example, when an insert operation would cause a respective leaf node to store more than the predefined maximum number of data objects, management module 140 performs a split operation to split the respective leaf node into two leaf nodes.

In some embodiments, the memory controller write-locks (750) the second old leaf node of the respective tiered data structure during the second memory operation. Continuing with the example in steps 744 and 746, management module 140 write-locks node L2 after locating the data object corresponding to the respective key that is closest to key 42 and unlocks node L2 after writing node L3 to datastore 136.

In some embodiments, the operation commit record for the second memory operation includes (752) the second key, the unique transaction identifier, and a pointer to the location of the second new data object in the datastore. Continuing with the example in steps 734-738, after completing the second memory operation, management module 140 writes an operation commit record corresponding to the second memory operation to log stream 134 that includes: the second key information; the transaction identifier of the transaction that includes the second memory operation; and a pointer to the third location in datastore 136 (e.g., including the second new data object).

In some embodiments, the pointer to the location of the second new data object points to the third slab. For example, with reference to FIG. 5B, after completing insert operation 514, management module 140 writes an operation commit record to log stream 134 for insert operation 514. State 524 in FIG. 5B, for example, shows log stream 134 with an operation commit record corresponding to insert operation 514 that includes: unique sequence number 102; transaction identifier number 699; key 42 (e.g., corresponding to new data object 506-5); slab index number 51 of the slab in datastore 136 storing old node L2 (e.g., the fourth slab); and slab index number 63 of the slab in datastore 136 storing new node L3 (e.g., the third slab).

In some embodiments, a third memory operation in the set of two or more memory operations is associated with a third key, and the new data object is a first new data object. FIG. 5A, for example, shows prophetic transaction 502 with delete operation 516 (e.g., the third memory operation) whereby a third data object that corresponds to key 35 is to be removed from TDS 400.

In some embodiments, for the third memory operation in the set of two or more memory operations (754), the memory controller: writes (756) a third new data object, distinct from the first new data object, in the datastore; assigns (758), in the key-map, a location of the third new data object in the datastore to the third key; and maintains (760) a third old data object in the datastore, where a location of the third old data object was previously assigned, in the key-map, to the third key. For example, the third memory operation is a delete operation that indicates third key information for the third data object to be deleted. For example, management module 140 performs the third memory operation (e.g., a delete operation) by: writing a third new data object (e.g., with the third key information and a tombstone) to a fourth location in datastore 136; assigning the third key information in non-persistent key-map 202 to the fourth location in datastore 136; and maintaining the third old data object (e.g., with the third key information and a value prior to the deletion) at a fifth location in datastore 136 that was previously mapped to the third key information.

In some embodiments, the third memory operation replaces (762) a third old value in the respective tiered data structure with a tombstone, the third old value corresponds to the third old data object and the tombstone corresponds to the third old data object. Prior to writing the third new data object in the datastore, the memory controller allocates a fifth slab in the datastore for the third new data object. In some embodiments, a "free" slab does not currently store any data objects and is not associated with a leaf node in one of the tiered data structures. For example, with reference to FIGS. 5B-5C, management module 140 performs delete operation 516 by: replacing the old value (e.g., 0) associated with a third old data object (e.g., data object 506-3) that corresponds to key 35 with a tombstone so as to create a new third data object; and allocating a fifth slab in datastore 136 for the third new data object.

In some embodiments, writing the third new data object in the datastore comprises (764) writing the third new data object to the fifth slab in the datastore, where the third new data object includes the tombstone and the third key. For example, management module 140 writes the new third data object (e.g., with key 35 and the tombstone) to the fifth slab in datastore 136 (e.g., allocated in step 762) and maintains the third old data object (e.g., with key 35 and value 0) at a sixth slab in datastore 136 that is distinct from the fifth slab.

In some embodiments, prior to writing the third new data object to the fifth slab, the memory controller (766): locates the third old data object that includes the third old value in a sixth slab of the datastore using the key-map to map the third key to the sixth slab in the datastore; and retrieves a third old leaf node of the respective tiered data structure that is stored at the sixth slab, where the third old leaf node includes the third old data object and zero or more other data objects. For example, with reference to FIGS. 5B-5C, management module 140 performs delete operation 516 by: locating data object 506-3 corresponding to key 35 by mapping key 35 in non-persistent key-map 202 to slab index number 63; retrieving node L3 stored at a slab in datastore 136 that corresponds to slab index number 63; and storing node L3 or a copy thereof in cache 206. Continuing with this example, after storing node L3 or the copy thereof in cache 206, management module 140 modifies cached node L3 or the copy thereof to delete data object 506-3 by replacing its value with a tombstone so as to generate node L4.

In some embodiments, writing the third new data object comprises (768) writing a third new leaf node of the respective tiered data structure to the fifth slab in the datastore, the third new leaf node includes the third new data object and the zero or more other data objects in the retrieved third old leaf node. Continuing with the example in step 766, with reference to FIGS. 5B-5C, after generating node L4, management module 140 further performs delete operation 516 by: allocating a free slab in datastore 136 that corresponds to slab index number 75 for node L4; writing node L4 to the allocated slab that corresponds to slab index number 75; and updating keys in non-persistent key-map 202 that previously mapped to slab index number 63 storing node L3 to map to slab index number 75 storing node L4.

In some embodiments, the memory controller write-locks (770) the third old leaf node of the respective tiered data structure during the third memory operation. Continuing with the example in steps 766 and 768, management module 140 write-locks node L3 after locating data object 506-3 and unlocks node L3 after writing node L4 to datastore 136.

In some embodiments, the operation commit record for the third memory operation includes (772) the third key, the unique transaction identifier, a pointer to the location of the third new data object in the datastore, and a pointer to the location of the third old data object in the datastore. Continuing with the example in steps 754-758, after completing the third memory operation, management module 140 writes an operation commit record corresponding to the third memory operation to log stream 134 that includes: the third key information; the transaction identifier of the transaction that includes the third memory operation; a pointer to the fourth location in datastore 136 (e.g., including the third new data object); and a pointer to the fifth location in datastore 136 (e.g., including the third old data object).

In some embodiments, the pointer to the location of the third new data object points to the fifth slab, and the pointer to the location of the third old data object points to the sixth slab. For example, with reference to FIGS. 5B-5C, after completing delete operation 516, management module 140 writes an operation commit record to log stream 134 for delete operation 516. State 526 in FIG. 5C, for example, shows an operation commit record corresponding to delete operation 516 that includes: unique sequence number 103; transaction identifier number 699; key 35 (e.g., corresponding to deleted data object 506-3); slab index number 63 of the slab in datastore 136 storing old node L3 (e.g., the sixth slab); and slab index number 75 of the slab in datastore 136 storing new node L4 (e.g., the fifth slab).

In accordance with a determination that the set of two or more memory operations in the transaction are complete, the memory controller writes (774) a transaction commit record to the log stream including the unique transaction identifier corresponding to the transaction, where the transaction commit record guarantees a transaction level of atomicity across the data storage system. In accordance with some embodiments, a transaction commit record (e.g., with a same transaction identifier as a start transaction record in log stream 134) ensures atomicity across tiered data structures in data storage system 100 by indicating a complete transaction. For example, after performing delete operation 516 and determining that transaction 502 is complete (i.e., all memory operations in transaction 502 have been performed), management module 140 writes a transaction commit record corresponding to transaction 502 to log stream 134. State 528 in FIG. 5C, for example, shows the status of log stream 134 after management module 140 writes the transaction commit record corresponding to transaction 502 to log stream 134. In FIG. 5C, for example, log stream 134 includes the transaction commit record corresponding to transaction 502 with unique sequence number 104 and transaction identifier number 699.

In some embodiments, at a time subsequent to writing the transaction commit record, the memory controller updates (776) a persistent key-map with records in the log stream that were stored in the log stream after the previous update of the persistent key-map. In some embodiments, a previous update of persistent key-map 132 is associated with an update sequence number, and management module 140 or a component thereof (e.g., mapping module 345, FIG. 3) updates persistent key-map 132 with records in log stream 134 that are associated with sequences numbers that are greater that the update sequence number. In some embodiments, management module 140 or a component thereof (e.g., mapping module 345, FIG. 3) updates persistent key-map 132 in accordance with a predetermined schedule, on-demand upon receiving a request from a requestor (e.g., computer system 110, FIG. 1), upon occurrence of a predefined event, or the like. In some embodiments, management module 140 or a component thereof (e.g., mapping module 345, FIG. 3) updates persistent key-map 132 in accordance with a determination that there are no pending memory operations so as to ensure a stable state of datastore 136.

In some embodiments, the key-map is (778) a non-persistent key-map stored in volatile memory, and the non-volatile memory includes the persistent key-map. For example, with reference to FIGS. 2A-2B, non-persistent key-map 202 is stored in volatile memory (e.g., in-memory 144, FIGS. 1 and 2A), and persistent key-map 132 is stored in non-volatile memory (e.g., storage medium 130, FIGS. 1 and 2B).

In some embodiments, after updating the persistent key-map, the memory controller reclaims (780) one or more slabs in the datastore that are not referenced by keys in the persistent key-map. In some embodiments, after updating persistent key-map 132, management module 140 determines a set of one or more slabs in datastore 136 that that are not pointed by location information in updated persistent key-map 202 and reclaims the set of one or more slabs. For example, management module 140 reclaims a respective slab of the set of one or more slabs by removing node number 226, TDS number 228, and data 229 from the respective slab and setting the respective slab's status flag 224 to indicate that the respective slab is free.

It should be understood that the particular order in which the operations in FIGS. 7A-7G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 7A-7G. For example, the tiered data structures, data objects, nodes, records, transaction, and memory operations described above with reference to method 700 optionally have one or more of the characteristics of the tiered data structures, data objects, nodes, records, transaction, and memory operations described herein with reference to other methods described herein (e.g., method 800). For brevity, these details are not repeated here.

Figure 8A:
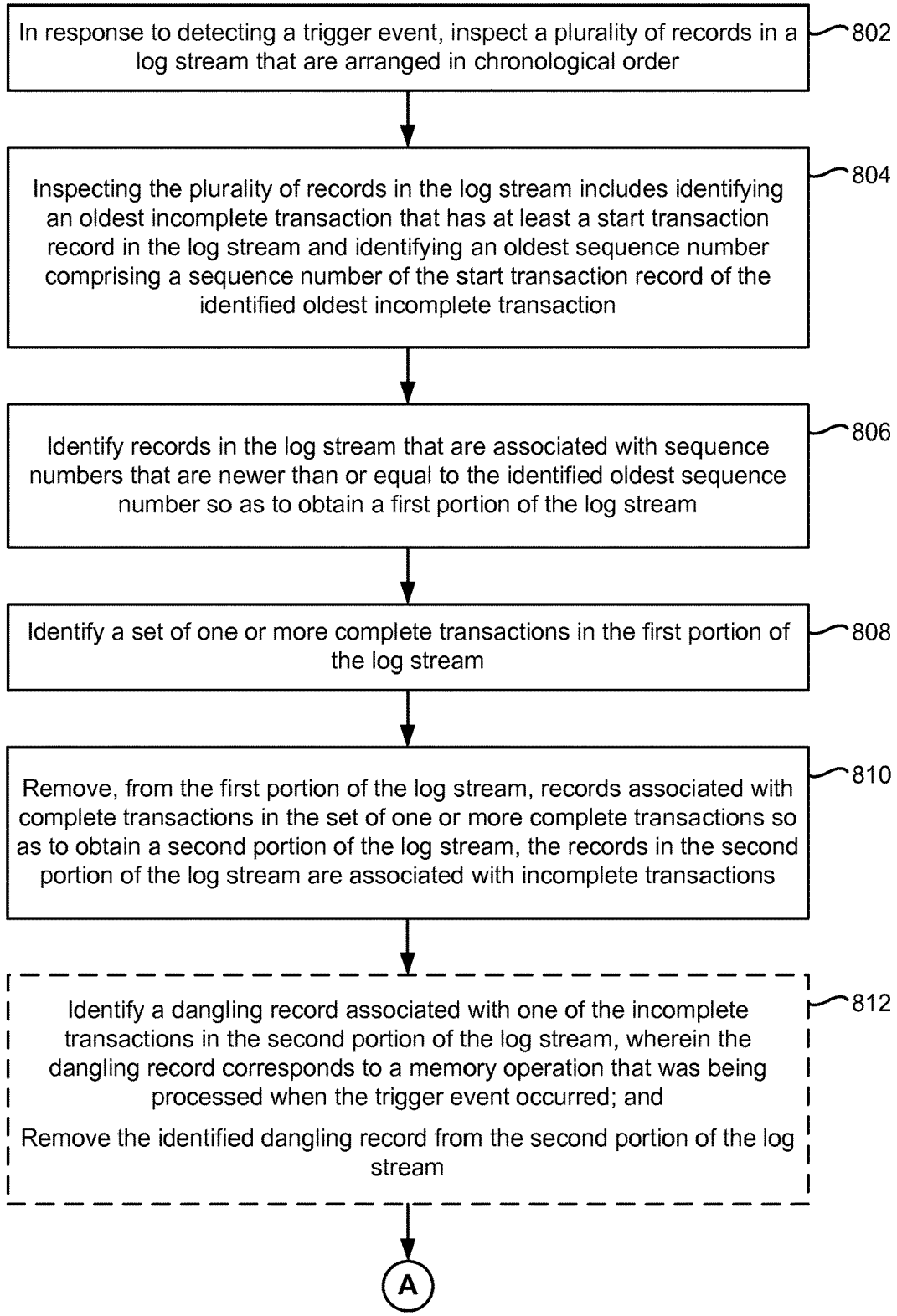
FIGS. 8A-8B illustrate a flowchart representation of a method of performing a recovery process in a data storage system in accordance with some embodiments.
Figure 8B:
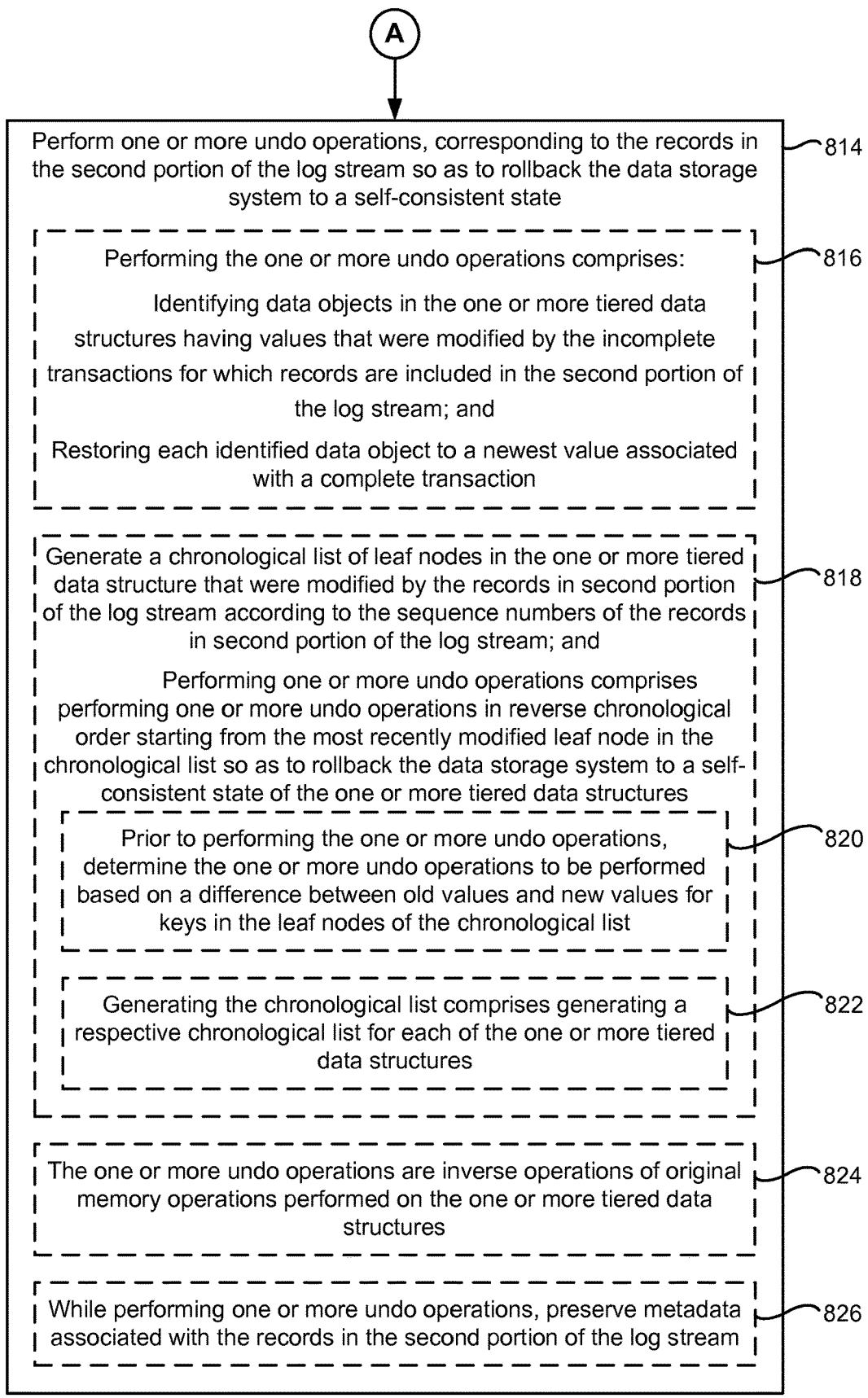

Attention is now directed to FIGS. 8A-8B, which illustrate a method 800 of performing a recovery process in a data storage system in accordance with some embodiments. Method 800 is, optionally, governed by instructions that are stored in a non-transitory computer readable storage medium and that are executed by one or more processors of a memory controller (e.g., management module 140, FIGS. 1 and 3). Each of the operations shown in FIGS. 8A-8B typically corresponds to instructions stored in a computer memory or non-transitory computer readable storage medium (e.g., memory 302 of management module 140 in FIG. 3). The computer readable storage medium optionally (and typically) includes a magnetic or optical disk storage device, solid state storage devices such as flash memory, 3D memory (as further described herein), or other non-volatile memory device or devices. The computer readable instructions stored on the computer readable storage medium typically include one or more of: source code, assembly language code, object code, or other instruction format that is interpreted or executed by one or more processors. In various embodiments, some operations in method 800 are combined and/or the order of some operations is changed from the order shown in FIGS. 8A-8B.

In some embodiments, method 800 is performed in a data storage system (e.g., data storage system 100, FIG. 1) that includes: (A) a memory controller (e.g., management module 140, FIGS. 1 and 3) with one or more processors (e.g., CPU(s) 142, FIGS. 1 and 3) and associated memory (e.g., memory 302, FIG. 3); (B) a non-volatile memory with a log stream (e.g., log stream 134, FIG. 2B) and a datastore (e.g., datastore 136, FIG. 2B) storing one or more tiered data structures; and (C) a volatile memory with a key-map (e.g., non-persistent key-map 202, FIG. 2A) storing datastore location information for a plurality of keys corresponding to data objects in the one or more tiered data structures stored in the datastore. In some embodiments, the non-volatile memory comprises one or more NVM devices such as magnetic disk storage device(s), optical disk storage device(s), flash memory device(s), 3D memory device(s), or other NVM memory device(s). In some embodiments, the volatile memory comprises one or more volatile memory devices such as DRAM, SRAM, DDR RAM, or other random access solid state memory device(s). In some embodiments, the memory controller is operatively coupled with or, alternatively, includes the non-volatile memory and/or the volatile memory.

In response to detecting a trigger event, the memory controller inspects (802) a plurality of records in a log stream that are arranged in chronological order. For example, the trigger event is restart, power-loss, crash, or other specified event related to data storage system 100. With reference to FIG. 6D, for example, prior to writing the transaction commit record corresponding to transaction 602 to log stream 134, data storage system 100 (FIG. 1) experiences a trigger event causing the transaction commit record corresponding to transaction 602 to not be written to log stream 134.

In some embodiments, a respective record of the plurality of records includes a unique sequence number (e.g., monotonically ascending numbers) and a transaction identifier. In some embodiments, the records are arranged in the log stream in chronological order according to their unique sequence numbers and each record is associated with a transaction identifier. State 632 in FIG. 6D, for example, shows the status of log stream 134 after management module 140 writes the transaction commit record corresponding to transaction 604 to log stream 134. In state 632, log stream 134 includes records arranged according to their unique sequence number (e.g., sequence number 200-206). In state 632, each of the records in log stream 134 are associated with a transaction identifier number. For example, the operation commit record corresponding to insert operation 612 includes unique sequence number 202 and transaction identifier number 799 indicating that the operation commit record corresponding to insert operation 612 is part of transaction 602. In another example, the operation commit record corresponds to delete operation 616 includes unique sequence number 203 and transaction identified 800 indicating that the operation commit record corresponds to delete operation 616 is part of transaction 604. The plurality of records in the log stream correspond to one or more transactions, and the one or more transaction comprise at least one of: one or more complete transactions and one or more incomplete transactions.

A respective complete transaction corresponds to a first start transaction record in the log stream that includes a first transaction identifier and a first transaction commit record in the log stream that includes the first transaction identifier. For example, with reference to FIG. 6D, upon detecting the trigger event, log stream 134 includes a start transaction record for transaction 604 (e.g., with transaction identifier 800) and a transaction commit record for transaction 604 (e.g., with transaction identifier 800). Thus, transaction 604 is a complete transaction. In this example, the operation commit records corresponding to delete operations 616 and 618 are associated with complete transaction 604 because they include transaction identifier number 800 associated with complete transaction 604.

A respective incomplete transaction corresponds to a second start transaction record in the log stream that includes a second transaction identifier for which there is not a corresponding transaction commit record in the log stream that includes the second transaction identifier. For example, with reference to FIG. 6D, upon detecting the trigger event, log stream 134 includes a start transaction record for transaction 602 (e.g., with transaction identifier 799) but no transaction commit record for transaction 602. Thus, transaction 602 is an incomplete transaction. In this example, the operation commit records corresponding to insert operations 612 and 614 are associated with incomplete transaction 602 because they include transaction identifier number 799 associated with incomplete transaction 602.

The memory controller inspects the plurality of records in the log stream by identifying (804) an oldest incomplete transaction that has at least a start transaction record in the log stream and identifying an oldest sequence number comprising a sequence number of the start transaction record of the identified oldest incomplete transaction. In some embodiments, the starting point for the recovery process is an incomplete transaction including a start transaction record with the earliest/lowest sequence compared to other incomplete transactions. For example, with reference to FIG. 6D, upon power-up/restart of data storage system 100, management module 140 or a component thereof (e.g., recovery module 348, FIG. 3) performs a recovery process by inspecting the records in log stream 134 which include the records shown in state 632. During the recovery process, management module 140 identifies an earliest incomplete transaction that includes a record (i.e., a start transaction record) with a lowest (or earliest) sequence number. In some embodiments, the recovery process is performed by recovery module 348 (FIG. 3). Continuing with the example, with reference to FIG. 6D, management module 140 identifies transaction 602 corresponding to transaction identifier number 799 as the incomplete transaction that includes a record (e.g., the start transaction record corresponding to transaction 602) with a lowest (or earliest) sequence number (e.g., sequence number 200).

The memory controller identifies (806) records in the log stream that are associated with sequence numbers that are newer than or equal to the identified oldest sequence number so as to obtain a first portion of the log stream. In some embodiments, log stream 134 is pared down to exclude records that are older (i.e., associated with lower sequence numbers) than the identified starting point. Continuing with the example in step 804, management module 140 identifies a first portion of log stream 134-A with sequence numbers that are higher (or later) than or equal to the sequence number (e.g., 200) of the record with the lowest (or earliest) sequence number (e.g., the start transaction record corresponding to transaction 602) in the earliest incomplete transaction (e.g., transaction 602). In this example, state 634 of FIG. 6D shows first portion of log stream 134-A including records with sequence number less than or equal to 200.

The memory controller identifies (808) a set of one or more complete transactions (e.g., committed transactions) in the first portion of the log stream. Continuing with the example in steps 804 and 806, management module 140 or a component thereof (e.g., recovery module 348, FIG. 3) identifies transaction 604, associated with transaction identifier number 800, as a complete transaction in the first portion of log stream 134-A.

The memory controller removes (810), from the first portion of the log stream, records associated with complete transactions in the set of one or more complete transactions so as to obtain a second portion of the log stream, the records in the second portion of the log stream are associated with incomplete transactions. In some embodiments, the records in log stream 134 are further pared down to exclude records associated with complete transactions. After identifying first portion of log stream 134-A, as a part of the recovery process, management module 140 removes records that are associated with complete transactions from first portion of log stream 134-A to obtain a second portion of the log stream 134-B. Continuing with the example in steps 804-808, management module 140 removes records with the transaction identifier number (e.g., transaction identifier number 800) for transaction 604 (i.e., a complete transaction) from first portion of log stream 134-A. For example, state 634 of FIG. 6D also shows second portion of log stream 134-B including records with sequence number less or equal to 200 that are included in incomplete transactions (e.g., transaction 602).

In some embodiments, the memory controller identifies (812) a dangling record associated with one of the incomplete transactions in the second portion of the log stream, where the dangling record corresponds to a memory operation that was being processed when the trigger event occurred, and the memory controller removes the identified dangling record from the second portion of the log stream. For example, management module 140 removes "dangling" memory operation commit records from the second portion of the log stream associated with memory operations that were not fully processed when the trigger event occurred.

The memory controller performs (814) one or more undo operations, corresponding to the records in the second portion of the log stream so as to rollback the datastore to a self-consistent state. In some embodiments, the effect of the undo operations is to unwind memory operations associated with all incomplete (i.e., uncommitted) transactions. In some embodiments, the self-consistent state of the datastore is a self-consistent state of the one or more tiered data structures in the datastore, and is consistent with execution of only complete (i.e., committed) transactions. For example, with reference to FIG. 6E, management module 140 or a component thereof (e.g., recovery module 348, FIG. 3) performs undo operation 672 and 674 so as to roll back TDS 650 and TDS 660 to a stable state where only complete transactions have been performed on TDS 650 and TDS 660.

In some embodiments, the memory controller performs the one or more undo operations by (816): identifying data objects in the one or more tiered data structures having values that were modified by the incomplete transactions for which records are included in the second portion of the log stream; and restoring each identified data object to a newest value associated with a complete transaction. For example, with reference to FIG. 6E, management module 140 or a component thereof (e.g., recovery module 348, FIG. 3) identifies data object 606-4 in TDS 650 and data object 608-4 in TDS 660 are having values modified by incomplete transactions in the second portion of log stream 134-B. Subsequently, in this example, management module 140 or a component thereof (e.g., recovery module 348, FIG. 3) deletes data object 606-4 from TDS 650 and deletes data object 608-4 from TDS 660 to restore TDS 650 and TDS 660 to a stable state associated with only complete transactions.

In some embodiments, a respective tiered data structure of the one or more tiered data structures includes a plurality of leaf nodes, and where a respective leaf node of the respective tiered data structure includes one or more data objects. FIG. 6A, for example, shows TDS 650 and TDS 660, which are both stored in datastore 136. In FIG. 6A, TDS 650 includes leaf node J with data objects 606-1, 606-2, and 606-3, and TDS 660 includes leaf node MM with data objects 608-1, 608-2, and 608-3.

In some embodiments, the memory controller generates (818) a chronological list of leaf nodes in the one or more tiered data structure that were modified by operations corresponding to the records in second portion of the log stream according to the sequence numbers of the records in second portion of the log stream. In some embodiments, the memory controller performs the one or more undo operations in reverse chronological order starting from the most recently modified leaf node in the chronological list so as to rollback the datastore to a self-consistent. In some embodiments, the effect of the undo operations is to unwind memory operations associated with all incomplete (i.e., uncommitted) transactions. In some embodiments, the self-consistent state of datastore 136 is consistent with execution of only complete (i.e., committed) transactions on the one or more tiered data structures in datastore 136. In some embodiments, the list of modified leaf nodes includes old and new key-value pairs associated with each modified leaf node.

After identifying second portion of log stream 134-B, as a part of the recovery process, management module 140 or a component thereof (e.g., recovery module 348, FIG. 3) creates a recovery list for each of the tiered data structures affected by the records in second portion of log stream 134-B. For example, state 634 (continued) in FIG. 6E shows recovery list 642 for TDS 660 and recovery list 644 for TDS 650. Recovery list 642 includes entry 643 corresponding to insert operation 614 in second portion of log stream 134-B. Entry 643 in recovery list 642 includes new leaf node MM3 created by insert operation 614 and its included data objects, and, also, old leaf node MM2, prior to insert operation 614, and its included data objects. Recovery list 644 includes entry 645 corresponding to insert operation 612 in second portion of log stream 134-B. Entry 645 in recovery list 644 includes new leaf node J2 created by insert operation 612 and its included data objects, and, also, old leaf node J, prior to insert operation 612, and its included data objects.

In some embodiments, prior to performing the one or more undo operations, the memory controller determines (820) the one or more undo operations to be performed based on a difference between old values and new values for keys in the leaf nodes of the chronological list. In some embodiments, after determining the recovery list(s), management module 140 or a component thereof (e.g., recovery module 348, FIG. 3) determines undo operations based on the generated recovery list(s). First, with reference to FIG. 6E, based on recovery list 642, management module 140 determines a first undo operation 672 that includes deleting a data object from TDS 660 (e.g., data object 608-4) that corresponds to key 21 so as to undo insert operation 614 in incomplete transaction 602. Second, with reference to FIG. 6E, based on recovery list 644, management module 140 determines a second undo operation 674 that includes deleting a data object from TDS 650 (e.g., data object 606-4) that corresponds to key 7 so as to undo insert operation 612 in incomplete transaction 602.

In some embodiments, the memory controller generates (822) a respective chronological list for each of the one or more tiered data structures. In some embodiments, a chronological list is created for each tiered data structure affected by the incomplete transactions. For example, with reference to FIG. 6E, management module 140 or a component thereof (e.g., recovery module 348, FIG. 3) creates recovery list 642 for TDS 660 and recovery list 644 for TDS 650 according to the records in second portion of log stream 134-B.

In some embodiments, the one or more undo operations are (824) inverse operations of original memory operations performed on the one or more tiered data structures. For example, if the incomplete transaction includes an insert operation, a delete operation is required to undo the insert operation. In another example, if the incomplete transaction includes a delete operation, an insert operation is required to undo the delete operation. In another example, if the incomplete transaction includes a first replace/update operation, a second inverse replace/update operation is required to undo the first replace/update operation.

In some embodiments, while performing one or more undo operations, the memory controller preserves (826) metadata associated with the records in the second portion of the log stream. For example, with reference FIG. 6D, management module 140 or a component thereof maintains metadata (e.g., sequence numbers, timestamps, transaction identifier numbers, pointers, etc.) associated with the records in the second portion of log stream 134-B when performing undo operations 672 and 674.

In some embodiments, the respective complete transaction includes at least one of: one or more first memory operation commit records in the log stream (e.g., replacement/update operations) that are associated with replacing an old value in a respective tiered data structure of the one or more tiered data structures in the datastore with a new value, where one or more first memory operation commit records include the transaction identifier of the transaction; one or more second memory operation commit records in the log stream (e.g., creation/insertion operations) that are associated with creating a second new value in the respective tiered data structure of the one or more tiered data structures in the datastore, where one or more second memory operation commit records include the transaction identifier of the transaction; and one or more third memory operation commit records in the log stream (e.g., deletion operations) that are associated with replacing a second old value in the respective tiered data structure of the one or more tiered data structures in the datastore with a tombstone, where one or more third memory operation commit records include the transaction identifier of the transaction. In some embodiments, each transaction is associated with a transaction identifier and all memory operations included in the transaction have the same transaction identifier. In some embodiments, each record is associated with a record type: start transaction type; transaction commit type; replacement type; insert type; or delete type.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 8A-8B. For example, the tiered data structures, data objects, nodes, records, transaction, and memory operations described above with reference to method 800 optionally have one or more of the characteristics of the tiered data structures, data objects, nodes, records, transaction, and memory operations described herein with reference to other methods described herein (e.g., method 700). For brevity, these details are not repeated here.

Semiconductor memory devices include: volatile memory devices such as dynamic random access memory ("DRAM") or static random access memory ("SRAM") devices; non-volatile memory devices such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"); and other semiconductor elements capable of storing information. Furthermore, each type of memory device may have different configurations. For example, flash memory devices may be configured in a NAND or a NOR configuration.

The memory devices can be formed from passive elements, active elements, or both. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible such as a NOR memory array. One of skill in the art will recognize that the NAND and NOR memory configurations are exemplary, and memory elements may be otherwise configured.

The semiconductor memory elements included in a single device, such as memory elements located within and/or over the same substrate (e.g., a silicon substrate) or in a single die, may be distributed in a two- or three-dimensional manner (such as a two dimensional ("2D") memory array structure or a three dimensional ("3D") memory array structure).

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer on which the material layers of the memory elements are deposited and/or in which memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, including a bit line and a word line.

A three dimensional memory array is organized so that memory elements occupy multiple planes or multiple device levels, forming a structure in three dimensions (i.e., in the x, y, and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked planes of memory devices. The columns may be arranged in a two dimensional configuration, such as in an x-z plane, thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single plane, sometimes called a horizontal (e.g., x-z) plane for ease of discussion. Alternatively, the memory elements may be connected together to extend through multiple parallel planes. Other three dimensional configurations can be envisioned where some NAND strings contain memory elements in a single plane of memory elements (sometimes called a memory level) while other strings contain memory elements which extend through multiple parallel planes (sometimes called parallel memory levels). Three dimensional memory arrays may also be designed in a NOR configuration and in a ReRAM configuration.

A monolithic three dimensional memory array is one in which multiple planes of memory elements (also called multiple memory levels) are formed above and/or within a single substrate, such as a semiconductor wafer, according to a sequence of manufacturing operations. In a monolithic 3D memory array, the material layers forming a respective memory level, such as the topmost memory level, are located on top of the material layers forming an underlying memory level, but on the same single substrate. In some implementations, adjacent memory levels of a monolithic 3D memory array optionally share at least one material layer, while in other implementations adjacent memory levels have intervening material layers separating them.

In contrast, two dimensional memory arrays may be formed separately and then integrated together to form a non-monolithic 3D memory device in a hybrid manner. For example, stacked memories have been constructed by forming 2D memory levels on separate substrates and integrating the formed 2D memory levels atop each other. The substrate of each 2D memory level may be thinned or removed prior to integrating it into a 3D memory device. As the individual memory levels are formed on separate substrates, the resulting 3D memory arrays are not monolithic three dimensional memory arrays.

Associated circuitry is typically required for proper operation of the memory elements and for proper communication with the memory elements. This associated circuitry may be on the same substrate as the memory array and/or on a separate substrate. As non-limiting examples, the memory devices may have driver circuitry and control circuitry used in the programming and reading of the memory elements.

Further, more than one memory array selected from 2D memory arrays and 3D memory arrays (monolithic or hybrid) may be formed separately and then packaged together to form a stacked-chip memory device. A stacked-chip memory device includes multiple planes or layers of memory devices, sometimes called memory levels.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

A person skilled in the art will recognize that the invention or inventions descried and claimed herein are not limited to the two dimensional and three dimensional exemplary structures described here, and instead cover all relevant memory structures suitable for implementing the invention or inventions as described herein and as understood by one skilled in the art.

It will be understood that, although the terms "first," "second," etc. may be used herein to describe various elements, these elements should not be limited by these terms. These terms are only used to distinguish one element from another. For example, a first data object could be termed a second data object, and, similarly, a second data object could be termed a first data object, which changing the meaning of the description, so long as all occurrences of the "first data object" are renamed consistently and all occurrences of the "second data object" are renamed consistently. The first data object and the second data object are both data objects, but they are not the same data object.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of managing a data storage system that includes: a memory controller with one or more processors; a non-volatile memory with a datastore and a log stream; and a key-map, wherein the key-map stores datastore location information for a plurality of keys, the plurality of keys corresponding to data objects in one or more tiered data structures stored in the datastore; the method comprising:
at the memory controller operatively coupled with the non-volatile memory and the key-map:
in response to receiving a request, from a requestor, to perform a transaction including a set of two or more memory operations to be performed on the one or more tiered data structures, wherein a first memory operation in the set of two or more memory operations is associated with a first key:
writing a start transaction record to the log stream including a unique transaction identifier corresponding to the transaction; and
after writing the start transaction record to the log stream, performing the two or more memory operations, including:
while performing at least a portion of a second transaction in parallel, for each of the memory operations, upon completion of the memory operation, writing an operation commit record to the log stream, wherein the operation commit record is separate and distinct from the start transaction record and guarantees a memory operation level of atomicity across the one or more tiered data structures; and
for the first memory operation in the set of two or more memory operations:
writing a new data object in the datastore;
assigning, in the key-map, a location of the new data object in the datastore to the first key; and
maintaining an old data object in the datastore, wherein a location of the old data object was previously assigned, in the key-map, to the first key;
wherein the operation commit record for the first memory operation includes the first key, the same unique transaction identifier included in the start transaction record, a pointer to the location of the new data object in the datastore, and a pointer to the location of the old data object in the datastore;
in accordance with a determination that the transaction, including the set of two or more memory operations in the transaction, is complete, writing a transaction commit record to the log stream including the same unique transaction identifier included in the start transaction record corresponding to the transaction, wherein the transaction commit record is separate and distinct from the start transaction record and guarantees a transaction level of atomicity across the data storage system; and
in accordance with a determination that the transaction, including the set of two or more memory operations in the transaction, is incomplete:
determining a recovery starting point by identifying a respective start transaction record of an earliest incomplete transaction in the log stream without a corresponding transaction commit record;
identifying a portion of the log stream which corresponds to records in the log stream subsequent to the recovery starting point;
removing, from the portion of the log stream, records associated with complete transactions to generate a recovery list including records corresponding to respective incomplete transactions; and
performing one or more recovery operations based on the recovery list.

2. The method of claim 1, wherein:
the datastore comprises a plurality of slabs;
each slab of the plurality of slabs has a respective size, of a set of predefined sizes, in the non-volatile memory; and
a first tiered data structure of the one or more tiered data structures includes a plurality of leaf nodes, wherein a first leaf node of the first tiered data structure includes one or more data objects and is stored in a first slab of the plurality of slabs.

3. The method of claim 2, wherein:
the first memory operation replaces an old value in the first tiered data structure with a new value, wherein the old value corresponds to the old data object and the new value corresponds to the new data object;
the method further comprises:
prior to writing the new data object in the datastore, allocating the first slab in the datastore for the new data object;
writing the new data object in the datastore comprises writing the new data object to the first slab in the datastore, wherein the new data object includes the new value and the first key; and
the operation commit record for the first memory operation is written to the log stream upon completion of the first memory operation.

4. The method of claim 3, further comprising:
prior to writing the new data object to the first slab:
locating the old data object that includes the old value in a second slab of the datastore using the key-map to map the first key to the second slab in the datastore; and
retrieving an old leaf node of the first tiered data structure that is stored at the second slab, wherein the old leaf node includes the old data object and zero or more other data objects;
wherein writing the new data object to the first slab comprises writing a first new leaf node of the first tiered data structure to the first slab, the first new leaf node includes the new data object and the zero or more other data objects in the retrieved old leaf node.

5. The method of claim 4, wherein:
the pointer to the location of the new data object in the datastore is a pointer to the first slab in the datastore; and
the pointer to the location of the old data object in the datastore is a pointer to the second slab in the datastore.

6. The method of claim 4, wherein the old leaf node of the first tiered data structure is write-locked during the first memory operation.

7. The method of claim 2, wherein:
a second memory operation in the set of two or more memory operations is associated with a second key;
the new data object is a first new data object; and
the method further comprises:
for the second memory operation in the set of two or more memory operations:
writing a second new data object, distinct from the first new data object, in the datastore; and
assigning, in the key-map, a location of the second new data object in the datastore to the second key;
wherein the operation commit record for the second memory operation includes the second key, the unique transaction identifier, and a pointer to the location of the second new data object in the datastore.

8. The method of claim 7, wherein:
the second memory operation creates a second new value in the first tiered data structure;
the second new value corresponds to the second new data object;
the method further comprises:
prior to writing the second new data object in the datastore, allocating a third slab in the datastore for the second new data object; and
writing the second new data object in the datastore comprises writing the second new data object to the third slab in the datastore, wherein the second new data object includes the second new value and the second key; and
the operation commit record for the second memory operation is written to the log stream upon completion of the second memory operation.

9. The method of claim 8, further comprising:
prior to writing the second new data object to the third slab:
identifying an adjacent data object corresponding to an adjacent key that is closest to the second key;
locating the adjacent data object in a fourth slab of the datastore using the key-map to map the adjacent key to the fourth slab in the datastore; and
retrieving a second old leaf node of the first tiered data structure that is stored at the fourth slab, wherein the second old leaf node includes the adjacent data object and zero or more other data objects;
wherein writing the second new data object to the third slab comprises writing a second new leaf node of the first tiered data structure to the third slab, the second new leaf node includes the second new data object, the adjacent data object, and the zero or more other data objects in the retrieved second old leaf node.

10. The method of claim 9, wherein the second memory operation causes a split of the second old leaf node in the first tiered data structure.

11. The method of claim 2, wherein:
the set of two or more memory operations includes a third memory operation that is associated with a third key;
the new data object is a first new data object; and
the method further comprises:
for the third memory operation in the set of two or more memory operations:
writing a third new data object, distinct from the first new data object, in the datastore;
assigning, in the key-map, a location of the third new data object in the datastore to the third key; and
maintaining a third old data object in the datastore, wherein a location of the third old data object was previously assigned, in the key-map, to the third key;
wherein the operation commit record for the third memory operation includes the third key, the unique transaction identifier, a pointer to the location of the third new data object in the datastore, and a pointer to the location of the third old data object in the datastore.

12. The method of claim 11, wherein:
the third memory operation replaces a third old value in the first tiered data structure with a tombstone;
the third old value corresponds to the third old data object and the tombstone corresponds to the third old data object;
the method further comprises:
prior to writing the third new data object in the datastore, allocating a fifth slab in the datastore for the third new data object; and
writing the third new data object in the datastore comprises writing the third new data object to the fifth slab in the datastore, wherein the third new data object includes the tombstone and the third key; and
the operation commit record for the third memory operation is written to the log stream upon completion of the second memory operation.

13. The method of claim 12, further comprising:
prior to writing the third new data object to the fifth slab:
locating the third old data object that includes the third old value in a sixth slab of the datastore using the key-map to map the third key to the sixth slab in the datastore; and
retrieving a third old leaf node of the first tiered data structure that is stored at the sixth slab, wherein the third old leaf node includes the third old data object and zero or more other data objects;
wherein writing the third new data object comprises writing a third new leaf node of the first tiered data structure to the fifth slab in the datastore, the third new leaf node includes the third new data object and the zero or more other data objects in the retrieved third old leaf node.

14. The method of claim 2, wherein:
the key-map is a non-persistent key-map stored in volatile memory; and
the non-volatile memory includes a persistent key-map.

15. The method of claim 14, further comprising:
at a time subsequent to writing the transaction commit record, updating the persistent key-map with records in the log stream that were stored in the log stream after the previous update of the persistent key-map.

16. The method of claim 15, further comprising:
after updating the persistent key-map, reclaiming one or more slabs in the datastore that are not referenced by keys in the persistent key-map.

17. A data storage system, comprising:
a non-volatile memory with a log stream and a datastore storing one or more tiered data structures;
a volatile memory with a key-map, wherein the key-map stores datastore location information for a plurality of keys, the plurality of keys corresponding to data objects in one or more tiered data structures stored in the datastore; and
a memory controller with one or more processors and memory storing one or more programs, wherein the one or more programs are configured to be executed by the one or more processors, the one or more programs including instructions for:
in response to receiving a request, from a requestor, to perform a transaction including a set of two or more memory operations to be performed on the one or more tiered data structures, wherein a first memory operation in the set of two or more memory operations is associated with a first key:
after writing the start transaction record to the log stream, writing a start transaction record to the log stream including a unique transaction identifier corresponding to the transaction; and
performing the two or more memory operations, including:
while performing at least a portion of a second transaction in parallel, for each of the memory operations, upon completion of the memory operation, writing an operation commit record to the log stream, wherein the operation commit record is separate and distinct from the start transaction record and guarantees a memory operation level of atomicity across the one or more tiered data structures; and
for the first memory operation in the set of two or more memory operations:
writing a new data object in the datastore;
assigning, in the key-map, a location of the new data object in the datastore to the first key; and
maintaining an old data object in the datastore, wherein a location of the old data object was previously assigned, in the key-map, to the first key;
wherein the operation commit record for the first memory operation includes the first key, the same unique transaction identifier included in the start transaction record, a pointer to the location of the new data object in the datastore, and a pointer to the location of the old data object in the datastore;
in accordance with a determination that the transaction, including the set of two or more memory operations in the transaction, is complete, writing a transaction commit record to the log stream including the same unique transaction identifier included in the start transaction record corresponding to the transaction, wherein the transaction commit record is separate and distinct from the start transaction record and guarantees a transaction level of atomicity across the data storage system; and
in accordance with a determination that the transaction, including the set of two or more memory operations in the transaction, is incomplete:
determining a recovery starting point by identifying a respective start transaction record of an earliest incomplete transaction in the log stream without a corresponding transaction commit record;
identifying a portion of the log stream which corresponds to records in the log stream subsequent to the recovery starting point;
removing, from the portion of the log stream, records associated with complete transactions to generate a recovery list including records corresponding to respective incomplete transactions; and
performing one or more recovery operations based on the recovery list.

18. The data storage system of claim 17, wherein:
the datastore comprises a plurality of slabs;
each slab of the plurality of slabs has a respective size, of a set of predefined sizes, in the non-volatile memory; and
a first tiered data structure of the one or more tiered data structures includes a plurality of leaf nodes, wherein a first leaf node of the first tiered data structure includes one or more data objects and is stored in a first slab of the plurality of slabs.

19. The data storage system of claim 17, wherein:
a second memory operation in the set of two or more memory operations is associated with a second key;
the new data object is a first new data object; and
the one or more programs further include instructions for:
for the second memory operation in the set of two or more memory operations:
writing a second new data object, distinct from the first new data object, in the datastore; and
assigning, in the key-map, a location of the second new data object in the datastore to the second key;
wherein the operation commit record for the second memory operation includes the second key, the unique transaction identifier, and a pointer to the location of the second new data object in the datastore.

20. The data storage system of claim 17, wherein:
the key-map is a non-persistent key-map stored in volatile memory; and
the non-volatile memory includes a persistent key-map.

21. A non-transitory computer-readable storage medium storing one or more programs, the one or more programs comprising instructions for managing a data storage system that includes a memory controller with one or more processors; a non-volatile memory with a datastore and a log stream; and a key-map, wherein the key-map stores datastore location information for a plurality of keys, the plurality of keys corresponding to data objects in one or more tiered data structures stored in the datastore; wherein the instructions, when executed by the memory controller with one or more processors, cause the memory controller to:
in response to receiving a request, from a requestor, to perform a transaction including a set of two or more memory operations to be performed on one or more tiered data structures, wherein a first memory operation in the set of two or more memory operations is associated with a first key:
write a start transaction record to a log stream including a unique transaction identifier corresponding to the transaction; and
after writing the start transaction record to the log stream, perform the two or more memory operations, including:
while performing at least a portion of a second transaction in parallel, for each of the memory operations, upon completion of the memory operation, write an operation commit record to the log stream, wherein the operation commit record is separate and distinct from the start transaction record and guarantees a memory operation level of atomicity across the one or more tiered data structures; and
for the first memory operation in the set of two or more memory operations:
write a new data object in the datastore;
assign, in the key-map, a location of the new data object in the datastore to the first key; and
maintain an old data object in the datastore, wherein a location of the old data object was previously assigned, in the key-map, to the first key;
wherein the operation commit record for the first memory operation includes the first key, the same unique transaction identifier included in the start transaction record, a pointer to the location of the new data object in the datastore, and a pointer to the location of the old data object in the datastore;
in accordance with a determination that the transaction, including the set of two or more memory operations in the transaction, is complete, write a transaction commit record to the log stream including the same unique transaction identifier included in the start transaction record corresponding to the transaction, wherein the transaction commit record guarantees a transaction level of atomicity across the data storage system; and
in accordance with a determination that the transaction, including the set of two or more memory operations in the transaction, is incomplete:
determining a recovery starting point by identifying a respective start transaction record of an earliest incomplete transaction in the log stream without a corresponding transaction commit record;
identifying a portion of the log stream which corresponds to records in the log stream subsequent to the recovery starting point;
removing, from the portion of the log stream, records associated with complete transactions to generate a recovery list including records corresponding to respective incomplete transactions; and
performing one or more recovery operations based on the recovery list.

22. The non-transitory computer-readable storage medium of claim 21, wherein:
the datastore comprises a plurality of slabs;
each slab of the plurality of slabs has a respective size, of a set of predefined sizes, in the non-volatile memory; and
a first tiered data structure of the one or more tiered data structures includes a plurality of leaf nodes, wherein a first leaf node of the first tiered data structure includes one or more data objects and is stored in a first slab of the plurality of slabs.

23. The non-transitory computer-readable storage medium of claim 21, wherein:
a second memory operation in the set of two or more memory operations is associated with a second key;
the new data object is a first new data object; and
the instructions further include instructions that, when executed by the memory controller, cause the memory controller to:
for the second memory operation in the set of two or more memory operations:
write a second new data object, distinct from the first new data object, in the datastore; and
assign, in the key-map, a location of the second new data object in the datastore to the second key;
wherein the operation commit record for the second memory operation includes the second key, the unique transaction identifier, and a pointer to the location of the second new data object in the datastore.

24. The non-transitory computer-readable storage medium of claim 21, wherein:
the key-map is a non-persistent key-map stored in volatile memory; and
the non-volatile memory includes a persistent key-map.

* * * * *